US011782452B2

(12) United States Patent
Deyle et al.

(10) Patent No.: US 11,782,452 B2
(45) Date of Patent: Oct. 10, 2023

(54) SURVEILLANCE PREVENTION BY MOBILE ROBOT

(71) Applicant: Cobalt Robotics Inc., San Mateo, CA (US)

(72) Inventors: Travis J. Deyle, San Carlos, CA (US); Erik Schluntz, Mountain View, CA (US); Peregrine Badger, San Mateo, CA (US)

(73) Assignee: Cobalt Robotics Inc., Fremont, CA (US)

( * ) Notice: Subject to any disclaimer, the term of this patent is extended or adjusted under 35 U.S.C. 154(b) by 0 days.

(21) Appl. No.: 17/721,185

(22) Filed: Apr. 14, 2022

(65) Prior Publication Data

US 2022/0283590 A1    Sep. 8, 2022

Related U.S. Application Data

(63) Continuation of application No. 16/543,590, filed on Aug. 18, 2019, now Pat. No. 11,327,503.

(51) Int. Cl.
*G05D 1/00* (2006.01)
*G05D 1/02* (2020.01)
*G06V 20/10* (2022.01)

(52) U.S. Cl.
CPC .......... *G05D 1/0246* (2013.01); *G06V 20/10* (2022.01)

(58) Field of Classification Search
USPC ................................................. 700/245–264
See application file for complete search history.

(56) References Cited

U.S. PATENT DOCUMENTS

| 7,330,776 | B1 * | 2/2008 | Norman ................. | A63H 11/00 |
| | | | | 700/262 |
| 9,302,393 | B1 * | 4/2016 | Rosen .................... | G06N 3/008 |
| 9,329,597 | B2 | 5/2016 | Stoschek et al. | |
| 9,436,926 | B2 | 9/2016 | Cousins et al. | |
| 9,535,421 | B1 | 1/2017 | Canoso et al. | |
| 9,609,288 | B1 * | 3/2017 | Richman ............... | G05D 1/042 |
| 9,720,414 | B1 * | 8/2017 | Theobald ............... | B25J 5/007 |
| 9,792,434 | B1 * | 10/2017 | Li .......................... | G06F 21/554 |

(Continued)

FOREIGN PATENT DOCUMENTS

WO    WO 2016/126297 A2    8/2016

OTHER PUBLICATIONS

United States Office Action, U.S. Appl. No. 16/543,590, dated Sep. 16, 2021, 20 pages.

*Primary Examiner* — Jonathan L Sample
(74) *Attorney, Agent, or Firm* — Fenwick & West LLP

(57) ABSTRACT

A mobile robot is configured for operation in a commercial or industrial setting, such as an office building or retail store. The robot can patrol one or more routes within a building, and can detect violations of security policies by objects, building infrastructure and security systems, or individuals. In response to the detected violations, the robot can perform one or more security operations. The robot can include a removable fabric panel, enabling sensors within the robot body to capture signals that propagate through the fabric. In addition, the robot can scan RFID tags of objects within an area, for instance coupled to store inventory. Likewise, the robot can generate or update one or more semantic maps for use by the robot in navigating an area and for measuring compliance with security policies.

20 Claims, 33 Drawing Sheets

(56) References Cited

U.S. PATENT DOCUMENTS

| | | |
|---|---|---|
| 9,844,879 B1 | 12/2017 | Cousins et al. |
| 9,939,814 B1* | 4/2018 | Bauer .................. G05D 1/0274 |
| 10,012,996 B1* | 7/2018 | Canoso ................ G05D 1/0221 |
| 10,252,419 B2 | 4/2019 | Fritz et al. |
| 2003/0109959 A1* | 6/2003 | Tajima .................... G06N 3/008 |
| | | 700/245 |
| 2004/0113777 A1* | 6/2004 | Matsuhira ........ G08B 13/19647 |
| | | 340/541 |
| 2007/0276540 A1* | 11/2007 | Okuda ................ G05D 1/0272 |
| | | 340/5.1 |
| 2008/0263628 A1* | 10/2008 | Norman ................ G08C 17/02 |
| | | 726/1 |
| 2009/0251694 A1* | 10/2009 | Knopp ...................... G01J 3/02 |
| | | 901/1 |
| 2014/0323157 A1* | 10/2014 | Drukier ................ H04W 4/021 |
| | | 455/456.3 |
| 2015/0205298 A1 | 7/2015 | Stoschek et al. |
| 2015/0242806 A1 | 8/2015 | Cousins et al. |
| 2016/0121479 A1* | 5/2016 | Lin ........................ B25J 9/0003 |
| | | 701/2 |
| 2016/0236638 A1* | 8/2016 | Lavie .................... G08G 1/012 |
| 2016/0375862 A1* | 12/2016 | Ito ........................ G05D 1/0246 |
| | | 348/148 |
| 2017/0136631 A1 | 5/2017 | Li et al. |
| 2017/0225336 A1* | 8/2017 | Deyle ...................... B25J 5/007 |
| 2017/0364074 A1 | 12/2017 | Lau et al. |
| 2018/0165931 A1* | 6/2018 | Zhang ................... G06V 20/52 |
| 2018/0204431 A1* | 7/2018 | Meyer ................. G05D 1/0274 |
| 2018/0311820 A1 | 11/2018 | Fritz et al. |
| 2019/0212752 A1* | 7/2019 | Fong ...................... G06V 10/82 |
| 2019/0259204 A1* | 8/2019 | Park ...................... G06Q 30/02 |
| 2019/0325466 A1* | 10/2019 | Perry ................... G06F 3/0482 |
| 2020/0050206 A1* | 2/2020 | Deyle ................ G01C 21/3461 |
| 2020/0053324 A1* | 2/2020 | Deyle .................. G05D 1/0088 |

* cited by examiner

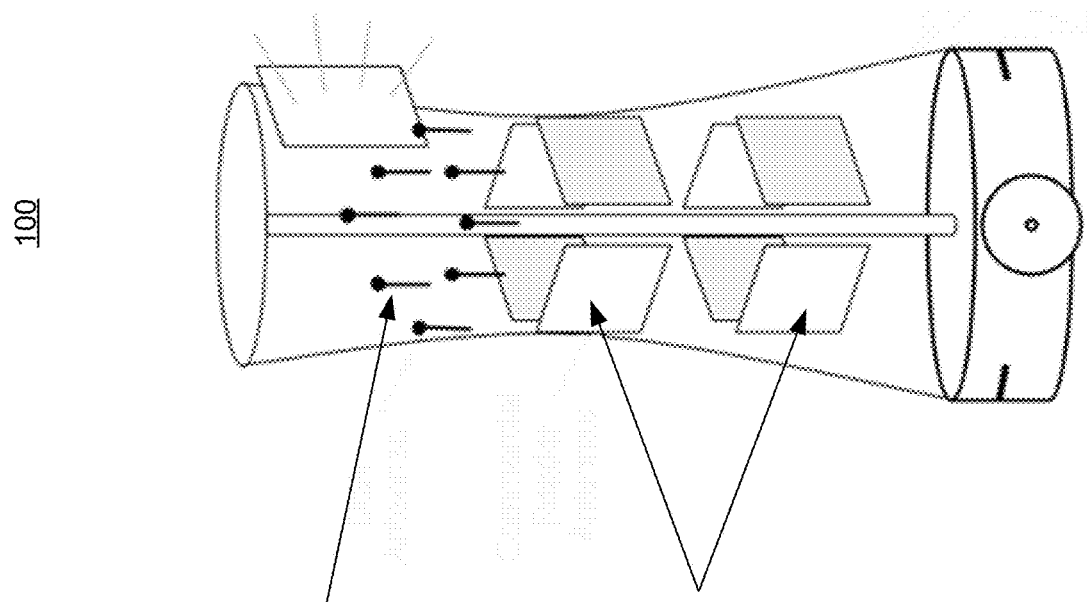
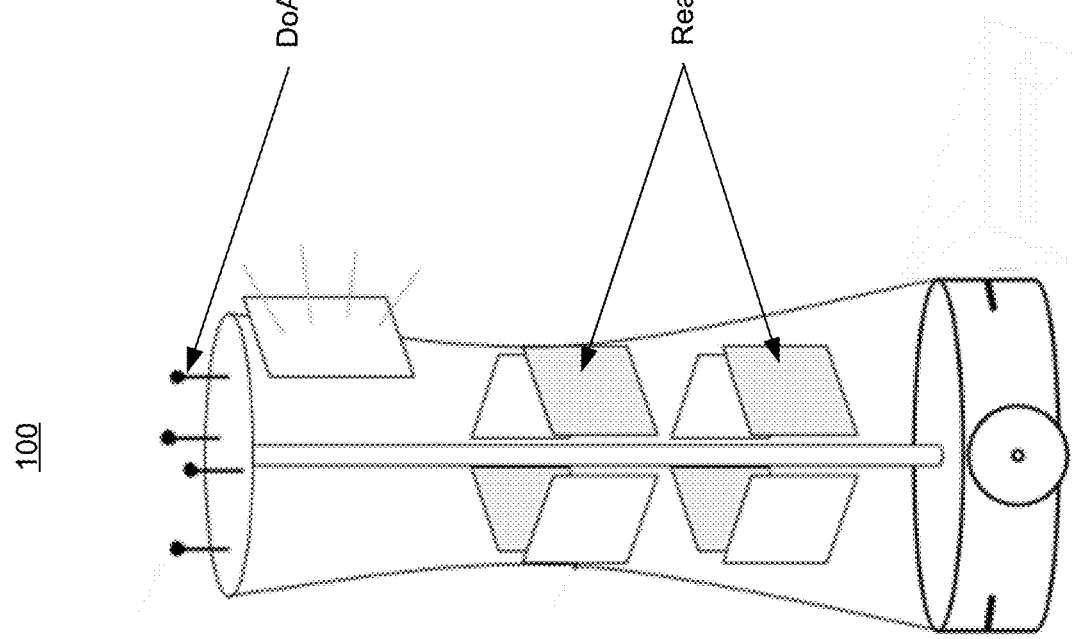
FIG. 22B
FIG. 22A

SURVEILLANCE PREVENTION BY MOBILE ROBOT

CROSS REFERENCE TO RELATED APPLICATIONS

This application is a continuation of U.S. application Ser. No. 16/543,590, filed Aug. 18, 2019, now U.S. Pat. No. 11,327,503, which is incorporated by reference in its entirety.

BACKGROUND

This application relates generally to robots, and in particular to robots configured for operation in commercial and industrial settings.

Robots are increasingly prevalent in society, particularly in entertainment and manufacturing contexts. However, the adoption of robots in these contexts has outpaced settings where frequent robot/human interactions are required. Examples of such settings include retail environments, security environments, and the like. The abilities of robots, for instance, the ability to communicate with building and object infrastructure, creates an unaddressed demand for the implementation of robots in commercial and industrial settings.

SUMMARY

A mobile robot ("robot" hereinafter) configured for operation in commercial and industrial settings is described herein. The robot can perform a number of functions and operations in a variety of categories, including but not limited to security operations, infrastructure or maintenance operations, navigation or mapping operations, inventory management operations, and robot/human interaction operations.

In some embodiments, the mobile robot can interact with an elevator system of a building to navigate to different floors of the building. To communicate with the elevator system, the mobile robot can use wireless communication methods such as a wireless tag embedded within the mobile robot that transmits information to an elevator controller. The mobile robot navigates to an elevator bank on the current floor of the mobile robot, modifies information stored within the wireless tag to identify a target floor, and presents the wireless tag to the elevator controller. Based on the information stored on the wireless tag, the elevator system selects an elevator car to send to the current floor of the mobile robot. When the elevator car arrives at the current floor, the mobile robot enters the elevator car. The elevator system determines that the mobile robot is in the elevator car and moves the elevator car to the target floor. Once the elevator car arrives at the target floor, the mobile robot navigates out of the elevator car onto the target floor.

In some embodiments, the mobile robot can interact with an inventory system of a retail environment. The mobile robot navigates around the retail environment and captures images of inventory on display in the retail environment using a camera mounted to the mobile robot. The mobile robot determines an inventory operation to perform based on the captured image. If the inventory operation can be performed by the mobile robot, the mobile robot performs the inventory operation. If the inventory operation cannot be performed by the mobile robot, the mobile robot flags the inventory operation to be performed by a human operator. In one example, the mobile robot can perform a restocking operation to perform. In this example, the mobile robot searches for an item of a product type within the retail environment. If the item is not found at an expected location associated with the product type, the mobile robot determines whether additional items of the product type are in stock, and if so, the mobile robot can retrieve the items and place them within the expected location of the retail environment.

In some embodiments, the mobile robot performs tasks based on movement instructions from a human operator. The mobile robot may use cameras and sensors to collect information describing an environment of the mobile robot. The mobile robot provides the information to the robot server, which generates a virtual model of the environment of the mobile robot. The virtual model is displayed to a human operator, and the human operator provides movement instructions based on the virtual model. However, there can be latency in the communication between the mobile robot and the human operator, and if the mobile robot executes the movement instructions provided by the human operator, a safety violation can occur based on a change in the environment not reflected in the virtual model. When the mobile robot detects such a change in the environment, the mobile robot autonomously modifies the movement instructions to mitigate the safety violation. After mitigating the safety violation, the mobile robot provides updated information representative of the change in the environment to the robot server, which updates the virtual model based on the change in the environment for review by the human operator.

In some embodiments, the mobile robot scans an environment for unauthorized surveillance devices. The mobile robot accesses a map of the environment and moves to a location within the environment. The mobile robot uses a spectrum analyzer to determine whether there is a surveillance device at the location. The mobile robot can have a spectrum analyzer embedded within a mechanical arm of the mobile robot. The mobile robot can extend and move the mechanical arm to scan the room for surveillance devices. The map of the environment is updated to include information representative of the scanning result at the location. The information can be represented in a heat map based on a strength of signal from the surveillance device, to include a marker representative of a surveillance device at a point on the map corresponding to the location, and to include a likelihood of a presence of a surveillance device. The mobile robot navigates to another location within the room and scans the other location for a surveillance device.

BRIEF DESCRIPTION OF THE DRAWINGS

FIGS. 22A and 22B illustrate example antenna distributions within a robot, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1C:
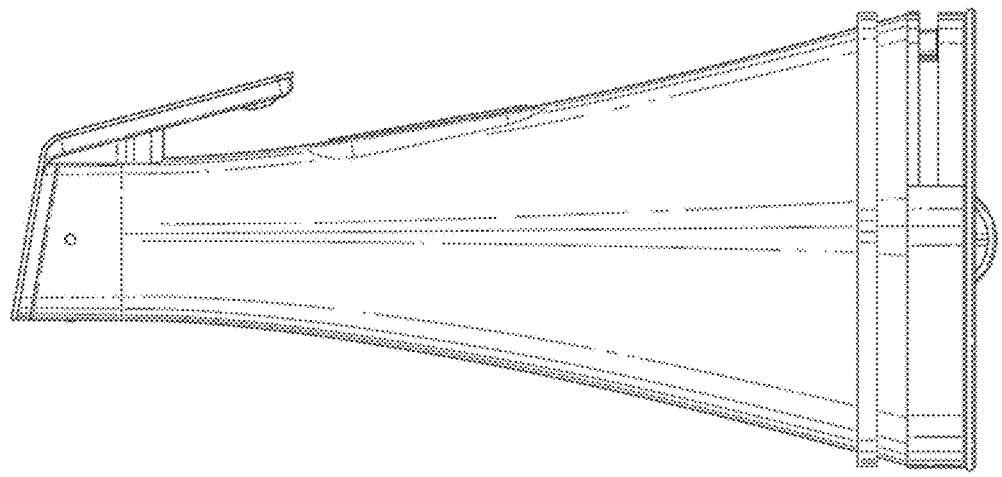
FIGS. 1A, 1B, and 1C illustrate various views of a mobile robot, according to one embodiment.
Figure 1B:
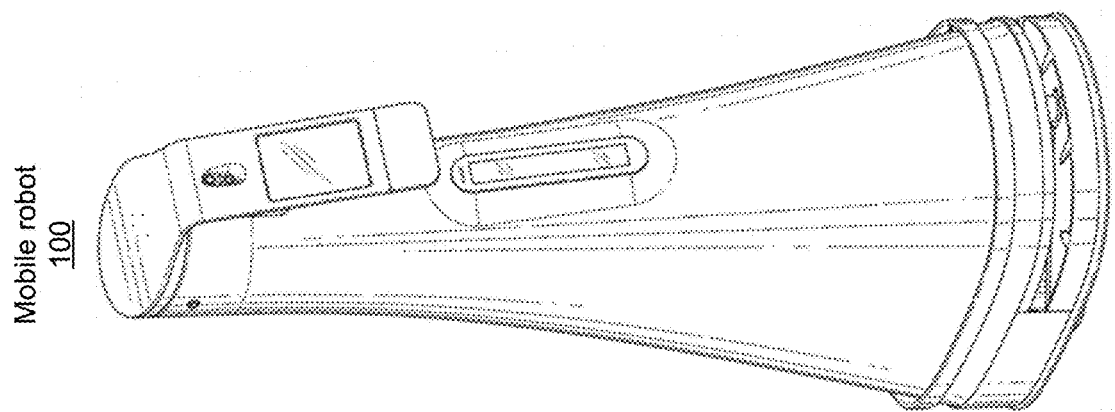
Figure 1A:
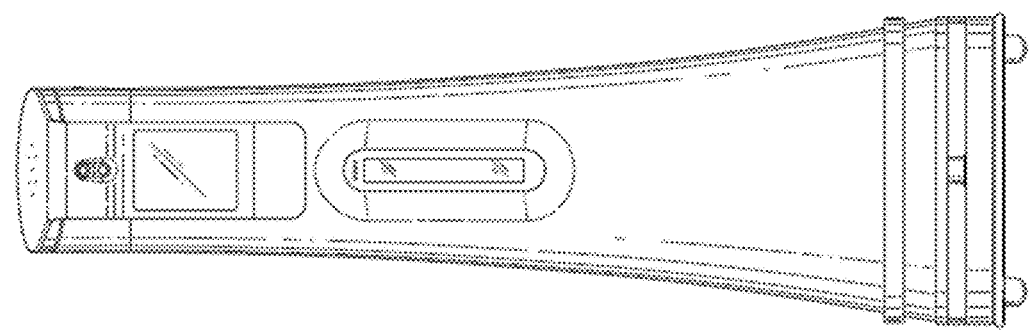

FIGS. 1A, 1B, and 1C illustrate various views of a mobile robot, according to one embodiment. The mobile robot 100 (or simply "robot" hereinafter) can navigate and move around an environment in which the robot is located, for instance by moving forward, backwards, sideways, and by turning or rotating up to 360 degrees within a plane defined by a surface on which the robot is located. In some embodiments, the robot can be deployed within a building, for instance on one or more floors or portions of floors of a building, can be deployed outside (for instance, in a parking lot), or can be deployed any other suitable location.

The robot 100 includes exterior fabric panels, as described below in greater detail. The fabric panels can be removably or fixedly coupled around a housing body of the robot. The robot also includes a plurality of sensors and other components enclosed within the housing body, described below in greater detail. A portion of the sensors can be located within the body of the robot, for instance behind or underneath the fabric panels such that the sensors can receive signals that propagate through the fabric panels. The structure, components, and functionality of the robot are described below in greater detail. It should be noted that in other embodiments, the robot can include different form factors, structures, components, and functionalities than those described herein.

Figure 2:
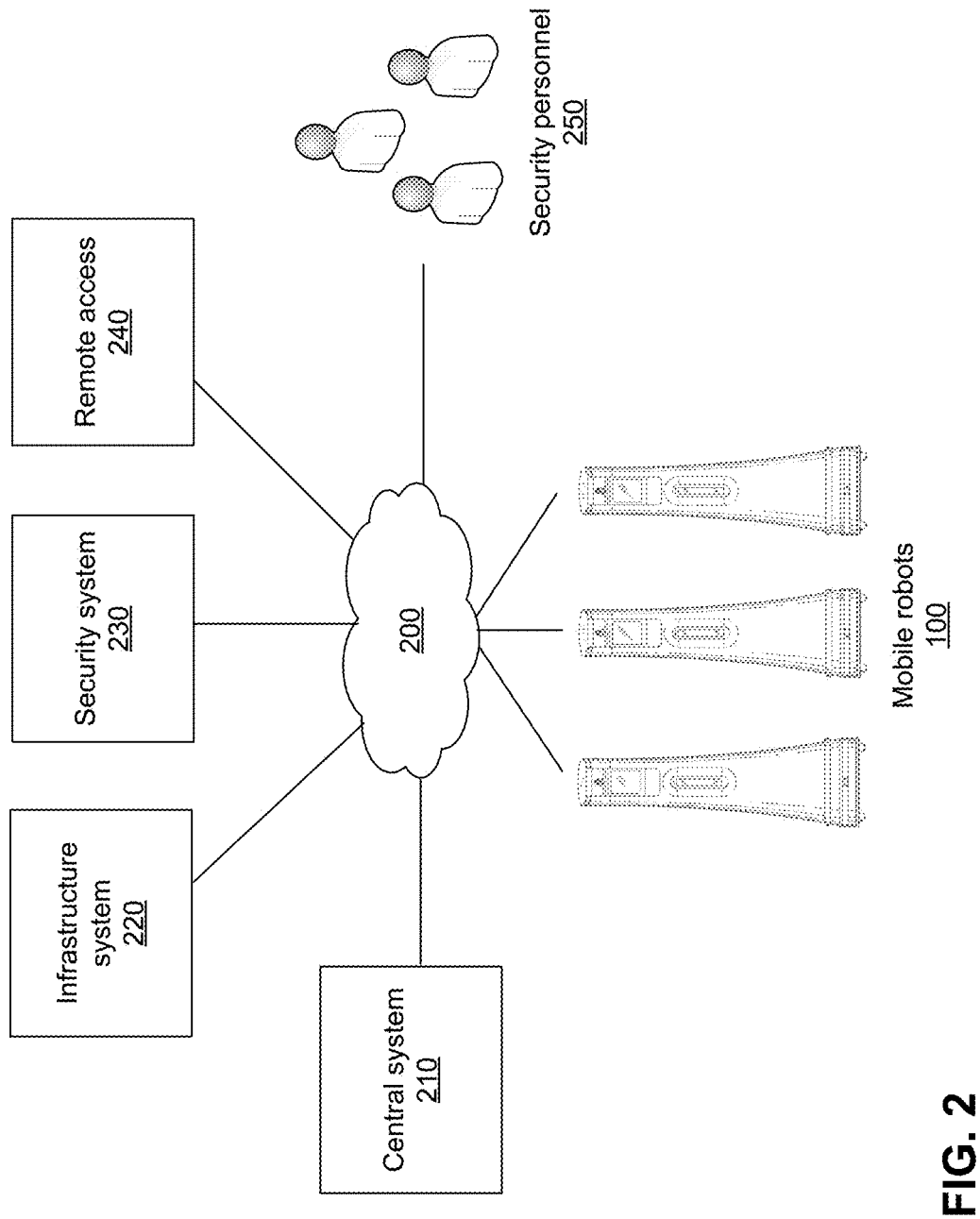
FIG. 2 is a high level block diagram illustrating a mobile robot environment, according to one embodiment.

FIG. 2 is a high level block diagram illustrating a mobile robot environment, according to one embodiment. The environment of FIG. 2 includes one or more robots 100, a central system 210, various infrastructure systems 220, various security systems 230, a remote access interface 240, and one or more security personnel 250, communicatively connected through the network 200. It should be noted that in other embodiments, the environment of FIG. 2 can include fewer, additional, or different components than those described herein. Each of the components of FIG. 2 can include one or more computer systems, custom hardware or electronic systems, or any other system configured to enable the components of FIG. 2 to perform the functions described herein.

The environment of FIG. 2 can include any number of robots 100, for instance 1, 2, 10, or more. For example, the environment of FIG. 2 can include one or more buildings, and can include one or more robots per building (for instance, one robot per building floor). One or more security personnel 250 (for instance, one or more robot operators) can control or monitor the robots, and can adjust a robot deployment as needed (for instance, by allocating additional robots to a building floor on which a security violation is detected). It should be noted that as used herein, "security personnel" can refer to remote or on-site robot operators, remote or on-site security system operators (e.g., individuals monitoring security cameras), on-site security guards, police personnel, building managers, or any other suitable individuals.

The central system 210 can be a central server or other computing system configured to provide instructions to the robots, to receive information from the robots, to access data corresponding to the robots or the other components of FIG. 2, to display the received information or accessed data (for instance, to a user of the central system), to perform one or more other functions as described herein, and to provide a communicative interface between, via the network 200, the robots and other components of FIG. 2. The central system is described in greater detail below.

The infrastructure system 220 (or infrastructure systems) can include one or more components of a building or environment in which the robots 100 are located. In some embodiments, the infrastructure systems are communicatively coupled to the network 200 or are otherwise capable of communication with the robots. Examples of system infrastructure systems include smart doors and windows, elevators, routers and other network components, power systems, smart lights, smart fire alarms and other sensors, connected furnace or air conditioning systems, "Internet of things" or IoT systems, and the like. In some embodiments, the infrastructure systems aren't capable of communication with via the network 200 or otherwise, for instance disconnected doors and windows, disconnected elevators, thermal vents, and the like. The infrastructure systems of FIG. 2 are described in greater detail below.

The security system 230 (or security systems) can also include one or more security components of a building or environment in which the robots 100 are located. Examples of security systems can include camera systems, access gates, door or window locks, audio detectors, motion detectors, security interfaces or displays, and the like. The security systems can be configured to communicate with the network 200 and/or robots, or may be disconnected systems (alarms that do not communicate and that must be manually reset). The security systems of FIG. 2 are described in greater detail below.

The remote access interface 240 is a computing system, such as a computer, a server, a phone or other mobile device, or any other system that enables a use to remotely access the network 200, and via the network, to interact with one or more other components of the environment of FIG. 2. For instance, a user can remotely access information via the remote access interface provided by the robots 100 to the central system 210, such as a video feed captured by one or more robots. Likewise, a user can remotely provide instructions to the infrastructure systems 220, security systems 230, and/or the robots via the remote access interface, for instance to investigate an unauthorized access of a portion of a building, to lock doors within the vicinity of an alarm, or to scan RFID tags for products within a portion of a store. The remote access interface can include a display for displaying information related to one or more components of FIG. 2, an input mechanism for receiving interactions from a user of the remote access interface, and a communicate interface enabling the remote access interface to communicate via the network 200. It should be noted that in some embodiments, the remote access interface can be implemented within hardware located remotely from the central system, the robots, or the other components of FIG. 2, for instance within a different building or on a different floor from the other components of FIG. 2.

The security personnel 250 can include guards located at guard stations, patrolling guards, access gate guards, or remote security personnel. For instance, the security personnel can include one or more robot operators configured to monitor and control the actions or movements of the robots 100. Robot operators can interact with robots via the central system 210 or via the remote access interface 240, and also direct other security personnel as needed (for instance, by instructing security personnel to investigation a security violation detected by the robots).

The network 200 may be the Internet, a local area network (such as a building-wide or site-wide network), a wireless network, a mesh network, or any other network or combination thereof that allows communication between the components of FIG. 2. The connecting network 200 may use standard communications technologies and/or protocols, such as WiFi, Bluetooth, LTE, cellular networks, and the like.

Figure 3:
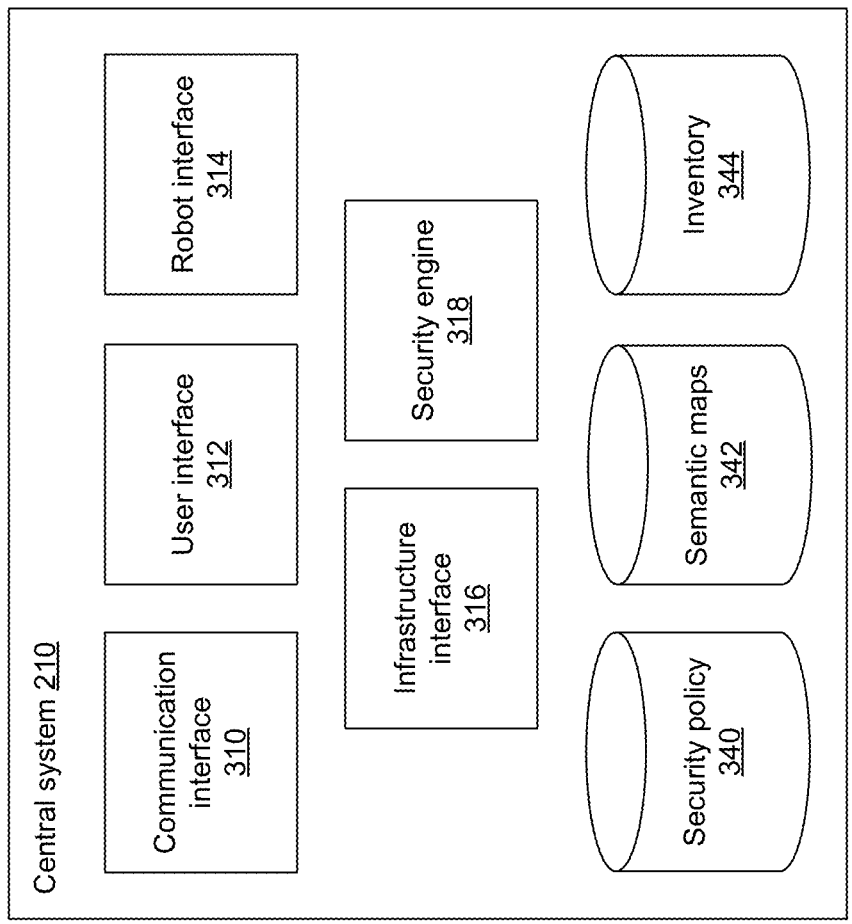
FIG. 3 is a block diagram of the central system of FIG. 2, according to one embodiment.

FIG. 3 is a block diagram of the central system of FIG. 2, according to one embodiment. The central system 210 of FIG. 2 includes a communication interface 310, a user interface 312, a robot interface 314, an infrastructure interface 316, a security engine 318, a security policy storage module 340, a semantic maps storage module 342, and an inventory storage module 344. In other embodiments, the central system includes fewer, additional, or different components than those described herein.

The communication interface 310 is configured to provide a communicative interface between the components of the central system 210 and the other components of FIG. 2. For instance, the communication interface enables the transfer of data between robots 100 and the central system. The communication interface can provide instructions or data to one or more infrastructure systems, security systems, or robots, for instance in response to a user command or during the performance of one or more security operations.

The user interface 312 is configured to enable a user of the central system 210 (such as a security personnel 250 or a robot operator) to interact with the central system. For instance, the user interface can include a graphical user interface (or GUI) displayed on hardware corresponding to the central system. The GUI can include video streams from one or more security cameras; can include a location of one or more robots 100 or objects overlaid on a map of a building, floor, or site; can include data corresponding to one or more infrastructure systems; and the like. The user interface can enable a user of the central system to provide one or more instructions or commands or otherwise interact with one or more components of the environment of FIG. 2, to configure or otherwise interact with one or more components of the central system, and to access and view data associated with one or more components of the environment of FIG. 2. The user interface, and GUIs associated with the user interface, are described below in greater detail.

The robot interface 314 is configured to enable the central system 210 (or a user of the central system) to interact with one or more robots 100. For instance, the robot interface can receive data from the one or more robots 100 via the communication interface 310 for display on the user interface 312. The robot interface can also provide data to the one or more robots via the communication interface, for instance in response to a command received from a user via the user interface. The robot interface can format data provided to and received from the robots into a format compliant with the robots and central system, respectively. The data received from, the instructions provided to, and the functions of the robots are described below in greater detail.

The infrastructure interface 316 is configured to enable the central system 210 (or a user of the central system) to interact with one or more infrastructure systems 220 via the communication interface 310. For instance, the infrastructure interface can lock one or more doors within a building, can cut power to a portion of a floor, and store received inventory information. Likewise, the security engine 318 is configured to enable the central system or a user of the central system to interact with one or more security systems 230 via the communication interface. For instance, the security engine can direct video cameras to a location within a building and receive footage from the cameras, can receive badge data from badge readers, and direct security personnel 250 to a building portion where motion was detected. The security engine can also implement one or more security policies or security operations, either independently from or at the direction of a user of the central system. Security policies and operations are described below in greater detail.

The security policy storage module 340 stores one or more security policies for implementation by the central system 210. A security policy can identify:
- portions of a building or floor, individuals who are authorized to access those portions, permitted times of access, and requisite security credentials
- times that particular doors, windows, and access gates are to be locked and unlocked
- routes or paths through buildings or floors for one or more robots 100 to patrol and corresponding times for patrol
- times of activation for security cameras, audio detectors, and motion detectors
- violations of security policies and the thresholds and conditions that trigger a security policy violation
- operations to be performed (by robots, security personnel 250, or infrastructure or security systems) in the event of a detected violation of a security policy
- communications and data from the components of FIG. 2 to be presented to a user of the central system The semantic maps storage module 342 can store one or more semantic maps, for instance semantic maps generated by robots 100. The user interface 312 can access and display one or more semantic maps to a user of the central system 210, and one or more components of the central system can update the displayed semantic map for subsequent storage in the semantic maps storage module in response to receiving information from one or more robots, security personnel 250, or any other component of FIG. 2. For instance, if a semantic map indicates that a window is open, and a robot patrolling within proximity of the window detects that the window has subsequently been closed, the semantic map can be updated (for instance, by the infrastructure interface 316) to reflect the closed status of the window and the updated semantic map can be stored in the semantic maps storage module.

The inventory storage module 344 stores information associated with objects within a building, within a floor, within a room or store, and the like. For instance, the inventory storage module can include a database detailing types of inventory, stock levels associated with each inventory type, and a location of each inventory object within a building. The inventory storage module can be updated, for instance, in response to receiving information from a robot 100 indicating that the location of one or more objects within a store has changed, that a missing object has been found, or that objects have been misplaced or lost. It should be noted that the inventory module can store locations, numbers, and types of objects in addition to retail objects or stock, for instance lab equipment, books or other reference materials, and the like. The inventory storage module can additionally store a status for objects (for instance, "misplaced", "lost", "stolen", "broken", "operational", and the like).

Figure 4:
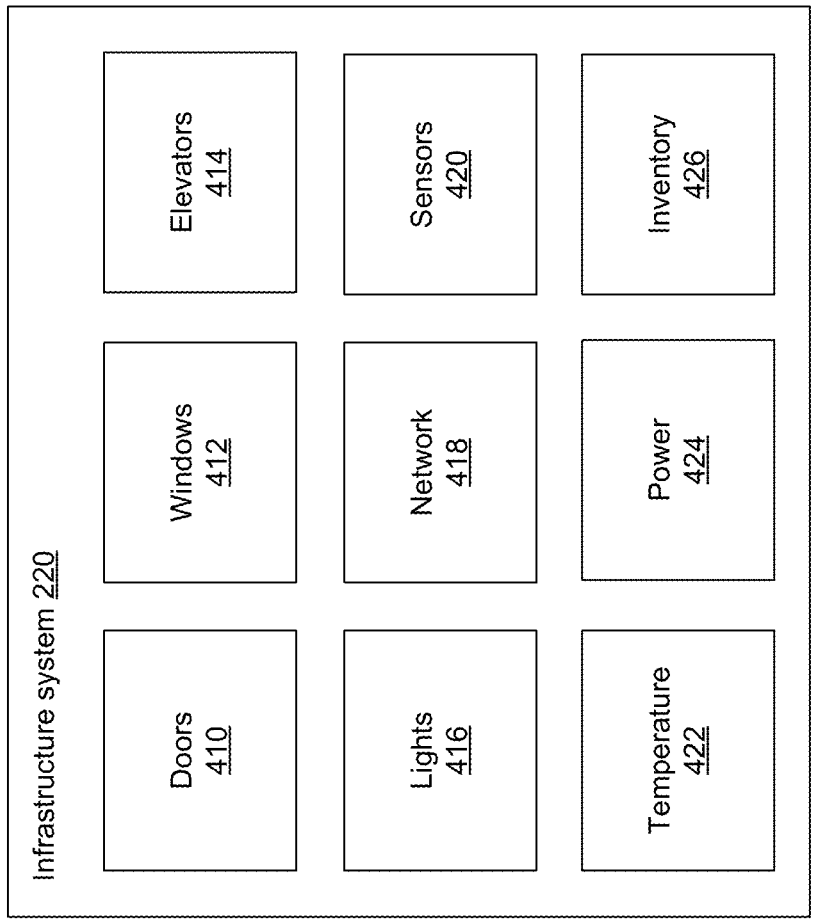
FIG. 4 is a block diagram of the infrastructure system of FIG. 2, according to one embodiment.

FIG. 4 is a block diagram of the infrastructure system of FIG. 2, according to one embodiment. In the embodiment of FIG. 4, the infrastructure system 220 includes doors 410, windows 412, elevators 414, lights 416, a network 418, sensors 420, temperature system 422, power system 424, and inventory 426. It should be noted that in other embodiments, the infrastructure system can include additional, fewer, or different components than those illustrated here.

The doors 410 and windows 412 of a building can be standard, disconnected, and/or non-electronic doors and windows. Alternatively, the doors and windows can be electronic and/or connected to other building infrastructure, for instance via the network 200. In embodiments where the doors and windows are electronic, a user of the central system 210, a robot 100, or a security personnel 250 can close, open, lock, or unlock the doors and windows, for instance manually (by the security personnel or robot) or electronically (by directly interfacing with the electronic subsystems of the doors and windows, or by providing instructions to the doors and windows via the network).

The elevators 414 can include one or more elevator within a building. The elevators can be connected to one or more components of the environment of FIG. 2, for instance the central system 210, or can be disconnected from the components of the environment. Instructions can be provided to the elevators, for instance by a user of the central system, a security personnel 250, or a robot 100 via the network 200 or directly to the elevator via an elevator interface, or manually, via a physical button press by the security personnel or the robot. Elevator instructions can include but are not limited to instructing the elevator to go to a particular floor (such as the floor a robot is on), stopping or disabling the elevator, opening and closing the elevator doors, controlling one or more elevator components (such as a speaker or display within the elevator), and the like.

The lights 416 can include various lighting systems within a building, for instance lights within particular rooms, on particular floors, or building-wide. The lights can be connected to other building systems, for instance via the network 200, and can be remotely activated or deactivated (for instance by a user of the central system 210 or a robot 100) or manually activated or deactivated (for instance by security personal 250 or a robot toggling a light switch or interface).

The network 418 can include networking infrastructure within a building or portion of a building, or across multiple buildings or locations. The network can include standard networking systems, such as routers, switches, severs, transceivers, and the like. The network can be connected to the other components of FIG. 2 via the network 200. A user (via the central system 210) or robot 100 can activate, deactivate, reset, or configure portions of the network. For instance, a robot, in response to determining that a portion of a wireless network within a building is currently down, can re-locate to a location within the building where the wireless network is active, and can instruct the central system to reset network systems corresponding to the non-functioning portion of the network.

The sensors 420 can include fire alarms, smoke detectors, carbon monoxide detects, gas or toxin detectors, thermometers, and the like. Information from the sensors can be provided to the central system 210, for instance directly via the network 200 or via a robot 100.

The temperature system 422 can include a furnace, air conditioning unit, fans or other air flow systems, thermal ductwork and corresponding control mechanisms (such as valves), and other systems associated with building temperature. Instructions can be provided to the temperature system, for instance from a user of the central system 210 via the network 200 or from a robot 100 (either via the network or by directly connecting to the temperature system). Example instructions include but are not limited to lowering the temperature or raising the temperature for an entire building or for building portions, increasing air flow, controlling one or more duct valves, and the like. Information can also be received from the temperature system by the central system, a robot, or by another component of FIG. 2. Examples of such information include power usage information, thermal information, system activity or capacity, and the like.

The power system 424 can include power infrastructure associated with a building. For instance, the power system can include one or more generators, feeds from an external power source, solar panels, breakers, power distribution units, power lines within and external to a building, meter boxes, robot recharge stations, vehicle recharge stations, and the like. In some embodiments, the power system is communicatively coupled to one or more components of FIG. 2, such as the central system 210, via the network 200. In such embodiments, a user of the central system, a security personnel 250, and/or a robot 100 can provide instructions to the power system via the network, for instance to deactivate a portion or all of a building's power infrastructure, to reset portions of the power infrastructure, to reset breakers, to turn generators on or off, and the like. The power system can also provide information to components of FIG. 2, for instance information detailing power usage within a building, within portions of a building, by components of a building, or information detailing power production or fuel usage by solar panels, generators, and the like.

The inventory 426 includes objects within a building, portion of a building, store, room, or other area. Examples of inventor include store inventory (objects for sale within the store), building equipment (such as lab equipment, computer equipment, and the like), sensitive objects (such as high security objects, expensive objects, and the like), vehicles, and the like. The inventory of a building can include tags or other receivers/transmitters (such as RFID tags) that can identify the object to which the tag is affixed to a system capable of reading the tag. Each object can include a unique identifier that is transmitted to a reader system, and, as described below, a robot 100 equipped with one or more RFID readers can identify and locate inventory within a building or building portion by navigating within a proximity to the corresponding object.

Figure 5:
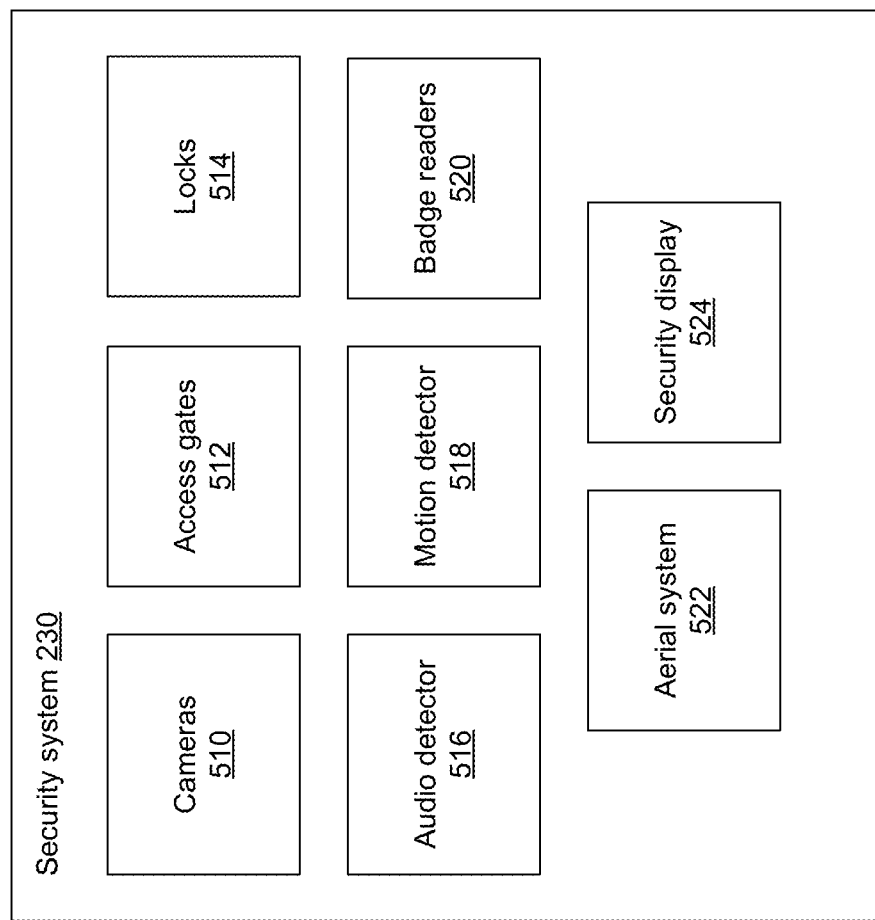
FIG. 5 is a block diagram of the security system of FIG. 2, according to one embodiment.

FIG. 5 is a block diagram of the security system of FIG. 2, according to one embodiment. In the embodiment of FIG. 5, the security system 230 includes cameras 510, access gates 512, locks 514, audio detectors 516, motion detectors 518, badge readers 520, aerial systems 522, and security displays 524. In other embodiments, the security system can include additional, fewer, or different components than illustrated herein. It should be noted that while many components of the security system can be disconnected from the other components of FIG. 2, the remainder of the description herein will be limited to embodiments in which the components of the security system can communicate via the network 200 (for instance, with the central system 210 or the robots 100).

The cameras 510 can be located within or external to a building, for instance within high-trafficked passages, high-security rooms or locations, locations corresponding to advantageous vantage points, and the like. In some embodiments, the field of view of a camera is fixed, while in other embodiments, the cameras can rotate, pan, tilt, or track objects or individuals, for instance in response to an instruction from a user of the central system 210 or in response to the detection of a suspicious noise or detected motion. The cameras can record video for storage and subsequent viewing or processing, or can stream the video to the central system or a robot 100. In some embodiments, the cameras can identify objects or individuals within video captured by the cameras and can provide this information to other components of FIG. 2, while in other embodiments, the central system identifies objects or individuals within video provided by the cameras, and provides this information to other components of the FIG. 2.

The access gates 512 can include physical barriers (such as barrier arms, walls, doors, and the like) configured to prevent or inhibit the movement of individuals, vehicles, or other objects. The access gates can allow individuals or vehicles to pass through in response to verifying that the individuals or vehicles are authorized to pass, for instance in response to verifying an individual's or vehicle's credentials or access permissions. In some embodiments, a robot 100, a user of the central system 210, or the central system itself can activate an access gate to allow or prevent individuals or vehicles from passing through, for instance in response to an instruction from the user or robot, or in response to a detected security violation or suspicious activity elsewhere within a vicinity of the access gate.

The locks 514 can be located within doors, windows, cabinets, cupboards, safes, or within any other suitable building infrastructure or object. The locks can be activated or deactivated by instructions from a robot 100, a user of the central system 210, or by the central system itself, for instance via the network 200. The locks can also be activated in response to the occurrence of a security violation or suspicious activity within a proximity of the locks.

The audio detector 516 is configured to detect audio signals, and to provide information describing the detected audio to one or more components of the environment of FIG. 2. Likewise, the motion detector 518 is configured to detect motion within a proximity of the motion detector, and to provide information describing the detect motion to one or more components of the environment of FIG. 2. For example, the audio detector can provide detected audio signals to the central system 210 for analysis, and the central system can determine if the detected audio signals are representative of a security violation. Likewise, the motion detector can provide detected motion signals to the central system, which can determine if the detected motion signals are representative of a security violation.

The badge readers 520 are configured to detect ID badges of individuals, to authenticate the identity, access credentials, or permissions of the individuals. The badge readers can provide information associated with the detected badges to components of the environment of FIG. 2, for instance via the network 200. The badge readers can include RFID readers, badge scanners, or any other suitable hardware. In some embodiments, badge readers are associated with doors, access gates, and the like such that an individual authenticated by the badge reader is granted access to the door, access gate, and the like.

The aerial systems 522 include one or more unmanned aerial vehicles (UAVs) configured to fly within a space (such as a building floor, parking lot, and the like). The aerial systems can receive instructions from components of FIG. 2, such as the central system 210 or a robot 100. The aerial systems can be instructed to patrol a particular area, for instance in response to a detected security violation or detected suspicious activity. The aerial systems can include cameras, RFID readers, or other sensors configured to capture information detected by the aerial systems and to provide the captured information to the central system, the robots, or other components of FIG. 2. Aerial systems are described below in greater detail.

The security displays 524 are configured to display security information to individuals, such as a security status of a building or building portion, indications of security violations, and access credentials required to be in a particular location. The displayed security information can be received from the central system 210, from a robot 100, or from any other component of FIG. 2. The security displays can include hardware displays, and can be, for instance, tablet computers or interactive monitors. The security displays can be mounted within walls or other accessible locations. The security displays can receive inputs from individuals, for instance via a touch-screen interface of the security display or via any other suitable input mechanism. For instance, an individual can request access to a building portion, can request a door be unlocked, can request authentication, and the like via the security displays. The security displays can provide information describing the received inputs to the central security system or to any other component of FIG. 2, which in turn can perform a security action based on the provided information (for instance, unlocking a door or authenticating the individual).

Mobile Robot Housing

Figure 6:
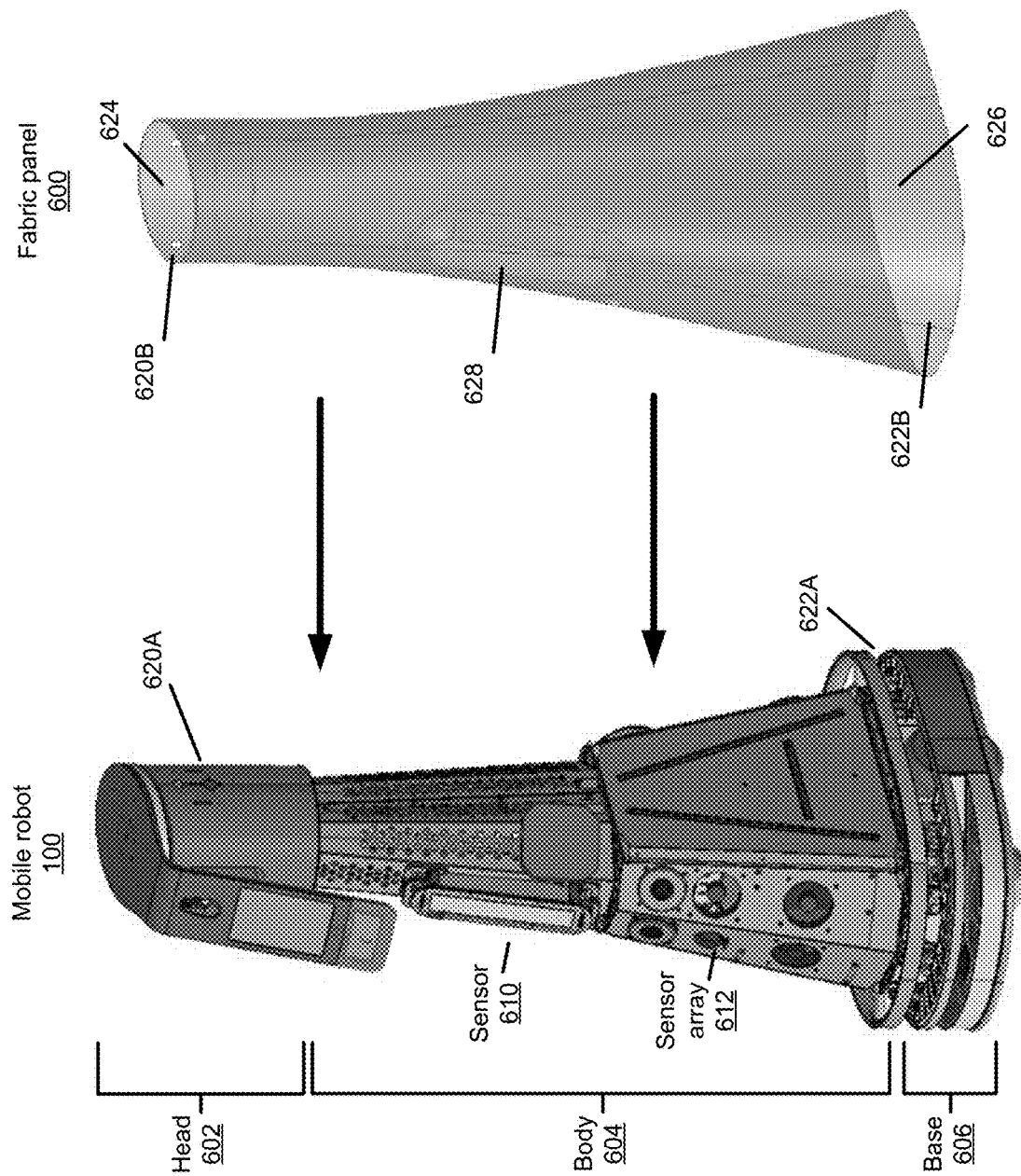
FIG. 6A illustrates a view of a mobile robot with a removed fabric exterior, according to one embodiment.
FIG. 6B illustrates a view of a removable fabric exterior for a mobile robot, according to one embodiment.

FIG. 6A illustrates a view of a mobile robot with a removed fabric exterior, according to one embodiment. The robot 100 of FIG. 6 includes a head portion 602, a body portion 604, and a base portion 606. The robot further includes a sensor 610 and a sensor array 612. As the fabric exterior is removed from the robot in the embodiment of FIG. 6A, the interior portion of the robot body is exposed. The robot also includes coupling means 620A located around the robot head and coupling means 622A located around the robot base.

FIG. 6B illustrates a view of a removable fabric exterior for a mobile robot, according to one embodiment. The fabric panel 600 includes coupling means 620B and 622B. The fabric panel also includes a top opening 624, a bottom opening 626, and a side opening 628. The circumference of the opening 624 corresponds to the circumference of the robot head, and the circumference of the opening 626 corresponds to the circumference of the robot base. Accordingly, the fabric panel is a tubular sock that can be stretched over and secured to the robot 100, thereby covering portions the interior of the robot. In some embodiments, the fabric panel is partially cone-shaped, with the diameter of the top opening being smaller than the diameter of the bottom opening, beneficially aiding in the placement of the fabric panel over the robot 100.

The fabric panel 600 can be made of any type of fabric material, for instance cotton, nylon, polyester, vinyl, velvet, or any other suitable or stretchable fabric material or blend/combination thereof. By stretching, the fabric panel of FIG. 6B can be placed over the head 602 of robot 100 (and any protrusions attached to the robot head) and any other components protruding from the robot body 604. Further, by stretching, contact made between the robot and other robots, individuals, or other objects can prevent damage to the fabric panel. It should be noted that in other embodiments, the fabric panel may include a material that does not significantly stretch.

The fabric panel 600 can include a fabric mesh material, allowing for the flow of air into and out of the robot 100, beneficially enabling the cooling of components of the robot interior by allowing for the transfer of heat out of the robot and through the fabric. Further, fabric may be semi-transparent or translucent, allowing for cameras, motion sensors, laser sensors, or other components within the robot to at least partially see through the fabric. Finally, the fabric may allow sound waves to pass through the fabric, allowing microphones or other audio components to capture sound waves passing through the fabric, and allowing speakers within the robot to transmit sound through the fabric.

The fabric panel 600 can couple to the robot 100 in a number of ways. In the embodiment of FIGS. 6A and 6B, coupling means 620B are configured to couple to coupling means 620A, and coupling means 622B are configured to couple to coupling means 622A. The coupling means 620B may be located around an inside perimeter of the top of the fabric panel, and the coupling means 622B may be located around an inside perimeter of the bottom of the fabric panel. Likewise, the coupling means 620A may be located around an outside perimeter of the robot head 602, and the coupling means 622A may be located around an outside perimeter of the robot base 606. In other embodiments, the coupling means of the fabric panel and the robot may be located in different locations on the fabric panel and the robot.

In some embodiments, the coupling means 620B and 622B include holes within the fabric of the fabric panel 600 and grommets located around the holes. Likewise, in some embodiments, the coupling means 620A and 622A include pins, latches, or other securing protrusions configured to reciprocally couple with the holes of the couplings means 620B and 622B when the holes are placed over the coupling means 620A and 620B. In other embodiments, the coupling means include buttons, zippers, Velcro, levers, buckles, or any other suitable means enabling the fabric panel to couple to the robot 100. In some embodiments, when the coupling means 620B are coupled to the coupling means 620A, and when the coupling means 622B are coupled to the coupling means when the fabric panel is coupled to the robot, the fabric of the panel is stretched and held in partial tension along the axis of the fabric panel from the opening 624 to the opening 626. The coupling means can be located on an inside surface of the fabric panel, beneficially enabling the fabric panel to couple to the robot 100 without the coupling means being visible (e.g., the coupling means may not include holes within the fabric panel, allowing for a seamless/holeless fabric exterior). In some embodiments, the coupling means include elastic bands (for instance, around an inside surface of the fabric panel adjacent to or within a threshold distance of the openings 624 and 626) that secure the fabric panel to the robot by tightening around reciprocal grooves within the head, body, and/or base. Such elastic bands can beneficially improve the ease of coupling the fabric panel to the robot, and can enable an installer to quickly align the fabric panel on the robot during installation by allowing the installer to move the fabric panel over the robot until the elastic bands snap into the reciprocal grooves.

While the fabric panel 600 covers certain sensors of the robot 100 when the fabric panel is coupled to the robot, such as the sensor array 612, the fabric panel can include one or more openings enabling other components of the robot to be exposed/not covered by the fabric. For example, the opening 628 corresponds to the sensor 610 such that when the fabric panel is coupled to the robot, the opening 628 is secured around the sensor 610 thereby exposing the sensor. Although only one opening is shown within the side of the fabric panel in the embodiment of FIG. 6B, in other embodiments, any number of openings can be included corresponding to any number of types of components of the robot. For instance, the robot body 604 can include cameras or other sensors that can be impaired by fabric, and the fabric panel can include openings to prevent such components from being covered by the fabric.

Although the fabric panel 600 of the embodiment of FIG. 6B is shown without an underlying structure, in some embodiments, the fabric panel can include a structure or skeleton to preserve the form or shape of the fabric panel. For instance, the fabric panel can include a first ring component along an inside perimeter of the opening 624 and a second ring component along an inside perimeter of the opening 626. The structure or skeleton of the fabric panel in such embodiments can be rigid or flexible.

In some embodiments, instead of one fabric panel 600 that secures around an entire exterior of the body 604 of the robot 100, several fabric panels can each be secured to a portion of a robot exterior. For instance, a first panel can secure to a left side exterior of the robot and a second panel can secure to a right side exterior of the robot. In such embodiments, each fabric panel can include an outside ring structure located around an outside perimeter of the panel.

The fabric panel 600 illustrated in FIG. 6B and described herein can be coupled to the robot 100 and subsequently removed from the robot. Such embodiments beneficially allow for the efficient and low-cost replacement of fabric panels, for instance in the event that the fabric panels get torn or damaged. Further, implementing removable fabric panels in covering the exterior of the robot allows for the branding or configuration of the fabric panels in a color, pattern, or including a logo customized by an owner or user of the robot. However, it should be noted that while removable fabric panels are described herein, in some embodiments, the fabric panels are fixedly coupled to the robot in a more-permanent fashion. It should also be noted that although fabric panels are described herein, in other embodiments, robots can have solid/rigid outer housings and perform the functions described herein.

Mobile Robot Architecture

Figure 7:
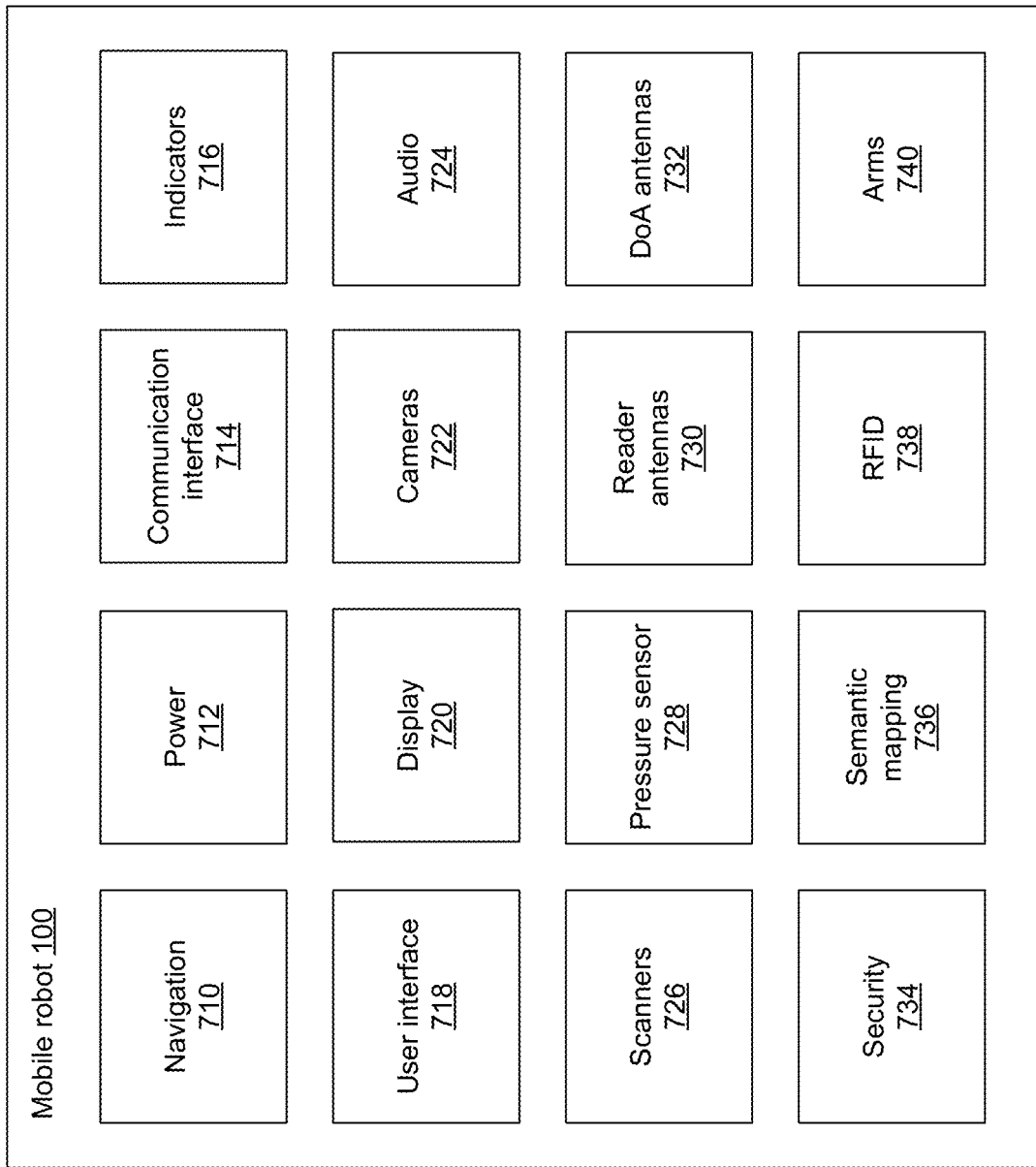
FIG. 7 illustrates a block diagram of a mobile robot architecture, according to one embodiment.

FIG. 7 illustrates a block diagram of a mobile robot architecture, according to one embodiment. The robot 100 of the embodiment of FIG. 7 includes a navigation system 710, a power system 712, a communication interface 714, various indicators 716, a user interface 718, a display 720, one or more cameras 722, an audio system 724, various scanners 726, a pressure sensor system 728, one or more reader antennas 730, one or more direction of arrival (or DoA) antennas 732, a security system 734, a semantic mapping system 736, an RFID system 738, and one or more arms 740. It should be noted that in other embodiments, a mobile robot 100 can include fewer, additional, or different components than those illustrated in the embodiment of FIG. 7. For instance, the robot 100 can include one or more hardware processors or controllers configured to perform various functionalities described herein.

The navigation system 710 is configured to move the robot 100 around a space, such as a store, a room, a floor, a building, a parking lot, or any indoor or outdoor space. The navigation system can include a motor (such as an electric motor), an engine, or any other systems capable of moving the robot. The navigation system can also include wheels, rollers, and the like configured to enable the robot to smoothly move. The navigation system can move the robot in a number of directions, for instance forwards, backwards, or sideways. In some embodiments, the base of the robot is holonomic, enabling the robot to move in any direction. In some embodiments, the navigation system can rotate the robot clockwise or counterclockwise, for instance as much as 360 degrees. In some embodiments, the navigation system can turn the robot in place, without requiring a significant (if any) turn radius.

The navigation system 710 can move the robot 100 in response to receiving navigation instructions, for instance from a user of the central system 210, from a security personnel 250, or from another robot. In some embodiments, the navigation system moves the robot as part of a patrol, routine, or security protocol. Navigation instructions can include an end location and can determine a route from a current location of the robot to the end location, for instance by detecting obstacles and/or paths from the current location to the end location, by selecting a path based on the detected obstacles and paths, and by moving the robot along the selected path until the robot arrives at the end location. In some embodiments, the navigation instructions can include a path, an ordered set of locations, an objective (e.g., "patrol the $4^{th}$ floor"), or a map, and the navigation system can move the robot based on the navigation instructions.

The power system 712 can include a power source, such as a battery, fuel, solar panels, or any other suitable source of power storage. The power system can provide power to the other components of the robot 100, such as the navigation system 710. The power system can also include a recharging system, for instance a plug/socket or other recharging interface. In some embodiments, the robot can navigate to a recharge station and can electrically couple the recharging system to the recharge station, enabling the recharge station to refill the power source of the power system. For example, the recharging system of the robot can include a socket within the robot protected by a pivoting door, and the recharge station can include a plug component. In such embodiments, the robot can navigate to the recharge station and can align the pivoting door with the plug component. The robot can then move towards the plug component such that the plug component pushes the pivoting door inward into the robot, and such that the plug component is inserted into the socket. The plug component can provide power to the power source via the socket. The power system can further include infrastructure electrically coupling the power system to the recharging interface and the other components of the robot.

The communication interface 714 can communicatively couple the robot 100 to other components of the environment of FIG. 2, such as the central system 210 or other robots, either directly or via the network 200. For instance, the communication interface can include receivers, transmitters, wireless controllers, and the like, and can receive information from and transmit information to and between components of FIG. 2 and other components of the robot. Examples of communication protocols implemented by the communication interface include WiFi, Bluetooth, Zigbee, 3G/4G, LTE, or any other suitable communication protocol. The communication interface can provide video captured by the cameras to an external monitor, or can receive instructions from an operator (for instance, via the central system).

In some embodiments, the robot 100 can choose to transmit information via the communication interface 714 based on a communicative status of the robot. For instance, in embodiments where the robot is patrolling a route within a building, the robot can transmit video and audio data captured during the patrol when the communication interface is coupled to the network 200 via a WiFi connection. In some embodiments, if the WiFi connection is lost, the robot can communicatively couple to the network via a secondary connection, such as an LTE connection. In such embodiments, the robot can modify the data sent via the communication interface before transmitting, for instance by transmitting only audio data, by performing lossy compression on the video before transmitting, by reducing the frame rate or resolution of the video before transmitting, by transmitting select images instead of video, by transmitting video data corresponding only to key events (such as video of a suspected unauthorized individual), by transmitting full-resolution video based on features within the video (such as faces) and low-resolution video otherwise, and the like. In the event of a total disconnection from the network, the robot can store information for subsequent transmission (for instance, when the communication interface is coupled to the network via WiFi or when the robot is docked at a charge station). Likewise, the robot can select data to transmit or can perform compression operations on the data before transmission if the bandwidth available to the robot falls before a threshold required to stream the data in real-time or other threshold. In some embodiments, the robot can store all detected information and data, for instance at full-resolution, for a set amount of time, until the robot's available storage capacity falls below a threshold, until the data is transmitted, until an operator instructs the robot to delete the data, or until any other suitable criteria is satisfied.

The indicators 716 can include visual indicators (such as LEDs or other lights), audio indicators, haptic indicators, vibration components, and the like. The indicators are configured to communicate information or a status associated with the robot 100 to an entity external to the robot, such as a user or individual. For instance, the indicators can include a ring of LEDs around a top surface of the robot that indicate a direction of movement of the robot. Likewise, LEDs can function as a turn signal, indicating a future direction change of the robot. The robot can also display emoji or other indicators of emotion, can display text identifying a status or current operation of the robot (e.g., "patrolling", "security alert", "danger alert", "intruder nearby", etc.) In some embodiments, lights or LEDs on the robot can change color to indicate a status of the robot (for instance, LED indicators can be green to indicate that the robot is available to assist customers, can be blue to indicate that the robot is busy performing a task, or can be red to indicate that the robot has detected a violation of a security policy). The robot also includes a hardware display 720 (such as a monitor or screen) configured to communicate information associated with the robot. For instance, the hardware display can display a map, images, a request (e.g., the text "How can I help you today?"), or any other suitable information. In embodiments where the hardware display is a touch-screen display, a user can interact with the displayed information, for instance to get additional information, to configure the display of information, to instruct the robot to perform an operation, and the like.

The robot 100 includes a user interface 718 configured to display information to an individual or user, for instance in response to a received request. In some embodiments, the user interface displays a graphic user interface ("GUI") including the information, for instance on the hardware display 720 or via the indicators 716. The GUI can display information detailing a status of the robot, information requesting credentials or other information from an individual, information providing instructions to a user (e.g., "follow me"), information associated with an environment or building in which the robot is located (e.g., store or product information), or any other suitable type of information. The user interface can also include infrastructure to enable a user or individual to interface with the robot. For instance, the user interface can include a keyboard or keyboard, one or more buttons or dials, a mouse, motion/gesture detection capabilities, and the like. In some embodiments, the user interface includes the hardware display, and the hardware display is a touch-sensitive display configured to receive inputs from an individual. Inputs received via the user interface can be provided to one or more other components of the robot, can configure the robot to perform various functions or to operate in various modes, and the like. In some embodiments, the user interface further configures a voice recognition engine configured to recognize a user's voice, enabling a user to speak to the robot (for instance, to request information, to command the robot to perform an security operation, or the like).

The cameras 722 can include any number of cameras or camera arrays. For example, the cameras can include cameras configured to capture images or videos directly or a distance in front of the robot, to the sides of the robot, behind the robot, or above the robot. In some embodiments, the cameras can move, pivot, tilt, pan, or rotate, for instance in response to a change in motion by the robot, in response to an instruction received by the robot, in response to detecting an object within a proximity of the robot, or in response to the performance of a security or other function by the robot.

The cameras 722 can capture images and video at any suitable resolution or frame rate. In some embodiments, an array of fixed cameras can capture video 360 degree video around the robot 100, while in other embodiments, one or more cameras can rotate around a central axis of the robot to capture 360 degree video. In some embodiments, camera pairs can capture 3D video, and in some embodiments, images or video captured by multiple cameras can be stitched together using one or more stitching operations to produce a stitched image or video. In addition to capturing images or video in the visible light spectrum, the cameras can capture images within the IR spectrum or can capture thermal images. Images and videos captured by the cameras can be provided to one or more other components of the environment of FIG. 2, for instance the central system 210 via the communication interface 714 and the network 200, beneficially enabling a remote operator of the robot to see the surroundings of the robot.

The audio system 724 can include components to capture and emit audio signals. For instance, the audio system can include one or more microphones configured to capture audio signals, such as audio signals that pass through the fabric panel 600 of the robot 100. Likewise, the audio system can include speakers configured to playback audio or sound to individuals within a proximity of the robot. In some embodiments, audio captured by the audio system can be provided to a component of FIG. 2, such as the central system 210 via the network 200 and the communication interface 714, beneficially enabling a remote operator of the robot to hear audio occurring within a proximity of the robot. Likewise, audio can be received by the audio system from an external entity for playback by the audio system, for instance voice commands from an operator of the robot to an individual within a proximity of the robot.

The scanners 726 can detect objects, obstacles, paths, or individuals within a proximity of the robot 100. Examples of scanners include laser scanners or rangefinders, radar, sonar, ultrasonic sensors, motion detectors, 3D depth sensors, thermal scanners, infrared or ultraviolet scanners, and the like. One or more scanners can be located near a base of the robot, for instance to identify objects that might obstruct or disrupt movement of the robot. One or more scanners can be located near a top of the robot, for instance to identify the immediate surroundings of the robot, beneficially enabling the robot to "see" over objects that might otherwise obstruct the viewpoint of scanners located near the base of the robot. In addition to detecting obstacles, objects, and individuals, the scanners can track moving objects or individuals, for instance to follow the movement of suspicious individuals. In some embodiments, information captured by the scanners is used by the navigation system when selecting a path of motion for the robot. Likewise, information captured by the scanners can be used by or provided to other components of the robot or an entity external to the robot (such as a component of FIG. 2), for instance via the communication interface 714.

The pressure sensor 728 can include a pressurized tube located around a base of the robot 100, and can detect objects or other obstructions within an immediate proximity of the robot in response to a determination that the robot has run into the object or obstruction. For instance, a robot can move down a hallway, and can inadvertently run into an individual's foot. In response to the contact with the user's foot, the pressure inside the tube increases, and the pressure sensor can detect the increase in pressure and determine that the robot has made contact with an obstruction.

In response to a detected increase in pressure within the pressurized tube, the pressure sensor 728 can determine that the robot 100 has come into contact with an obstruction, and can slow or stop the motion of the robot, for instance by instructing the navigation unit 710. The pressure sensor can determine the direction of the obstruction based on the current direction the robot was moving at the time of the detected pressure increase. In some embodiments, the pressure sensor includes a protective outer housing that, upon contact with an obstruction, exerts a reciprocal pressure on the pressurized tube for detection by the pressure sensor. The pressure sensor enables the robot to immediately detect contact with an obstruction and adjust a trajectory or movement of the robot, beneficially reducing the risk that the contact can cause damage or harm to the robot, an object, or an individual.

In some embodiments, the pressure sensor 728 can measure an amount of pressure exerted upon the pressurized tube. In such embodiments, the robot 100 can use the pressure sensor to apply an amount of force upon an object. For example, the robot may want to gently push open a door, and can move into the door until the pressure sensor detects that ten pounds of pressure are being exerted upon the pressurized tube. By measuring the amount of force applied by the robot onto an object using the pressure sensor, the robot can beneficially limit the amount of force applied to the object in order to reduce the risk that the application of force by the robot damages the object.

The robot 100 can include one or more reader antennas 730 configured to receive signals from entities external the robot (such as components of the environment of FIG. 2). The reader antennas can include any type of antenna, such as an RFID reader antenna, WiFi antennas, radio antennas, and the like. The robot can also include one or more DoA antennas 732 configured to determine a direction from which a signal is received. The reader antennas and the DoA antennas can be part of the communication interface 714, and information captured by the reader antennas and the DoA antennas can be provided to one or more components of the robot, or one or more entities external the robot (such as the central system 210). The capture of RFID signals and the determination of an angle or direction from which the captured RFID signals are received are described below in greater detail.

The security system 734 configures the robot 100 to perform one or more security operations. For instance, the security system can configure the robot to investigation a suspicious sound, to obstruct the movement of an unidentified individual, or patrol a portion of a building. The security system can instruct other components of the robot during the performance of security operations, for instance by capturing video of an unidentified user using the cameras 722. The security system can receive instructions to perform the one or more security operations, and/or can receive information associated with one or more security protocols via an external source, such as the central system 210 or the security system 230. Likewise, the security system can provide information associated with the context, surroundings, or activity of the robot, or information associated with the performance of a security operation to an entity external to the robot. The security operations performed by the security system are described in greater detail below.

The semantic mapping system 736 is configured to generate or update a semantic map associated with a location or setting in which the robot 100 is located. For instance, the semantic mapping system can generate a map associated with a patrol route through a building floor as the robot moves through the space. The location of obstructions, and paths within the building floor can be detected by the scanners 726 and recorded onto the semantic map. Likewise, objects can be detected during the robot's movement (for instance, by the cameras 722), and information describing the detected objects and the location of the detected objects can be included within a semantic map. Semantic maps generated or updated by the semantic mapping system can be provided to an entity external to the robot, for instance the central system 210, for storage and/or subsequent use. The generation of semantic maps by the semantic mapping system is discussed in greater detail below.

The RFID system 738 can identify RFID tags within a space and determination the location of the identified RFID tags. For instance, for store inventory objects, each tagged with an RFID tag, the RFID system can, during the course of movement within a proximity of the objects, detect the presence and location of the RFID tag (and thus, the object to which the RFID tag is coupled). The detected RFID tags and corresponding objects can be mapped onto a semantic map, and/or information associated with the detected RFID tags and the locations thereof can be provided to an entity external to the robot 100, such as the central system 210, for subsequent storage. In some embodiments, the RFID system can include short-range RFID readers capable of reading LF RFID or HF RFID tags from within a threshold distance, while in other embodiments, the RFID system can include long-range RFID readers capable of reading UHF RFID tags from greater than the threshold distance away but within a greater, second threshold distance. It should be noted that the RFID system can also read other types of tags according to the principles described herein, including NFC tags or devices, BLE tags or devices, and the like. The RFID system is described below in greater detail.

Figure 8:
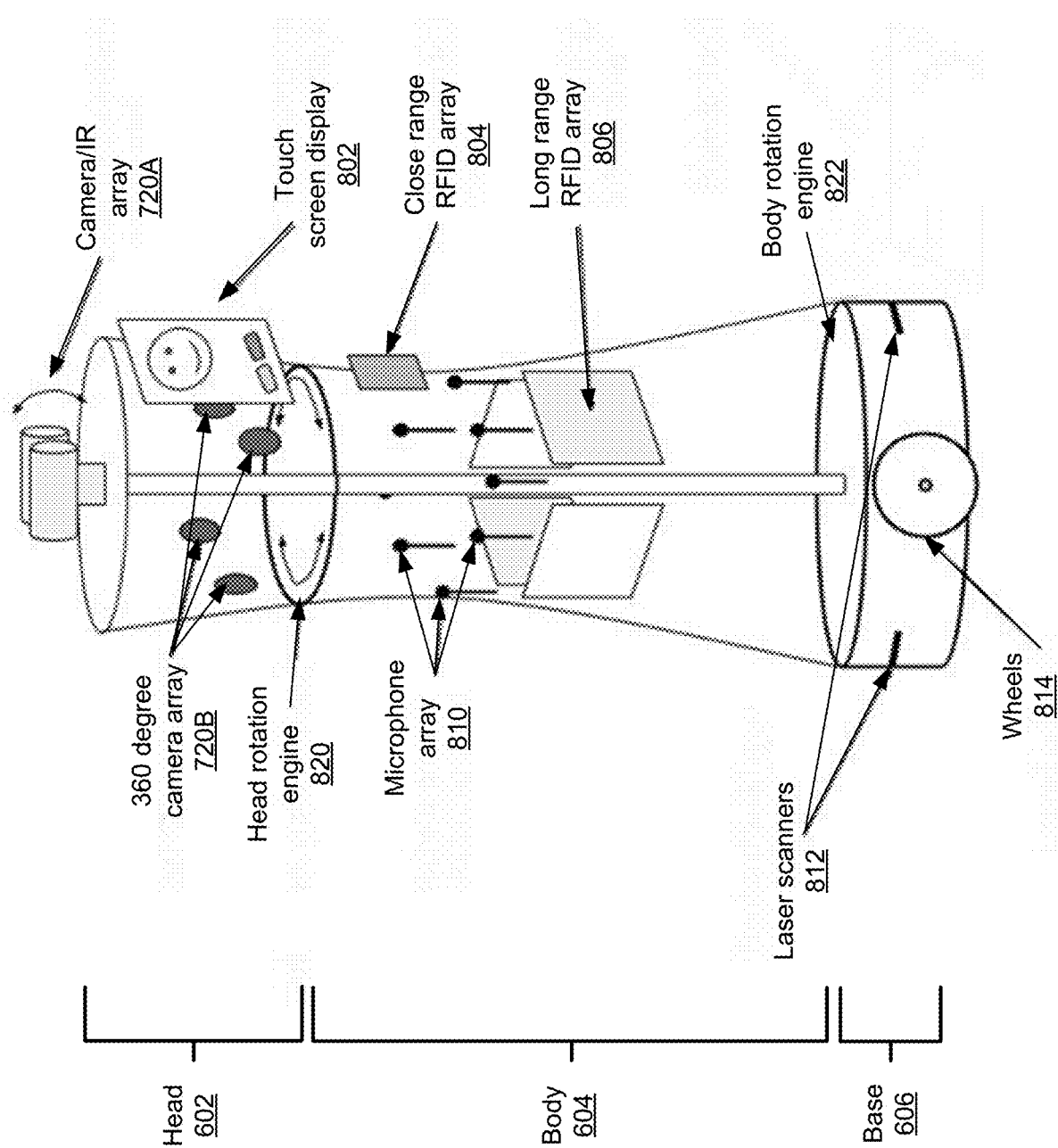
FIG. 8 illustrates a view of an example mobile robot and various robot components, according to one embodiment.

FIG. 8 illustrates a view of an example mobile robot and various robot components, according to one embodiment. The robot of FIG. 8 includes a head 602, a body 604, and a base 606. In the embodiment of FIG. 8, the head can rotate relative to the body without otherwise requiring rotation or movement by the robot via the head rotation engine 820. Enabling the head to rotate independently of the rest of the robot can beneficially enable the robot to rotate components coupled to the head, such as the camera/IR array 720A, the 360 degree camera array 720B, and the touch screen display 802. In other words, by rotating the head, the cameras and display of the robot of FIG. 8 can face different directions, allowing the cameras to capture video from a different field of view and allowing the robot to turn the touch screen display such that it faces an individual within a proximity of the robot.

In the embodiment of FIG. 8, the body 604 of the robot 100 can similarly rotate relative to the base 608 via the body rotation engine 822. Enabling the body 604 to rotate independently of the base can beneficially enable components coupled to the body to rotate, such as the close range RFID antenna array 804, the long range RFID antenna array 806, and the microphone array 810. In such embodiments, the antenna and microphone arrays can capture or detect signals from different directions, beneficially enabling the robot to optimize the angle of the antenna and microphone arrays relative to the signals captured or detected.

The base 608 of the robot 100 can similarly rotate, for instance using the navigation system 710. Rotating the base beneficially enables the robot to face different directions, to adjust an angle or trajectory of the robot, and the like. Likewise, rotating the base also rotates the laser scanners 812, beneficially enabling the laser scanners to scan in different directions. It should be noted that in some embodiments, the base can rotate while the body and 604 and head 602 of the robot do not rotate. For instance, the base can rotate 90 degrees counterclockwise, and the body can synchronously rotate 90 degrees counterclockwise, resulting in a rotation of the base 90 degrees relative to the floor without the rotation of the body and head relative to the floor.

The robot 100 can also include additional components not illustrated in the embodiments of FIGS. 7 and 8. For instance, the robot can include one or more projectors configured to project an image onto a floor or surface within a proximity of the robot. For example, the projectors can project a navigation symbol (such as an arrow) onto the floor to indicate to a user that the user should proceed in a particular direction indicated by the navigation symbol. Likewise, the projector can indicate a status or instruction, for instance instructing an individual to present a badge, presenting an indication that the user was authenticated or that the authentication failed, instructing the individual to stop moving, asking the individual if they need assistance, highlighting a requested product or object, and the like. The projectors can further project text, pictures, or icons associated with the robot or security information. For example, if a robot is guarding a passageway to prevent unauthorized users from entering the passageway, the robot can project a stop sign along with text indicating that the passageway is closed. The robot can also include a laser pointer, for instance to indicate a location of a product within a store.

The robot 100 can include one or more arms 740 for interacting with objects or individuals within a proximity of the robot. The arm can be an extendable boom arm, for instance that folds up against or retracts into the robot body when not in use. The robot arms can be used for instance to receive an object from or present an object to an individual, to press an elevator button, to move an object, to open or close windows or doors, to lock or unlock windows or doors, and the like. In some embodiments, a robot arm can include a camera, RFID reader, or other sensor. In such embodiments, the robot arm can be positioned or extended in order to provide a better position or vantage point for the camera, RFID reader, or other sensor. For example, an extendable robot arm equipped with a camera can be extended to capture video on the other side of an obstruction or wall, or to capture video of an area or crowd from a better vantage point. In embodiments where a robot arm is extended, the robot may reposition or balance itself to compensate for the shift in the center of gravity of the robot, for instance using inertial sensors (such as 3-axis gyroscopes, accelerometers, or magnetometers).

The robot 100 can also include one or more of: a spotlight or other lighting system for illuminating a room or area, strobe lights or other flashing lights to ward off intruders or otherwise deter particular behaviors of individuals, GPS receivers, sirens or alarms (which may be included within the audio system 724), beacon components configured to alert other robots, non-lethal deterrent components (such as tasers, tranquilizers, nets, tear gas, and the like), force or torque sensors (to detect the position and strength of contact between the robot and the environment or individuals within a proximity of the robot), civilian or police radios, fire extinguishers, emergency/assistance buttons or other interfaces (that enable users to call for help), emergency stop buttons or other interfaces (that enable users to immediately stop the movement of the robot), temperature sensors, light sensors, chemical/gas sensors, actuators configured to move any other components of the robot, or any other suitable components.

It should also be noted that the robot 100 includes component necessary to communicatively couple and control the components of the robot, including but not limited to: on-board computers, controllers, and processors; electric circuitry (e.g., motor drivers); computer memory; storage media (e.g., non-transitory computer-readable storage mediums, such as flash memory, hard drives, and the like); communication buses; cooling or heat dissipation systems; and the like.

Security Functions

As illustrated in the environment of FIG. 2, a set (or fleet) of robots can be deployed within a particular space, such as a building, a building floor, a campus, and the like. The set of robots 100 can be controlled by one or more robot operators, for via the central system 210 or the remote access interface 240, and can perform various security operations, for instance to augment existing security systems. For instance, an operator can directly instruct robots to perform various security operations via the robot interface 314 of the central system, or can implement one or more security protocols that include the performance of security operations by robots via the security engine 318. Likewise, a robot can perform one or more security operations, for instance in response to receiving an instruction from an operator or from the central system. A robot can receive instructions to perform security operations from the security system 734, for instance autonomously (without explicit instructions from an operator or other external entity) during the normal course of operations, for instance as part of a patrol routine, or in response to detecting suspicious activity or other circumstances that trigger one or more criteria for performing security operations.

The security operations described below can be combined with additional security operations. For instance, during the performance of any of the security operations below, a robot 100 can perform one or more of the following operations: warning one or more individuals, obstructing the movement of one or more individuals, reporting individuals or suspicious activity to an operator or security personnel 250, reporting security violations or object/infrastructure status to an operator or security personnel, recording or streaming video to an operator or external entity, locking doors or windows, sounding or triggering an alarm, calling the police or fire department, using non-lethal force to incapacitate an individual, querying one or more database to identify an individual or object, disabling a network or power to a portion of a building, summoning additional robots to assist with the performance of security operations, tracking or following an object or individual, displaying a status or information associated with security or detected activity, requesting information or credentials from individuals, and the like.

As used herein, "suspicious activity" can refer to the identification of an unknown individual, an unauthorized individual, an individual performing an unauthorized or unusual activity, movement in areas or at times when movement is not expected, unusual network activity, sound in areas where sound is not expected, types of sound associated with security risks, objects in unexpected or unauthorized locations, unlocked or open doors or windows at unauthorized times, or any other activity associated with a potential security risk or threat or combination thereof.

Further, as used herein, "boundary" can refer to a perimeter of an area into which an unauthorized individual is not permitted to enter. Accordingly, the crossing of a boundary by an unauthorized individual may be considered to be a security violation, and the robot 100 can perform one or more security operations in response. Boundaries can be predetermined (e.g., associated with pre-defined areas, for instance of a floor or building), can be permanent or temporary (e.g., can exist for particular time period or during a security event or mode), can be learned by the robot based on behaviors of individuals or based on boundaries defined in similar locations, or can be defined by users, operators, or security personnel 250. For instance, a security guard can drive a line on the ground using a laser pointer, and the robot can detect the line and establish the line as a boundary for the purposes of implementing a security policy or performing one or more security operations.

A. Patrolling

The robot 100 can perform a security patrol, for instance within a building or building portion, within a parking lot or other outside area, within a shopping mall or store, or within any other suitable location or premises. The path of a patrolling robot can be predetermined (e.g., based on pre-selected patrol routes defined by a security policy), or can be dynamic (e.g., based on detected suspicious activity, based on how recently an area was patrolled, based on a sensitivity or security associated with any area, based on a viewpoint/vantage point of an area, or based on any other security criteria). The path of a patrolling robot can also be determined for unknown or unmapped areas, for instance by determining a series of waypoints for the robot to follow, by scanning the area to identify nearby paths and obstacles, and by selecting additional waypoints based on the identified paths and obstacles.

In some embodiments, the robot 100 patrols a route periodically, rotates between multiple routes, or selects routes to rotate based on a security level associated with a route or area associated with a route. A route can also be selected based on a time of day, a history of suspicious activity or security violations associated with the route, based on a current security status or violation associated with a route or location, or based on any other suitable criteria. In some embodiments, a route is selected based on a proximity to a recharge station or based on an amount of available power to the robot. In some embodiments, a robot can pause patrolling a patrol route when the amount of power available to the robot falls below a threshold amount of power, can recharge at a nearby recharge station, and can continue patrolling the patrol route after recharged. In embodiments where the patrol route cannot be paused (for instance, when suspicious activity is detected), the robot can communicate with the central system 210 to locate another robot with sufficient charge to perform the patrol. Patrol routes can be randomly selected, for instance to increase the unpredictability of a patrolling robot for a potential unauthorized individual. A patrol route can also be manually selected by an operator of the robot (for instance, the operator can control the path of the robot in real time using a control mechanism).

In some embodiments, robots 100 generate maps as they patrol an area, while in other embodiments, robots access previously generated maps for use in identifying a patrol route. While patrolling, the robot can update a map to identify a route patrolled by the robot, beneficially enabling a robot operator to see the path of the robot. In some embodiments, if a path is blocked for a robot patrolling along a predetermined route, the robot can use a previously generated map to identify an alternative route to bypass the blocked path and to continue on the patrol route (for instance, a shortest alternative route). The robot can update a map to include a location of an obstructed path, to include a location of identified objects or individuals, or to include any other information associated with the patrol route.

While patrolling, the robot 100 can identify suspicious activity, can identify individuals or objects in proximity of the patrol route, and can identify a status of objects or systems along the patrol route. For instance, the robot can identifying suspicious sounds or motion, can determine a location of the identified sounds or motion, and can report the sounds or motion to an external entity (such as the central system 210 or security personnel 250). Likewise, the robot can identify objects and object types while patrolling, and can store or provide the location of the identified objects to an external entity, for instance, in conjunction with a map of the route.

Figure 9:
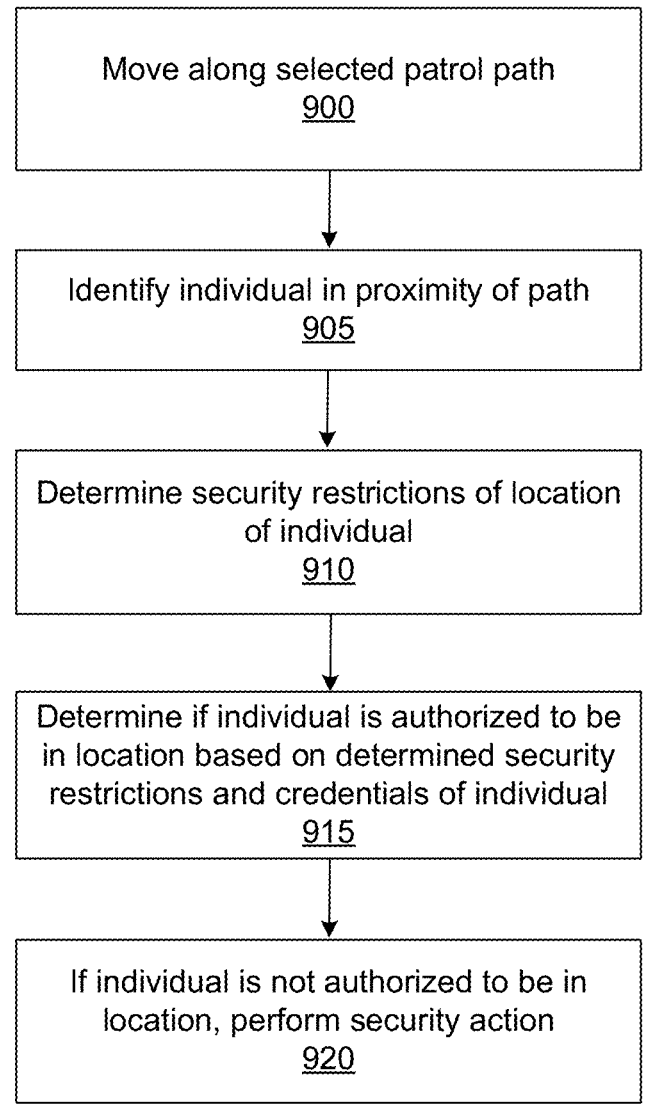
FIG. 9 is a flow chart illustrating a process for patrolling an area by a robot, according to one embodiment.

While patrolling, the robot 100 can perform one or more security operations in response to identifying suspicious activity or a security threat. For instance, a robot can flag the location of the identified activity or threat, can inform an external entity of the identifier activity or threat, or can perform any other security operation described herein. FIG. 9 is a flow chart illustrating a process for patrolling an area by a robot, according to one embodiment. In the embodiment of FIG. 9, a robot moves 900 along a selected patrol path. An individual is identified 905 in proximity to the path, and the security restrictions associated with the location of the individual are determined 910. For instance, the area can be restricted to individuals with particular security credentials, or can be off-limits for all individuals (for instance, during nighttime hours).

The robot 100 can approach the individual, and can request security credentials for the individual. Alternatively, the robot can remotely scan an RFID badge of the individual to determine the user's security credentials. The robot can determine 915 if the individual is authorized to be in the location based on the determined security credentials and based on the security restrictions associated with the location. In the event that the individual is not authorized to be in the location, the robot can perform 920 a security action. For example, the robot can alert security personnel, follow and monitor the individual, emit a siren, obstruct the movement of the individual, and the like. After the security incident has been resolved (e.g., the individual has left or been apprehended), the robot can continue with the patrol, or can return to a charging station.

B. Video Recording/Streaming

As noted above, the cameras 722 of the robot 100 can capture, record, and stream images and video. Captured images and video can be stored at the robot for subsequent uploading to an external entity (for instance, in the event that the robot is out of range or unable to connect to the network 200). Likewise, captured images and video can be streamed to an external entity (such as the central system 210) for storage or viewing by an operator or other user. In some embodiments, the robot stores video for periodic upload (e.g., once a day or once an hour), for times when the robot is charging at a charge station, or during any other suitable times. Video captured by one or more robots can be synchronized by the central system 210, and can be further synchronized with other video (such as video captured by one or more security cameras) and/or other security information (such as identities of individuals identified within the video or located within an area associated with the video) for subsequent synchronized playback to a user.

In some embodiments, the robot 100 can stream video constantly (for instance, during all times of operation). The robot can also capture and/or stream video selectively, for instance in response to being instructed by the central system 210 or an operator. In some embodiments, the robot captures and streams video in response to one or more criteria being satisfied. Examples of such criteria include: detected movement, suspicious activity (e.g., an unidentified individual or an individual performing an unauthorized action), detected sound when no sound is expected (e.g., during night time operation), suspicious sound (e.g., broken glass), in response to a security incident detected by the robot or other robots, in response to the implementation one or more security policies, or based on any other suitable criteria. In some embodiments, the robot can provide images to the central system during normal operation, and can provide video to the central system only in response to the detection of a security anomaly, in response to a request or instruction from an operator, or in response to any other suitable criteria.

C. Individual/Group Monitoring

The robot 100 can be configured to detect and identify individuals. For instance, the robot can capture images or videos of the individuals using the cameras 722, and can perform facial recognition on the captured images or videos. Likewise, the robot can identify a height or size of the individual, or can scan a badge of the individual (for instance, using an RFID reader). Individuals can be identified by comparing detected characteristics of the individuals with an identity database. For instance, an image of a detected face can be compared against a database of detected facial characteristics associated with individual identities to identify an individual. The identity database can be local (e.g., a database of a building's occupants or company's employees), or can global (e.g., a police database of known criminals). The identity database can also include identities of individuals not permitted to be in a particular area (such as a blacklist).

The robot 100 can take various actions in response to identifying an individual. For instance, if a robot detects an individual, identifies the individual, and determines that the individual is authorized to be at the detected location (e.g., the individual is an employee of a company associated with the building in which the robot is located), then the robot can log the detection and identification of the individual with no further action. On the other hand, if the robot determines that the identified individual is not authorized to be in a particular location (e.g., the individual is an employee of the company, but is in an off-limits area of the company's building), the robot can warn the individual, can instruct the individual to leave the area, can obstruct the individual, can lock nearby doors, can trigger an alarm, can call other robots or security personnel 250 to investigate or intercept the individual, or can perform any other suitable security operation. Likewise, the robot can perform one or more of the security actions described herein in response to being unable to identify the individual.

The robot 100 can monitor multiple individuals. For instance, the robot can identify one or more individuals in a group of individuals, and can track the identified individuals within the group. In some embodiments, the robot can monitor very large groups, such as crowds at a conference or concert. The robot can monitor statistics associated with the group, for instance to determine a number of individuals within the group, to determine an approximate size or floor space required by the group, and to monitor objects carried by or associated with the group. In some embodiments, the robot can determine and monitor a mood of the group, for instance by determining if the group is angry and/or violent or likely to become violent (based on words spoken by members of the group associated with anger or violence, based on detected actions performed by members of the group associated with anger or violence, and the like). The robot can perform one or more security operations in response to monitoring the group, for instance by notifying security personnel 250 if the group becomes violent, by activating fire sprinklers or other group deterrents, band the like. Beneficially, the monitoring of individuals, for instance in an area, can be used by building planners to provide insight into the movement of people in the area for the purposes of space planning.

D. Motion Detection and Action Recognition

The robot 100 can detect motion within a proximity of the robot, for instance using the cameras 722 or using a dedicated motion detection sensor. One or more actions can be taken based on the detected motion. For instance, if the motion is detected in an area where no motion is expected (such as a secure room, a building during off-hours, or the like), the robot can notify security personnel 250, can interact with a building in which the robot is located (for instance, to lock nearby doors), or can investigate further. In some embodiments, the robot can determine if the detected motion is associated with an individual or is associated with an object (such as wind blowing papers off a desk), and one or more security actions can be taken in response to the determination.

In some embodiments, the robot 100 can identify an action associated with a detected movement, for instance if the detected movement is determined to be associated with the individual. For example, the robot can determine if the individual is running, walking, standing, carrying an object, holding a gun, attempting to access a location (e.g., trying to open a door or pass through a security gate), interacting with an object (such as a control panel or a desk drawer), taking a picture or recording video, placing an object (such as an item for sale within a store, or paperwork located on a desk) in a pocket or bag, and the like. The action can be identified by comparing information about the detected movement with a database of detected movements and corresponding action identifiers. The robot can perform one or more security operations based on the identified action. For instance, if an individual is running in an area with dangerous equipment, the robot can instruct the individual to slow down. Likewise, if an individual is holding a gun, the robot can attempt to obstruct the individual.

E. Object Recognition

The robot 100 can detect objects within a proximity of the robot, for instance by capturing images of the objects and analyzing the images to identify the objects within the images. The robot can perform one or more security operations in response to the detected objects. For instance, in the event that an object is not in a location it is supposed to be in, the robot can relocate the object or can alert security personnel of the location of the object. Likewise, in the event that an object is broken or malfunctioning (such as an overflowing sink), the robot can attempt the repair the object, or can notify security personnel of the object.

In some embodiments, the robot 100 can detect license plates within a parking garage or parking lot, and can flag license plates of vehicles that are not authorized to be in the parking garage or lot. For instance, a robot, during the course of a patrol of a parking garage, can scan the location of every license plate in the garage, can query a database of authorized license plates, and can flag scanned license plates that are not included within the database. The robot can then inform security personnel 250 of the unauthorized vehicle, can move to a location blocking the vehicle from moving, or can attach a wheel lock to one or more of the vehicle's wheels.

F. Escorting, Following, Observing, and Access Control

The robot 100 can escort one or more individuals located within a proximity of the robot to a new location. For instance, an individual can be authorized to be in a first portion of a building but not a second portion (such as a contract worker, an external maintenance individual, or an employee with limited security credentials). In such embodiments, the robot can escort the individual from one location to another location in order to ensure that the individual does not cross into an area the user is not authorized to be. For example, a maintenance worker can be working to repair networking equipment and may have to use the restroom. In such embodiments, the worker can inform the robot of the need to visit the restroom, and the robot, in response, can identify the location of the restroom to the worker, can project a path on the ground to the restroom, can project boundaries on the ground that the worker is not allowed to cross, can warn the worker if the worker crosses the boundary, can instruct the user to "follow me", can wait while the worker uses the restroom, and can escort the worker back to the location of the networking equipment. In some embodiments, the robot can escort an individual for the entire time a worker is within a building or location, while in other embodiments, the robot can escort an individual between locations.

The robot 100 can also follow detected individuals, for instance closely (within a threshold distance) or from a distance (greater than a threshold distance). For instance, if an individual is detected within a building, and the robot is unable to verify the identity of the individual, the robot can follow the individual until the identity of the individual is verified, until security personnel 250 arrive, or until the individual leaves the building. It should be noted that escorting and following individuals for extended periods of time can be particularly tedious for humans to perform, and so implementing one or more robots to perform such tasks can free up humans for other tasks that robots are unable to perform. Further, by following or escorting an individual, the robot 100 can beneficially act as a deterrent for unauthorized behavior by the individual.

In some embodiments, individuals can be followed, escorted, and tracked by the robot 100 by performing facial detection on the individuals to verify that the correct individual is being followed, escorted, or tracked. The location of individuals being followed, escorted, or tracked can be monitored by the robot, can be provided to an external entity (such as the central system 210), or can be updated on a map of the area or building (for instance, in real-time). In addition, the robot can provide information to the individual, for instance in response to request from the individual.

Figure 10:
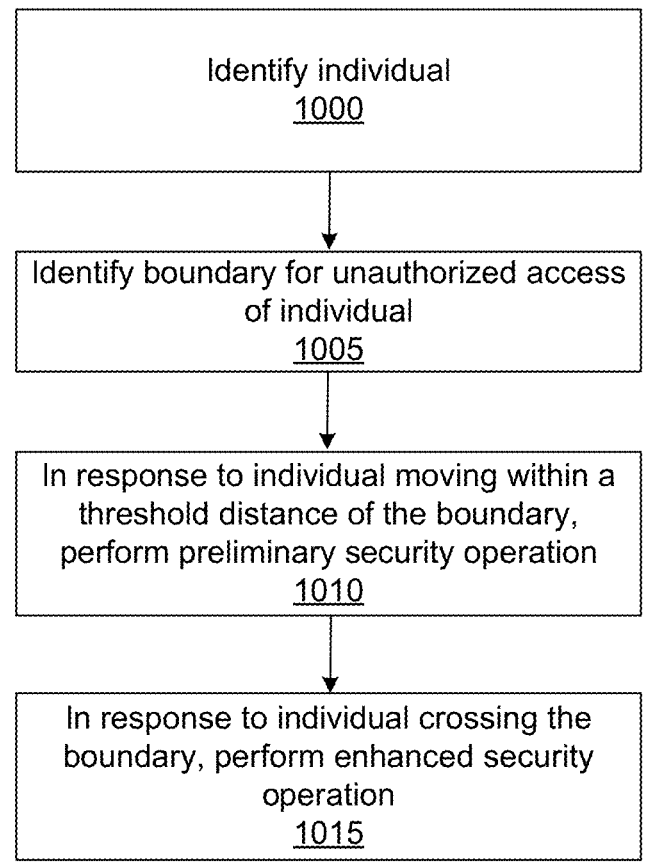
FIG. 10 is a flow chart illustrating a process for monitoring the movement of an individual, according to one embodiment.

In the event that an identified individual being followed, escorted, or tracked performs an unauthorized action or commits a security violation, the robot 100 can perform one or more security operations in response. FIG. 10 is a flow chart illustrating a process for monitoring the movement of an individual, according to one embodiment. An individual is identified 1000 by the robot. A boundary associated with an area that the individual is not allowed to access is identified 1005. For instance, if a user is permitted to be in a first portion of a room but not a second portion, the robot can determine that a boundary exists around the portion of the room that the individual is not allowed to access.

In response to the individual moving 1010 within a threshold distance of the identified boundary, the robot 100 can perform a preliminary security operation. For instance, the robot can move to intercept the individual to obstruct and prevent the individual from crossing the boundary. Likewise, the robot can issue a warning to the individual, can project the boundary on the ground to inform the individual of the area that individual cannot cross, and can inform necessary security personnel of the potential security violation. In response to the individual crossing the boundary, the robot can perform 1015 an enhanced security operation. For instance, the robot can emit a siren, can request the presence of security personnel, can call the police, or can lock nearby doors. In some embodiments, in response to notifying security personnel or an operator of the proximity of the individual to the boundary, or the crossing of the boundary by the individual, the robot can receive authorization for the individual to cross the boundary, and the robot can permit the individual to continue without performing further security operations. It should be emphasized that in some embodiments, the robot may perform an enhanced security operation in response to the individual moving within the threshold distance of the boundary, or may not perform a security operation until the individual crosses the boundary.

In addition, a robot 100 can act as a sentry to control access to a particular area, a building portion, a room, a doorway, a hallway, a floor, an elevator, and the like. The robot can stay within a proximity of the location being monitored, and can physically impede individuals from accessing the location. If an individual approaches the robot (for instance, within a threshold distance from a location of the robot), the robot can warn the user not to cross a boundary associated with the location being monitored, can project a boundary onto the floor around the location, can request credentials from the individual, by moving to mirror the individual's movement (to prevent the individual from bypassing the robot), or by performing any other suitable actions. In the event the individual persists and attempts to or succeeds in bypassing the robot, the robot can perform an enhanced security operation, for instance by notifying security personnel 250, by following the individual, by triggering an alarm, by locking nearby doors, or by performing any other security operation. It should be noted that "enhanced security operation" as used herein can refer to a first security operation more likely to result in preventing a security violation than a second security operation.

G. Interaction with Building Infrastructure

Figure 11:
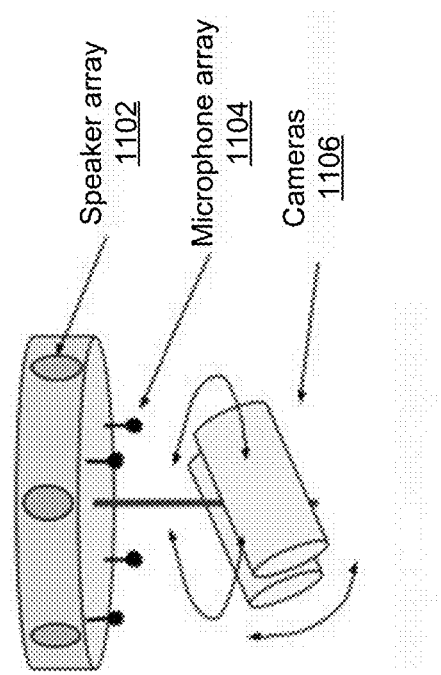
FIG. 11 illustrates an infrastructure camera array, according to one embodiment.

The robot 100 can interact with one or more hardware systems or other infrastructure of a building, campus, site, or the like. An example of such hardware systems includes a camera array. FIG. 11 illustrates an infrastructure camera array, according to one embodiment. The camera array of FIG. 11 includes a speaker array 1102, a microphone array 1104, and cameras 1106, though in other embodiments, the camera array includes fewer, additional, or different components than those shown in FIG. 11. The camera array further includes a wireless transceiver configured to receive information from the robot (for instance, instructions to record video or to change a field of view of the camera array, or audio to play over the speaker array) and to transmit information to the robot (for instance, video captured by the camera array streamed in real-time, or audio captured by the microphone array). The camera array can be connected to the robot through a building network, such as the network 200. The camera array can be physically attached at various locations within a building, for instance to a ceiling or wall in each of a set of rooms of a building, in areas with strategic vantage points, or near hallways, doors, or entry points.

Figure 12:
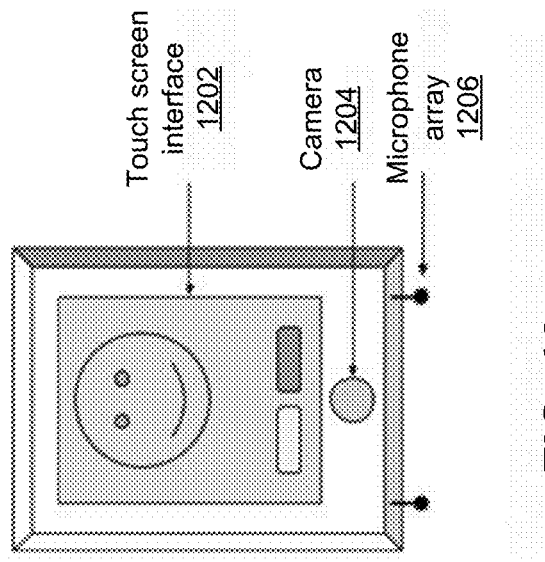
FIG. 12 illustrates a building computing system, according to one embodiment.

Another example of a hardware system with which a robot 100 can interact is a building computing system. FIG. 12 illustrates a building computing system, according to one embodiment. The computing system of FIG. 12 includes a touch screen interface 1202, a camera 1204, and a microphone array 1206, though in other embodiments, the touch screen interface includes fewer, additional, or different components than those shown in FIG. 12. The computing system further includes a wireless transceiver configured to receive information from the robot (for instance, information for display on the touch screen interface, such as information associated with the robot, an authentication request for an individual, or the like) and to transmit information to the robot (such as inputs received from an individual via the touch screen interface, video captured by the camera, or audio captured by the microphone array). The computing system can be connected to the robot through a building network, such as the network 200. The computing system can be physically attached to a wall of the building, for instance next to a door, hallway, or other access point.

Additional examples of hardware systems with which a robot 100 can interact include an alarm system, connected doors and windows, access gates, connected locks, security gates, computer systems, network systems or components, fire alarms, elevators, or any other connected object or system within a building or location. The robot can interact with one or more hardware systems of a building, for instance while patrolling a route within the building, in response to detecting suspicious activity, in response to detecting an unidentified or unauthorized individual, in response to determining that an individual violated a security policy, in response to detecting that a building object is misplaced or is in violation of a security policy, or in response to any other suitable criteria. In such instances, the robot can communicatively couple to a hardware system of the building (for instance, via the network 200) in order to leverage the capabilities or functionality of the hardware system to perform one or more security operations.

Figure 13:
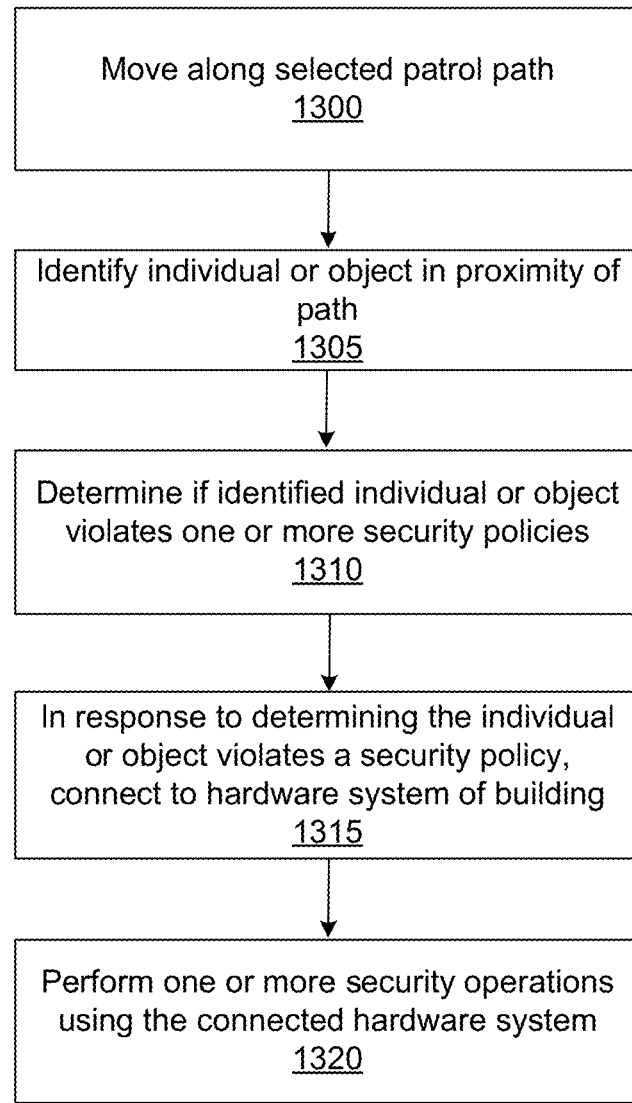
FIG. 13 is a flow chart illustrating a process for using building infrastructure to perform security operations, according to one embodiment.

FIG. 13 is a flow chart illustrating a process for using building infrastructure to perform security operations, according to one embodiment. In the embodiment of FIG. 13, a robot moves 1300 along a selected patrol route. It should be noted that in some embodiments, the process of FIG. 13 may be performed by a robot that isn't patrolling, but rather that is stationary, recharging, or guarding an area or location. The robot identifies 1305 an object or individual, for instance, within a proximity of the patrol route.

In response to identifying the object or individual, the robot determines 1310 if the identified object or individual violates one or more security policies. For example, the robot can determine that the individual or object violates a security policy if the individual is unidentified, if the individual is not permitted to be in a particular location or portion of a building, if the individual does not possess the proper security credentials (for instance, if the user is not in possession of an RFID badge), if the user is performing an unauthorized action, if the user is blacklisted from a location, if the user is in possession of an unauthorized object, if the object is misplaced or located in an unauthorized location, if a status of the object is unauthorized (e.g., if a door that is supposed to be locked is unlocked), if an object is broken or malfunctioning, or based on any other security policy violation criteria being satisfied by the individual or the object.

In response to determining that the individual or object violates a security policy, the robot 100 can connect 1315 to a hardware system of a building, and can perform 1320 one or more security operations using the connected hardware system. For instance, the robot can communicatively couple to a central system 210, an infrastructure system 220 (such as an elevator system or power system of the building), or a security system 230 (such as a camera array located within the building). In some embodiments, the robot communicatively couples to a system selected based on a type of security policy violation. For instance, if the robot determines that an individual's movement or location violates a security policy, the robot can communicatively couple to a camera array associated with the location of the individual to control the camera to capture video of the individual or to follow the movement of the individual. Likewise, if the robot determines that a malfunctioning network component violates a security policy, the robot can communicatively couple to a network controller or the central system in order to reset the network component.

In some embodiments, the robot 100 communicatively couples to the central system 210 upon detecting the security policy violation in order to inform a user of the central system or an operator of the robot of the security violation in order to allow the user or operator to take an action in response to the detected security violation. In some embodiments, the object determined to violate the security policy is the hardware system to which the robot communicatively couples. For example, if the robot determines that a door being unlocked violates a security policy, the robot can communicatively couple to the door in order to lock the door (for instance, in embodiments in which the door is connected to the network 200 is capable of directly coupling to the robot). In some embodiments, the hardware system to which the robot connects is another robot. In such embodiments, the robot can provide instructions to the second robot in order to perform one or more security operations. For instance, the set of robots can corner or obstruct an individual determined to have violated a security policy.

In some embodiments, in response to detecting that an individual violates a security policy, the robot 100 can control a camera array to adjust the orientation of the camera array to capture video of the individual. In such embodiments, if the individual outruns the robot or hides such that the robot does not have a direct line of sight to the individual, the robot can use the video footage captured by the camera and streamed to the robot to locate the individual. The robot can then approach the individual, can report the location of the individual to one or more security personnel 250, or can instruct a second camera to capture video of the user (for instance, in response to the individual moving outside of the range of the camera array).

In addition, the robot can perform 1320 security operations including but not limited to: sounding an alarm, triggering a fire sprinkler system, closing or locking doors or windows, locking access gates, accessing computer system databases, reporting the violation of the security policy and any associated information to a local authority (such as the police), halting elevator systems, resetting or freezing network systems, and the like. It should also be emphasized that a robot can communicatively couple with a building hardware system in order to perform one or more operations using the connected hardware system without requiring the detection of a security violation. For example, the robot can determine that the temperature of a room is below a threshold value, and connect to a furnace system in order to increase heat flow into the room. Likewise, the robot can detect smoke and can connect to windows and a building sprinkler system in order to open the windows (to vent the smoke) and to turn on the sprinkler system (in order to extinguish the fire). In some embodiments, the robot can determine that an object (such as an item for sale in a store) is misplaced, and can communicatively couple to an inventory database in order to update the location of the object and to a cashier's computer system in order to inform that cashier that the object is misplaced.

In some embodiments, the robot 100 can perform a security operation, and a building hardware system can perform a security operation or other action based on the result of the security operation performed by robot. For instance, the robot can verify the identity or the credentials of an individual (for instance, by performing a face detection operation on the individual, by scanning the individual's identity badge, or by receiving a password or code from the individual), can communicate the verified identity or credentials to a connected access gate or door, and the access gate or door can unlock or open in response to receiving the identity or credentials. Similarly, the robot can determine that an individual is suspicious, can inform a security camera of the detected suspicious individual, and the security camera can record video of the individual in response.

In some embodiments, the robot 100 can perform a security operation in response to a security operation performed by a hardware system of a building. For instance, if a security camera detects a suspicious individual, the security camera can deploy a mobile robot to approach or follow the individual, to request the user's credentials, or to warn the individual. Likewise, if an audio system detects a suspicious noise, if a connected door detects that an individual attempted to open the door, or if a connected badge reader scans a badge for an individual that is not authorized to access a location associated with the badge reader, a robot can be deployed to perform one or more security operations associated with the security operation performed by the hardware system. It should be noted that a robot and a hardware system can perform security operations as described herein autonomously or without the explicit instructions or involvement of a human (such as a security personnel 250 or an operator of the robot), beneficially reducing the amount of human interaction required to perform the security operations.

H. Anomaly Detection

The robot 100 can detect security anomalies, for instance while patrolling within a building. As used herein, a security anomaly refers to a circumstance that might represent a security risk. Security anomalies can be detected using one or more sensors or systems of the robot, or may be detected based on data received from one or more systems external to the robot, such as from the central system 210, an infrastructure system 220, or a security system 230. A security anomaly can be identified based on accessed information describing a characteristic of an environment contrary to an expected characteristic of the environment. Upon detecting a security anomaly, the robot can perform one or more security operations, for instance to contain or mitigate the security risk corresponding to the security anomaly.

An example of a security anomaly is the detection of a sound that may indicate a security risk. The detected sound may indicate a security anomaly based on the type of sound detected. For instance, if a robot 100 detects the sound of broken glass, the robot can identify the detected sound as indicative of a security risk, and thus a security anomaly. Examples of detected sounds that can indicate a security anomaly include but are not limited to: windows opening, glass breaking, doors opening or closing, gun shots, walking footsteps, running footsteps, car sounds, shouting, water running, hissing (as from gas), and sounds that are an above-threshold magnitude. Likewise, if a robot detects a human voice in an area where no individual is present, the robot can identify the detected voice as a security anomaly. In some embodiments, any detected sound above a threshold magnitude can be identified as a security anomaly (for instance, in secure environments where individuals are not authorized to enter).

In some embodiments, security anomalies can be detected using cameras of the robot 100 or of a security system 230. For instance, a security anomaly can be detected if the robot detects an individual at a time or place where no individuals are expected to be present, if the robot identifies an individual that is blacklisted or is otherwise not authorized to be a particular location, if the robot identifies an individual taking an action that is not expected or authorized, if the robot identifies a broken or open window, if the robot detects an unlocked or open door when the door is supposed to be closed or locked, if the robot detects an object that is out of place, or the like. In some embodiments, a security anomaly can be detected based on detected or intercepted communications, wireless signals, or the like.

In response to detecting a security anomaly, the robot 100 can perform one or more security operations. For example, in response to detecting a sound indicative of a security anomaly, the robot can investigate the detected sound, can inform the central system 210 of the detected sound, or can instruct nearby security cameras to record video of the location where the sound was detected. Likewise, in response to detecting an individual in a location where there individual is not authorized to be, the robot can warn, follow, or confront the individual; can request security personnel 250 to come investigate; and can lock nearby doors to prevent the escape of the individual. In addition, in response to detecting a broken window, the robot can update a semantic map to indicate that the window is broken, or can summon security personnel to come replace the window. In response to detecting an unlocked door (at a time when the door is supposed to be locked), the robot can lock the door (either remotely in the event that the door is connected to the network 200, or manually otherwise) and can instruct nearby robots, cameras, and security personnel to be on the lookout for unauthorized individuals responsible for the door being unlocked that might be in the area. In some embodiments, the central system 210 can, in response to the detection of a security anomaly by a robot, increase patrols to the location associated with the detected security anomaly for a threshold amount of time, for instance, for an hour.

I. Aerial Systems

As noted above, in some embodiments the robot 100 or the other components of FIG. 2 can coordinate with one or more aerial systems or UAVs. The aerial systems can include many components in common with the robot 100, for instance a pan/tilt camera or camera array, an RFID reader or other DoA or reader antennas, a communication interface, various indicators, microphones, speakers, motion detection systems, laser rangefinders, IR sensors, a security engine, a semantic mapping engine, an RFID engine, and the like. In addition, the aerial systems can include an aerial navigation system, propellers, collision avoidance mechanisms, and the like. In other words, the aerial systems can perform many of the same functions as the robot 100, but with the added benefit of being able to move in three dimensions, fly over obstacles, scan/patrol hard-to-reach areas from better vantage points or perspectives, and perform other functions enabled by flight. It should be noted that while various functionalities described herein are limited in description to robots, such functionalities can equally apply to aerial vehicles.

In some embodiments, the aerial robots can land on and perch on ledges, surfaces, or objects and disable flight mechanisms (such as propeller spinning, navigation components, and the like). Perching enables the aerial robots to perform various security operations (such as recording video) from a better vantage point than the robot 100, while also saving the power otherwise required to maintain altitude or otherwise fly. When the aerial robot subsequently needs to recharge or move, the aerial robot can enable flight mechanisms and fly away as needed.

In some embodiments, aerial vehicles can land on and couple to charging stations in order to charge the batteries of the aerial vehicles. The charge station can include a coupling component and the aerial vehicle can include a reciprocally coupling component, such that the aerial vehicle charges when the coupling component is coupled to the reciprocally coupling component. In some embodiments, the aerial vehicles autonomously fly to the nearest charge station when the battery power available to the aerial vehicle falls below a threshold. In some embodiments, the robot 100 can include a charge station and/or launch/landing pad, and the aerial vehicle can fly to the nearest robot to recharge as needed. In yet other embodiments, an aerial vehicle can be tethered (e.g., connected to a power source via a cable) to either a charge station, robot, or other power source, beneficially enabling the aerial vehicle to have an unlimited or much greater power supply at the cost of mobility.

In some embodiments, the aerial vehicle can be wirelessly recharged, for instance using inductive recharging. In such embodiments, the landing pad or charge station can include a first inductive coil and the aerial vehicle can include a second inductive coil such that an electromagnetic field created by the first inductive coil can create energy in the second inductive coil which can then be used to charge the batteries of the aerial vehicle. In some embodiments, aerial vehicles can be wirelessly charged while in flight or remote from charge stations.

In some embodiments, the aerial vehicles can be manually controlled (for instance, by a user of the central system 210 or other aerial vehicle operator). In such embodiments, the operator of the aerial vehicle can control the location, movement, flight, and functionality of the aerial vehicle. For example, if a robot 100 detects a security anomaly or unidentified individual, the robot can launch an aerial vehicle to investigate the security anomaly or unidentified individual. The location and/or field of view of aerial vehicles can be displayed to a user of the central system, for instance within a security interface map.

In some embodiments, the aerial vehicles can be launched and controlled by a robot 100, for instance, in response to a determination by the robot during the patrolling of a route that an obstruction (such as a wall or barrier) prevents the robot from being able to adequately observe or monitor an area. In such embodiments, the robot can launch an aerial vehicle from the robot or from an aerial vehicle launch pad or charge station, the aerial vehicle can scan the area and can provide information about the scan to the robot, the aerial vehicle can return to the point of origin (the robot, the launch pad, the charge station, etc.), and the robot can perform a security operation based on the information received from the aerial vehicle (if necessary) or can continue with patrolling the route.

The aerial vehicle can record sound or video while in flight, and can stream the recorded sound or video (for instance, either directly from the aerial vehicle to the central station 210 via the network, or by via the robot 100, which in turn can broadcast the recorded sound or video). Likewise, the aerial vehicle can record, store, and/or broadcast other data captured by other sensors, information related to security operations or the operation of the aerial vehicle, or any other suitable information as needed to the robot or the central system. The video, audio, or other information captured by the aerial vehicle can be played or displayed to a user of the central system, for instance within a security interface portion.

In some embodiments, the aerial vehicle can receive security operation instructions from the central system 210, and can perform one or more security operations in response. For instance, the aerial vehicle can patrol routes in response to an instruction received directly from the central system. Likewise, the aerial vehicle can scan RFID badges in a particular location in response to an instruction received from the robot 100, which in turn received the instruction to identify all individuals within the location. In such embodiments, the aerial vehicle can perform the functionalities of the robots or security systems described herein.

J. Central System Operation

The central system 210 can interact with one or more robots 100 and other infrastructure systems 220 and security systems 230 to perform one or more security operations. The central system can receive data from the one or more robots, infrastructure systems, and security systems; can aggregate, normalize, or otherwise format the received data; and can display the formatted data within an interface. Security interfaces are described below in greater detail. The central system can also request particular data from particular robots, infrastructure systems, or security systems; can instruct robots, infrastructure systems, and security systems to perform one or more security operations, either independently or in concert with other robots, infrastructure systems, or security systems; or can implement one or more security policies. It should be noted that the functions of the central system described herein can be performed in response to input from a user or operator of the central system, or without receiving inputs from a user or operator (for instance, autonomously or in response to detected security criteria that trigger the performance of security operations).

The central system 210 can aggregate sensor data from one or more robots 100, infrastructure systems, or security systems. For instance, the central security system can receive locations of individuals within a building from multiple robots and security cameras, and can combine the location information to determine refined locations of each individual within the building. Likewise, the central system can interpolate data received from multiple sources, for instance by averaging temperatures detected in each room in a building to determine an average temperature for each room. Finally, the central system can receive information describing a state of one or more objects in a location, for instance the power levels, capabilities, or locations of each robot within a building.

The central system 210 can manage multiple maps for a location, for instance stored building maps and blueprints, semantic maps describing a building or area, and simultaneous location and mapping (or "SLAM" maps) generated by a robot 100 or other system configured to scan a location or area. In some embodiments, the central system can coordinate between multiple maps of the same location, for instance by updating older maps to include the location of objects that newer maps indicated have moved, or by incorporating types of information present in a first map but not a second map into the second map (for instance, the location of windows, whether a door is locked or unlocked, or the location of security cameras).

The central system 210 can implement one or more security policies, such as a building security policy. For instance, a security policy can specify one or more security criteria, such as: patrol routes within a building, can specify a frequency of patrolling each route, can specify access credentials required for an individual to be in one or more portions of the building, can specify acceptable threshold values or ranges for sensors within the building (such as minimum or maximum temperatures, sound magnitudes, characteristics of video data captured by cameras), can specify acceptable or forbidden actions or activities for individuals within one or more building portions, can define geofences describing portions of a building that can be accessed or that are off-limits (for instance, by time, by access credential), and the like. In some embodiments, the security criteria are time-dependent, and can vary based on whether the current time falls within a time range specified for the security criteria.

In implementing the security policy, the central system 210 can instruct one or more robots 100 to perform a task (such as patrol a route or intercept an individual that isn't authorized to be in a particular location), can instruct security cameras to change viewpoint and/or capture video of a location associated with a potential violation of a security policy, can request sensor data detected by one or more infrastructure systems 220 or security systems 230, and the like. In some embodiments, security policies can be implemented in response to the detection of one or more security criteria. For instance, if an individual is detected in an off-limits portion of a building or a suspicious sound is detected, the central system can dispatch one or more robots or security personnel to investigate.

As noted above, the central system 210 can also instruct one or more robots 100 and/or one or more infrastructure systems 220 or security systems 230 to perform a security operation in response to a request from a robot, in response to receiving information from a robot (such as information indicative of a security violation or threat), or in response to a request or information from an infrastructure system or security system. The central system can prioritize security operations, and can instruct the one or more robots, infrastructure systems, and security systems to perform security operations based on the priority of each security operations. For instance, if the central system identifies ten security operations that need to be performed by five robots, the central system can prioritize the ten security operations, and can instruct the five robots to perform the five highest priority operations first, and when those operations are complete, can instruct the robots to perform the remaining five security operations. The central system can account for the capabilities and availability of each robot, infrastructure system, and security system before instructing these robots and systems to perform security operations. For instance, the central system can determine that of two robots, a first is able to perform a particular operation (such as an IR scan) and a second isn't, and can instruct the first robot to perform the operation (and not the second, even if the first robot is currently occupied).

The central system 210 can record and store data received from one or more robots 100, infrastructure systems 220, and security systems, for instance within log files in memory accessible to the central system. In addition, the central system can report or log any suspicious activity, detected security anomalies, detected threats or alerts, or any potential or actual violations of security policies, for instance to security personnel 250 or to an operator or user of the central system. The central system can also coordinate communications between components of the environment of FIG. 2, for instance by receiving messages from one or more of the systems and routing the message if needed to one or more other systems. In doing so, the central system can synchronize information, for instance by applying time stamps to the information, by aggregating the information by time, and by routing messages in chronological order based on the time of the aggregated information or based on the time each message was received.

As noted above, an implementation of the central system 210 can present a security interface to an operator. The operator can review data provided by the robots 100, infrastructure systems 220, and security systems 230 and presented within the interface. The information presented by the security interface can be updated in real-time, for instance reflecting updated information received from the robots, infrastructure systems, and security systems. For example, the security interface can update the location of the robots within a building in real-time. The operator can coordinate the actions of multiple robots, can assign patrol routes to robots and can alter patrol routes as the robots are patrolling the routes, can dispatch robots to investigate security anomalies or suspicious activity, and can assign particular security operations to particular robots.

The central system 210 can notify security personnel 250 or other individuals or groups to inform the security personnel of security violations, suspicious activities, security anomalies, and the like. For instance, the central system can send text or SMS messages, emails, or voice calls to security personnel, to police, to a company's employees or managers, and the like. Likewise, the central system can field queries from robots 100, infrastructure systems 220, security systems 230, security personnel 250, users of a remote interface 240, and the like, and can provide information gathered by the central system in response to the queries. For example, the central system can provide a map of all RFID readings as detected by a fleet of robots to a requesting entity. Likewise, the central system can store and provide a WiFi heat map, a temperature map, and the like to users of the central system, and can generate (either periodically, automatically, or in response to user request) reports of anomalies, security events, patrol coverage, or building properties for review by users of the central system.

In some embodiments, the robots 100 may not include the necessary computing power to perform certain functions (or may include the necessary computing power but may not be able to perform such functions in a time-efficient manner), including both security operations (such as facial detection) and non-security operations (such as national language processing). In such embodiments, the robots can request that the central system 210 (which may include greater processing capabilities and resources) to instead perform such functions. For example, a robot can receive a request from a user asking "How do I get to the conference room?", and can send the recorded voice sample to the central system, which can parse the voice signal and determine the user's intent. Continuing with this example, the central system can identify a set of navigation instructions to the conference room to the robot, and the robot can provide the navigation instructions to the user. Likewise, a robot can request that the centralized server compress data, perform video processing tasks, to stream video to other robots or entities, to perform machine learning tasks, or to perform any other processing- or resource-intensive tasks, and can provide the data to perform such tasks to the central system. The central system can also access a building's or company's databases or processing resources (such as servers or other computer systems), for instance to identify an individual within a building or to use the accessed processing resources to perform a computationally-intensive task.

Figure 14:
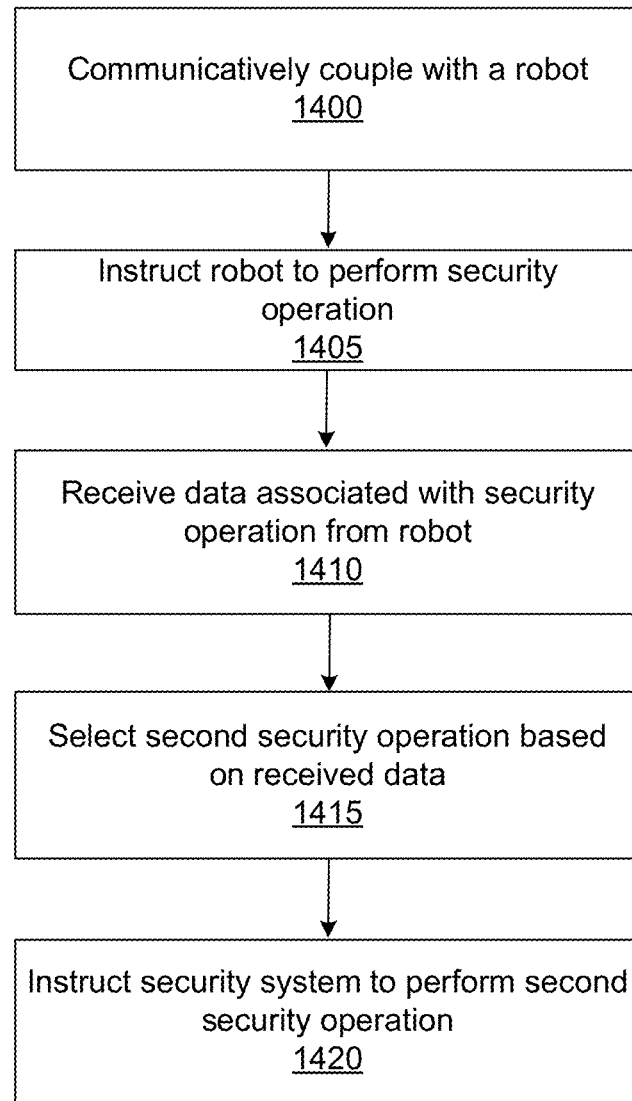
FIG. 14 is a flow chart illustrating a process for controlling a security robot by a central system, according to one embodiment.

FIG. 14 is a flow chart illustrating a process for controlling a security robot by a central system, according to one embodiment. The central system 210 communicatively couples 1400 with a robot 100. The central system then instructs 1405 the robot to perform a security operation. In some embodiments, the central system instructs the robot to perform an ordered set of operations, and the robot maintains the set in a queue, and begins performing the first operation in the set. The security operation can be any operation described herein, for instance a patrol route, investigating a noise, scanning an individual's badge or otherwise authenticating an individual, and the like. The central system receives 1410 data associated with the security operation from the robot. Examples of such data include video captured while patrolling a route, the identity of an investigated individual, and the like.

The central system 210 can select 1415 a second security operation based on the data received from the robot while performing the security operation. For instance, if the data received from the robot is video, and the video indicates an unauthorized individual is located in a portion of the building, the second security operation can be an authentication operation (to authenticate the identity of the individual), a video recording operation (to record video of the individual), and the like. The central system can instruct 1420 a security system to perform the second security operation. In some embodiments, the security system is the robot, and the robot can immediately begin performing the second security operation, can perform the second security operation after completing the original security operation, or can slot the second security operation into the queue of security operations maintained by the robot (for instance, at the front of the queue, at a location within the queue corresponding to the priority of the second operation, or at the end of the queue). In other embodiments, the security system is a system other than the robot, which can likewise immediately perform the second security operation, or can queue the second security operation based on the priority of the second operation.

Although the central system 210 is described herein as a single entity, it should be noted that in some embodiments, the central system can include any number of systems operating in concert. For instance, the central system 210 can be implemented within a data center, by several communicatively coupled servers, or the like. Finally, it should be noted that in some embodiments, the tasks performed by the central system may instead be performed by other components of the embodiment of FIG. 2, by systems configured to directly communicatively couple with each other (for instance, the robot 100 and a security camera system), or by two or more robots configured to communicatively couple with each other.

K. Security Interface

As noted above, the central system 210 can display a security interface that includes various security information and data from the components of FIG. 2. Although the security interface can be displayed by other components of FIG. 2 (such as the remote interface 240) or other systems not illustrated in FIG. 2, the remainder of the description herein will reference the display of the security interface by the central system for the purpose of simplicity.

The security interface can include a number of portions, and each interface portion can display a set of security information. For example, an interface portion can display a map of a building or area, robot status information, robot video streams, security camera video streams, security notifications, a list of individuals within an area, a list of security personnel 250 within an area, security policy violation information, video chat streams (for instance, for an individual speaking to a robot 100), communication information, infrastructure system status information, security system status information, a list of available security operations (for assignment to a robot, infrastructure system 220, security system 230, or security personnel), a list of security operations being performed or queued, security operation status information, and the like.

Figure 15:
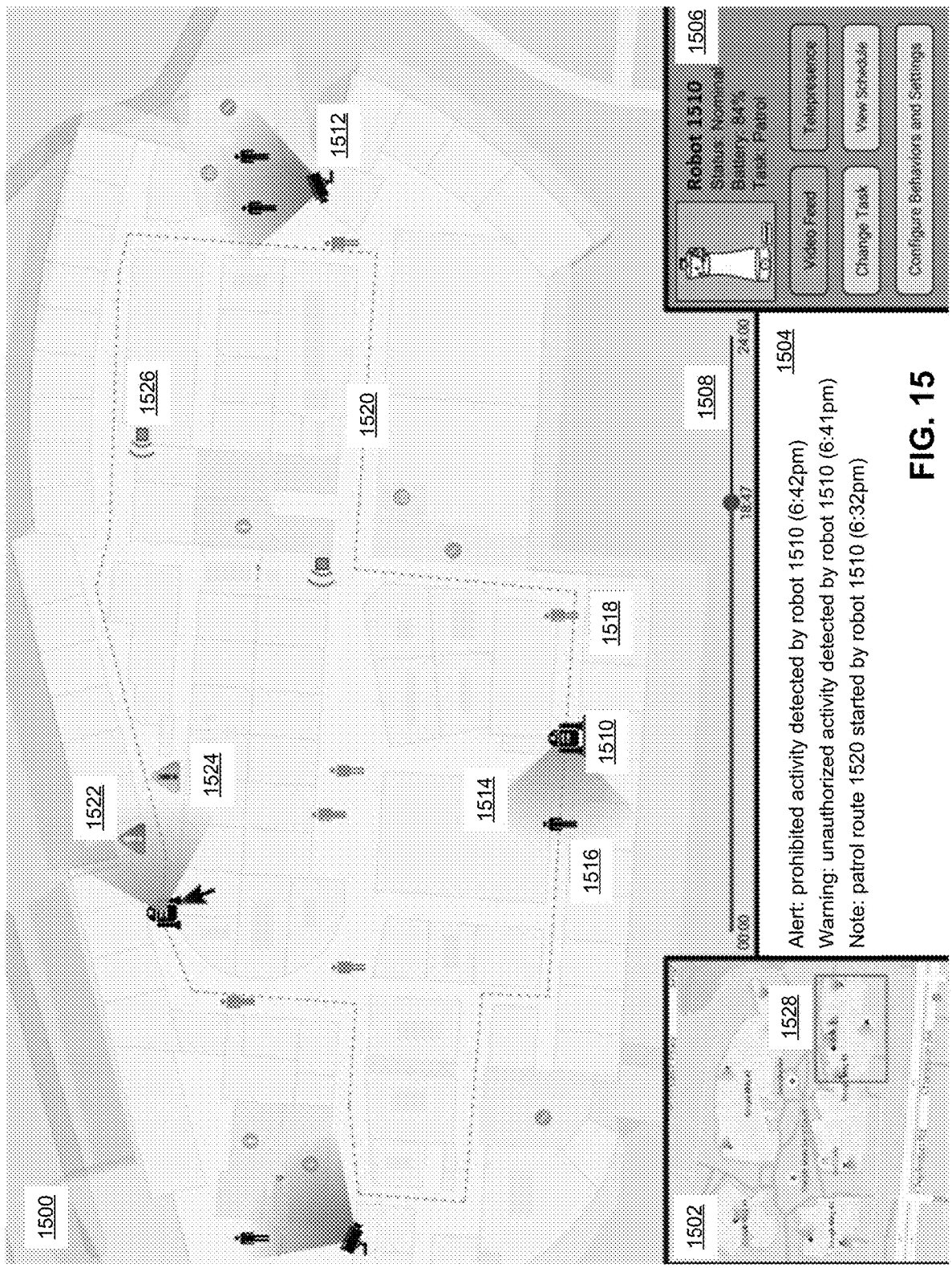
FIG. 15 illustrates a security interface for display by a central system, according to one embodiment.

FIG. 15 illustrates a security interface for display by a central system, according to one embodiment. The interface of FIG. 15 includes a first portion 1500 displaying a local map, a second portion 1502 displaying a global map, a third portion 1504 displaying text notifications, and a fourth portion 1506 displaying a robot interface. It should be noted that in other embodiments, the security interface of FIG. 15 can include different, additional, or fewer interface portions showing any suitable information, and can include interface portions in different arrangements or locations than illustrated in FIG. 15.

The first interface portion 1500 includes a local map illustrating various entities, objects, and notifications within a portion of a building. The location map can include a floorplan of the portion of the building, for example illustrating rooms, names of rooms, room numbers, hallways, doors and/or windows, and important building features. In the embodiment of FIG. 15, the first interface portion illustrates a robot 1510 with field of view 1514. The robot is moving along the patrol path 1520, and detects the person 1516. The displayed field of view 1514 corresponds to the field of the view of the robot, indicating the current field of view of the robot to a user of the security interface. Likewise, the location of the person 1516 displayed as a humanoid icon on the local map corresponds to the location of the person within the building as detected by the robot. Person 1518, having previously been detected by the robot but now out of the field of view of the robot, is shown on the local map at the last known location of the person 1518. In some embodiments, as the person 1518 is no longer visible to the robot, an indication is displayed on the map that the location of the person 1518 is no longer certain (for instance, the icon for the person can be faded to indicate the uncertainty of the person's location as illustrated in FIG. 15, the color of the icon or the icon itself can be changed to indicate the uncertainty of the person's location, and the like).

The level of certainty or uncertainty in the individual's location can also be visually represented within the security interface, for instance by adjusting an amount of fading or the color of the icon representative of the individual. The level of certainty or uncertainty in the individual's location can be based on the amount of time since the individual was last observed (e.g., wherein the uncertainty increases with time since last observation), a speed or activity of the individual when the individual was last observed (e.g., wherein the uncertainty increases with the speed of the individual or based on the activity type of the individual), or based on an identity of the individual (e.g., wherein the uncertainty increases faster for individuals with lower access credentials or with a history of security violations than for other individuals). In some embodiments, different icons, colors, or other representations can be used to display different categories of people, for instance identified individuals, unidentified individuals, individuals by categories of access credentials, individuals by activity type, individuals performing prohibited actions, individuals associated with security risks or threats, and the like.

In addition to robots, the first interface portion 1500 also includes other objects, such as the security camera 1512. The field of view of the security camera is also displayed (for instance, in a different color than the field of view 1514 of the robot 1510), and any individuals within the field of view of the security camera are indicated with icons. Likewise, the location of various tracked assets (such as the tracked asset 1526) can be indicated within the first interface portion using suitable icons. Tracked assets can include assets coupled to RFID tags, and examples of tracked assets can include lab equipment, computer equipment, and secure documents. The first interface portion can also include notifications, such as the alert notification 1522 and the warning notification 1524. The location of notifications within the local map can be based on the location of the entity or object associated with the notifications. In some embodiments, a user can view all tracked assets in a particular location within the security interface, for instance a listing of assets by name or identity, a time last seen, an expected or permitted location, and an actual or last seen location. The user can also use the security interface to add additional tracked items, to change the permissions of existing tracked items (for instance by changing the permitted locations for the items), and can remove tracked items.

As noted above, the security interface can be updated in real-time, as objects and entities move and events occur. For instance, the first interface portion 1500 can be updated to display the robot 1510 as it moves along the patrol path 1520. As the robot moves along the patrol path, the displayed robot icon can move to reflect the change in location of the robot, allowing a user of the security interface to be able to track the robot in real-time. Likewise, the location of individuals or objects detected by robots, security cameras, or other location-tracking mechanisms (such as GPS tracking devices, mobile phones, or RFID readers) can be updated as the individuals or objects move in real-time.

The security interface can also include a time bar 1508 enabling a user of the security interface to select a previously occurring viewing time. The security interface, in response to the user selecting a previously occurring viewing time, can adjust the various interface portions of the security interface to display information associated with the previously occurring viewing time. The user can then "play" the information within the security interface from the selected previously occurring viewing time, enabling the user to view changes in displayed information in simulated real-time (or augment real-time slowed down or sped up relative to real-time). Accordingly, a user can view security interface events as they occur in real-time, or can beneficially go back in time to re-watch security interface events in simulated real-time as needed.

The second interface portion 1502 displays a global map of a building, including robot icons for robots within the building, person icons for individuals within the building, and the like. The global map includes a window 1528 that corresponds to the current view of the local map within the first interface portion 1500. The global map can also update in real-time, for instance as the robots move within the building, and as the portion of the building illustrated in the local map changes.

The third interface portion 1504 illustrates text notifications corresponding to events occurring within the portion of the local map 1500, corresponding to information associated with objects or individuals within the building, or corresponding to any other information associated with the security interface. In the embodiment of FIG. 15, three text notifications are displayed. The first is "Note: patrol route 1520 started by robot 1510 (6:32 pm)", and indicates that the robot 1510 began patrolling route 1520 at 6:32 pm. In other words, the notification indicates that a particular object (the robot) began performing a security operation (patrolling the patrol route) at a particular time. The second notification is "Warning: unauthorized activity detected by root 1510 (6:41 pm)", and indicates that a warning event was detected corresponding to the warning notification icon 1524. The third notification is "Alert: prohibited activity detected by robot 1510 (6:42 pm)", and indicates that a security alert event was detected corresponding to the alert notification icon 1526. In other words, the second and third notifications indicate particular security events corresponding to different security levels, the type of activity that triggered the security events (unauthorized activities and prohibited activities), the entity that detected the security events (the robot 1510), and the time each security event was detected. It should be noted that in some embodiments, the text notifications can also identify individuals detected by robots, individuals associated with security violations, door or window alarms, detected motion or sounds, or any other information associated with security events, objects, individuals, robots, infrastructure systems, or security systems.

The fourth interface portion 1506 displays a robot interface. In the embodiment of FIG. 15, information associated with the robot 1510 is displayed. In particular, the robot interface displays an icon or image representative of the robot is displayed, displays a status of the robot, displays an amount of available power to the robot, and displays a current security operation being performed (in the embodiment of FIG. 15, the task is patrolling). In addition, the robot interface includes buttons enabling a user of the security interface to view of video feed from the robot (which can be displayed within the fourth interface portion or elsewhere within the security interface), to participate in telepresence activities (such as a video chat with an individual within a proximity of the robot), to change the security operation being performed by the robot (the "change task" button), to view the schedule of the robot (including queued or scheduled security operations, scheduled recharge times, and the like), or to configure the behavior or settings corresponding to the robot. In some embodiments, a user of the security interface can schedule future security operations for the robot, for instance by selecting a starting time for each selected security operation, each selected patrol route, etc.

In some embodiments, a user of the security interface can interact with the security interface in various ways. For instance, a user can scroll the first interface portion 1500 to change the portion of the global map displayed within the local map. Likewise, a user can touch a portion of the global map of the second interface portion 1502 to relocate the window 1528 and thus relocate the portion of the global map shown within the local map. A user can also zoom in or out on the local map, can select a displayed icon for information associated with the entity or object corresponding to the icon (for instance, a user can select a robot icon or security camera icon to change the information displayed with the fourth interface portion 1506), and can select an icon corresponding to an entity or object to change a state of the entity or object (for instance, a user can select a door icon to open, close, lock, or unlock the corresponding door, or can select a robot icon to change a security operation being performed by or mode of the corresponding robot).

In some embodiments, a user can use the security interface to change the patrol route of a robot by selecting among a set of patrol routes, or by manually drawing a patrol route on the local map (upon which, a set of navigation instructions through a building portion corresponding to the drawn patrol route will be sent to the robot, and the robot can begin patrolling the drawn patrol route based on the navigation instructions). In addition, a user can select a building portion or room displayed within the local map for investigation by a robot. In response, the robot can investigate the building portion or room, and can provide information corresponding to the investigation (such as video data or sensor data) back to the security interface for display. A user can select a displayed robot icon or security camera icon to adjust a field of view or viewpoint of the robot or security camera, to view video captured by the robot or security camera, or to change the behavior of the robot or security camera. A user can also use the security interface to select a location for a robot to guard or act as sentry (for instance, by drawing a line within the local map), can select a guard or sentry behavior (e.g., "allow no one to pass", "allow users with proper security credentials to pass", etc.), and can select an active guard or sentry time (e.g., "guard between the hours of 1:00 am and 7:00 am). In some embodiments, the security interface can beneficially enable a user to manually control a robot, for instance using a keyboard or joystick mechanism to move the robot around a location displayed on a map and to adjust a viewpoint or field of view of the robot.

A user can interact with the security interface using any suitable means. For instance, a user can click on a displayed robot icon using a mouse or selecting gesture on a touch-screen display, a list of security options can be presented by the security interface in response, the user can select one of the presented security operations, and the security interface can instruct the robot to being performing the selected security option. Likewise, a user can scroll or zoom using a mouse or a scrolling gesture on a touch-screen display.

In some embodiments, an interface portion can display an identity of individuals in an area. For example, the interface portion can list the individuals who have been identified (for example, the name, position, and/or access credentials of the individuals), and can also list individuals who have not been identified (e.g., by a generic placeholder such as "Individual #1", and an indication that the individual has not been identified). The interface portion can also list a location of each individual, for instance, a building or room in which each individual is located. Likewise, an interface portion can list security personnel in an area, and a location of each security personnel.

Each interface portion or each category of information shown within a security interface can be associated with an access level. Accordingly, the interface portions or categories of information shown to a user of the security interface can be limited based on the security credentials of the user. For instance, if a user is not authorized to view video streams from robots, the security interface can be configured to prevent video streams from being shown to the user.

The security interface can also differentiate displayed areas within a map based on a category of the area. For instance, off-limits rooms can be displayed in a first color, rooms available to high-security individuals can be displayed in a second color, and can display rooms available to everyone in a third color. The security interface can also display geofences within a map, for instance boundaries of areas not accessible to robots, and areas available to non-employee visitors. Finally, the security interface can differentiate areas of a map currently visible to robots and/or other sensors. For instance, the security interface can show areas of a map visible to robots in a first set of color tones, and can show areas of a map not visible to robots in a second set of color tones (for instance, a darker set of color tones), beneficially enabling a user of the security interface to quickly identify currently unmonitored portions of a building.

In some embodiments, the security interface can show security information received from or representative of more than one location. For instance, the security interface can receive security information from a plurality of different buildings, for example belonging to the same entity or company. In such embodiments, a user of the security interface can toggle the interface between locations. For example, a user can configure the security interface to show a map of robots, tracked assets, and security information within a first building, and can subsequently configure the security interface to show a map of robots, tracked assets, and security information within a second building. Each location can be associated with a different selectable icon displayed within the security interface, can be listed in a selectable drop-down list, and the like. The security interface can update with security information associated with a selected location in response to the user selection of a configuration option associated with the location.

A user of the security interface can also configure security policies using the security interface. For instance, a user can select security policy components, including one or more of a location, a time range for which the security policy will be active, one or more categories of individuals to whom the security policy applies (e.g., employees, managers, staff, visitors, etc.), permitted access credentials, security policy exceptions, actions taken in the event of security policy violations (e.g., notify security, revoke user credentials, lock nearby doors, etc.), and the like. The security policy configured by the user of the security interface can be stored and subsequently implemented, for instance by patrolling robots, security systems, and/or nearby doors and access gates. In some embodiments, the security interface can log the credentials, identity, and/or actions of users of the security interface, beneficially allowing the security interface to generate an auditable log of the users and user actions for subsequent review (for instance, for accountability and privacy considerations).

Figure 16:
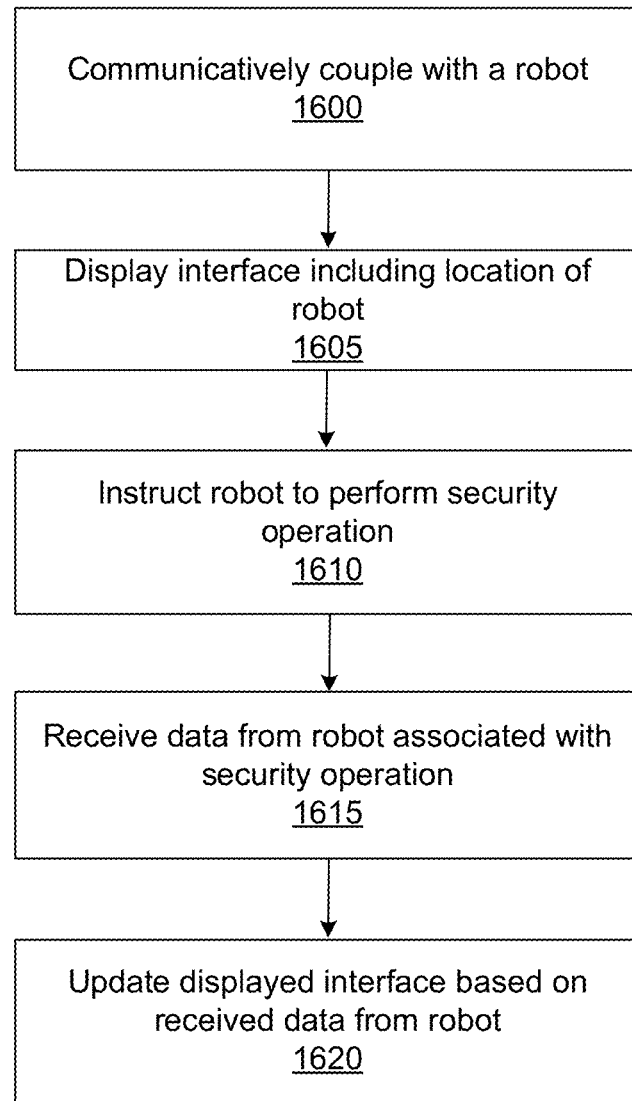
FIG. 16 is a flow chart illustrating a process for interacting with a security robot using a security interface, according to one embodiment.

FIG. 16 is a flow chart illustrating a process for interacting with a security robot using a security interface, according to one embodiment. The security interface communicatively couples 1500 with a robot (for instance, via the central system 210). The security interface is displayed 1505 to include a location of the robot. A user of the security interface instructs 1510 the robot to perform a security operation. For instance, a user can instruct the robot to patrol a particular patrol route, or to investigate suspicious activity. The security interface receives 1515 data from the robot associated with the security operation. For instance, the robot can provide video captured during the performance of the security operation, and/or can provide an updated location of the robot. The security interface updates 1520 the displayed interface based on the received data from the robot. For instance, the security interface can be updated to display the video captured by the robot or the updated location of the robot.

M. Additional Security Operations

The robot 100 can perform one or more additional security operations, either independently of or in concert with one or more of the security operations described above. In one embodiment, the robot can operate in a privacy mode, where data collected and security operations performed by the robot are not communicated to an external entity (to preserve the privacy of individuals in proximity to the robot, or to reduce the likelihood that such data is intercepted during transmission) unless one or more security criteria are triggered (such as the detection of suspicious activity, the identification of an unauthorized individual, and the like). Operating in such a privacy mode further beneficially enables the robot to operate in proximity to sensitive data or objects (such as secret lab equipment or confidential/classified information) without a risk of such sensitive data or objects being discovered by unauthorized entities within access to the robot or the central system 210. In some embodiments, the robot is configured to blur faces within captured images or videos to preserve the privacy of the individuals associated with the blurred faces. Such facial blurring may be performed by the robot on the captured images and videos only when the images or video is transmitted to an external entity. The robot can also beneficially blur computer monitors, documents, sensitive data or instruments, or any other objects or information as needed to satisfy security restrictions.

In some embodiments, the robot 100 can use one or more sensors, such as IR cameras, 3D depth cameras, ultrasonic sensors, and rangefinders to navigate within darkness. Doing so beneficially enables the robot to operate during times when the lights in an area are otherwise turned off. Accordingly, the absence of visible light in an area is not detrimental to the ability of the robot to perform security operations. As the majority of burglary occurs at night when employees or other individuals are not present, the ability of a robot to perform security operations in darkness beneficially prevents the need to power lights in an area. When the robot detects suspicious activity or when one or more security criteria are triggered while operating in darkness, the robot can activate a spotlight of the robot to highlight an object associated with the detected activity, can activate the buildings lights (e.g., by communicating with the central system 210 to turn on the lights for a particular area associated with the detected activity), or can call one or more security personnel 250 or other robots to the area associated with the detected activity.

In some embodiments, the robot 100 can enable a user within a proximity of the robot to interact with security personnel 250 or an operator of the robot. For instance, the robot can display real-time video of the operator or security personnel to the individual, and/or can transmit audio communications between the individual and the operation or security personnel. Doing so beneficially enables the individual to speak with a human associated with the robot, for instance in order to request authorization for access to a particular area, to authenticate the individual's credentials, or to enable the individual to request help or assistance.

The robot 100, in response to determining that the robot has lost connectivity with the network 200 during the patrolling of a route, can return to an earlier location with the route where the robot was connected to the network. Likewise, in some embodiments, the robot can move to a location further along the patrol route until connectivity is restored. While the robot is disconnected from the network, all data connected by the robot (related to security or otherwise) can be stored until connectivity is restored. When the robot is able to reconnect to the network, the robot can upload the stored data (for instance, to the central system 210).

In some embodiments, the robot 100 can monitor the environment in which the robot operates over time to detect potential security anomalies using one or more of the sensors of the robot. For instance, the robot can detect the temperature of particular rooms within a building, can detect smoke, can detect carbon monoxide levels, can detect light levels, can detect chemical compounds or gaseous substances, and the like. The robot can obtain and store these measurements, and can map out variations of these measurements over time and by location. If, during the course of a patrol, a robot records obtains a measurement that deviates by more than a threshold from historical measurements, the robot can flag these measurement as a security anomaly. For instance, if the robot detects the temperature of a room over time to be between 72 degrees Fahrenheit and 78 degrees Fahrenheit, the robot can identify a measure of the room of 68 degrees Fahrenheit as an indication of a security anomaly (for instance, as a result of someone leaving a window open). The detected security anomalies can subsequently be reported to the central system 210, or to an external entity (such as a building operator or facilities management team).

The robot 100 may detect fires, for instance visually using a camera 722, an IR sensors, a temperature sensor, or any other suitable measuring system. In response, the robot can attempt to distinguish the fire, for instance using an on-board fire extinguisher, can flag the fire for security personnel to handle, can flag the fire to the central system 210, can trigger a fire alarm, can trigger a building's sprinkler systems, or can call the fire department or other emergency services. The robot may also detect when an individual is smoking (for instance, either visually, by detecting the smoke in the air, or by detecting the presence of cigarette-related gases in the air), and can inform the individual that smoking is prohibited. In such instances, the robot can also inform the central security system. In emergency situations, the robot can enable an external entity (such as an operator of the robot) to communicate with individuals within a proximity of the robot, for instance to assist with evacuation, to hold or disable elevators, to unlike exit doors, to provide information to response personnel, to sound alarms, to map out a location of a fire, to identify exit routes, to obstruct or locate unauthorized or dangerous individuals, and the like.

In some embodiments, the robot 100 can include airbags configured to inflate when the robot is falling over in order to cushion the fall to the extent possible. The use of airbags to soften impact upon falling can beneficially reduce damage to the robots. In some embodiments, the robot can prevent "tailgating", or the following of a first individual with proper security credentials by an unauthorized individual through a door or access gate open in response to the security credentials of the first individual.

In some embodiments, the robot 100 can be used, for instance, by a security personnel 250 or user of the central system 210 to locate an object or individual. In such embodiments, the central system can determine a last known location of the object or individual (for instance, by querying the security interface or by accessing data logs of object and individual locations), and can provide this location to the security personnel or user. Alternatively, the last known location of the individual can be used (for instance, by robots) to scan the area within a proximity of the last known location for the individual. When the current location of the individual is determined (for instance, in response to the deployment of a robot to the last known location and the subsequent scanning of the area), the current location can be provided, for instance to the requesting entity.

In some embodiments, the robot 100 can determine its location without using a map (for instance, in response to a mapping error). For instance, the robot can ask a nearby human for help, can use RFID tags found in a vicinity of an area and can identify a historical location of the RFID tags, can ask nearby robots for location information, can query the central system 210 for the robot's location, can use 3D information or 2D/map layout information to determine the location of the robot, and the like.

As noted above, the robot 100 can perform operations in addition to security operations. For instance, the robot can be located within an entrance or doorway and greet people as they enter or leave an area. The robot can request janitorial service in response to detect a mess within a proximity of the robot, and can act in self-defense in the event that someone tries to tamper with the robot or with another security system or infrastructure system.

In some embodiments, the robot 100 can delivery objects, packages, paperwork, and the like to an individual, for instance by querying a semantic map, the central system 210, another robot, or any other system or entity that tracks the location of individuals. In response to identifying a location of the individual, the robot can navigate to the individual, can verify the individual's identity (for instance, by scanning an RFID badge of the individual, by performing facial or voice recognition on the individual, or by any other suitable means), and can have the individual sign for the delivery before providing the object to the individual. In some embodiments, the robot can enable guests to check-in via the robot's touchscreen display. In other embodiments, the robot can enable individuals near the robot to report emergency situations, for instance a fire nearby, an unauthorized individual within the vicinity, a medical emergency, and the like.

It should be noted that in the examples of robot functionality described above, an exhaustive list of security operations that a robot can perform is not given for each example for the purposes of simplicity. However, it should be noted that any security operation described herein or otherwise can be performed by the robot in any context described herein, and that the lack of description of a particular security operation in a particular context does not indicate that the robot is unable to perform the security operation in that context.

Semantic Mapping

As noted above, the semantic mapping system 736 of the robot 100 can generate or update a semantic map associated with a location or setting in which the robot is located. As used herein, a "semantic map" refers to a map that includes one or more objects, entities, or individuals, and that includes a meaning, description, identity, or status of the identified objects, entities, or individuals. Semantic maps generated by the semantic mapping system can be stored locally by the robot, or can be uploaded to the central system 210 for storage in the semantic maps storage module 342.

A. Semantic Map Generation

In some embodiments, the robot 100 can generate a semantic map from scratch, while in other embodiments, the robot can update an existing semantic map or can generate a semantic map from a non-semantic map, for instance by adding semantic details (such as information describing the location, identity, status, or other characteristics of detected objects) to the non-semantic map. In embodiments, where the robot generates a semantic map from scratch, the robot first generates an area map identifying obstacles and pathways using, for instance, one or more of the scanners 726 (such as a laser rangefinder or other suitable depth sensor) and a simultaneous localization and mapping (or "SLAM") algorithm. As used herein, such maps are referred to as "SLAM maps".

Figure 17:
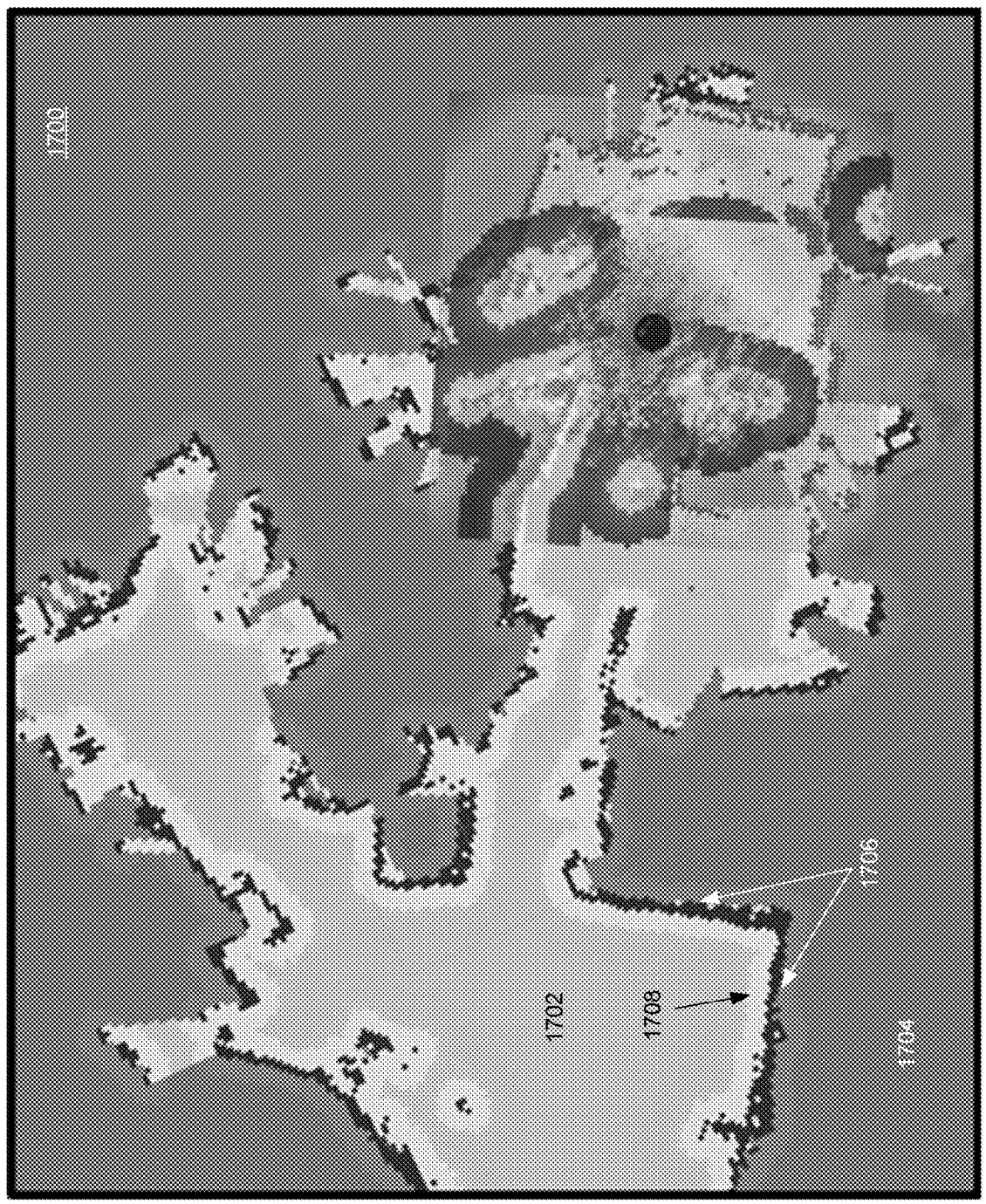
FIG. 17 illustrates an example of a SLAM map, according to one embodiment.

FIG. 17 illustrates an example of a SLAM map, according to one embodiment. In the embodiment of FIG. 17, the SLAM map 1700 illustrates a partial mapping of a building floor. The map includes an area 1702 that is navigable by a robot 100. The area 1702 does not include obstacles or objects that might impede the movement of the robot. The area 1702 can be identified by the robot generating the SLAM map, for instance by using a laser rangefinder or other depth sensor to identify the location of objects (such as chairs, desks, pottery, and the like) or obstacles (such walls, pillars, closed doors, and the like). The navigable area 1702 can be indicated within the map, for instance using a first color, texture, or shade within the map.

The map 1700 also includes an unknown area 1704 that is not yet scanned by the robot 100. This area may be navigable, though because the robot has not yet scanned the area, potential obstacles within the area 1704 have not been identified. Unknown areas can be represented within the map using a second color, texture, or shade, allowing a viewer of the map to distinguish between the navigable areas 1702 and the unknown areas 1704. Finally, the map also includes obstacles 1706, representing areas the robot cannot navigate through without potentially being obstructed or impeded, or without damaging objects representative of the obstacles. In the embodiment of FIG. 17, the obstacles are generally the walls of the building floor represented by the map, though also include other objects within the building floor that are freestanding or are away from the walls. Obstacles can be indicated within the map using a third color, texture, or shade, allowing a viewing of the map to distinguish the obstacles from the navigable areas 1702 and the unknown areas 1704.

In some embodiments, boundaries 1708 are included within the map 1700, for instance areas within a threshold distance of the obstacles 1706. Such boundaries can be indicated using a fourth color, texture, or shade. When the robot 100 uses a SLAM map to navigate an area (such as the floor of the building represented within the embodiment of FIG. 17), the robot can move within the navigable areas 1702 and avoid the boundary areas to the extent possible, beneficially reducing the likelihood that the robot runs into or otherwise makes contact with an obstacle. In some embodiments, when the robot moves with the navigable areas 1702, the robot can move at a first top speed, and when the robot enters the boundary areas 1708, the robot can move at a second top speed slower than the first top speed. Similarly, robot speed can be adjusted based on historical foot traffic information, based on a current room occupancy, based on detected sounds (e.g., detected human voices or opening doors), based on a proximity to blind corners or intersections, based on a room type (e.g., a robot may move at a slower speed in kitchens than when navigating within parking lots), based on a proximity to particular objects (e.g., a robot may move slowly around high-value or fragile objects), or based on any other suitable factor.

While SLAM or other areas maps ("non-semantic maps" hereinafter) can be useful for the purpose of robot navigation within an area, the rangefinders or depth sensors used by the robot 100 to generate the SLAM map do not generate information about what detected obstacles or objects are, or how the robot should handle or interact with the detected obstacles or objects. The robot can detect and classify or identify objects, and can determine a state or other characteristics of the objects. Information describing the classified/identified objects and the corresponding detected states or other characteristics of the objects are stored in conjunction with the non-semantic maps, in association with a location of the objects relative to the non-semantic map. The generation of a semantic map refers to the inclusion of information describing objects represented within the map (and their corresponding detected states and characteristics).

In some embodiments, objects can be detected and identified by the robot 100 using one or more sensors, for instance cameras, RFID readers, IR sensors, and the like. For example, the robot can capture an image of an object, and can apply image detection or classification algorithms to identify the object type. Likewise, the robot can analyze images of the object to determine a state of the object. For instance, if the robot detects a door, the robot can also detect whether the door is open or closed. In some embodiments, the identification of objects and object states or characteristics can be manually provided by a system administrator, a robot operator, an employee or individual associated with the robot, and the like. In some embodiments, the robot can access object identification and state information from a repository of object information, such as a building database identifying the location and expected state of various objects within the building. In some embodiments, object information can be received from other robots that have scanned locations and identified objects within the locations. Object information can also be received from accessing the central system 210, one or more infrastructure systems 220, or one or more security systems 230. For instance, for a smart door, the robot can query the state of the smart door (e.g., locked or unlocked) via the network 200. Likewise, the robot can query a building elevator system to determine the current floor of an elevator.

Examples of detected objects and corresponding object states and properties (if applicable) include:
Doors: open/closed, locked/unlocked, required security credentials to unlock
Windows: open/closed, locked/unlocked, broken
Elevators: number, current floor, button location, the date of last inspection (determined by scanning text of an inspection certificate within the elevator)
Stairs: number of floors
Bathrooms
Lights: on/off, location of light switch, in need of replacing (burnt out bulbs)
Plumbing/piping locations: water damage/leaks
Trashcans/recycling bins/compost bins: last emptied, in need of emptying
Rooms: room type (such as office, kitchen, conference room, bathroom, common area, game room, storage closet, guard station, laboratory, computer room, utilities room, and the like), room number, locked/unlocked, required security credentials to access, normal temperature range, current occupancy
Access devices: lock types, card readers, RFID readers
Conference rooms: in use/reserved/free, capacity, conference room assets (desk, number of chairs, computer equipment, monitor/display/projector, white board), room number
Desks: owner, equipment (chair, computer, computer dock)
Walls: type (glass, plaster, moveable, etc.), location of doors within walls
Building structural obstacles (such as pillars, columns, etc)
Thresholds: geofences, boundaries between rooms, access credentials required to cross
Ramps
Hallways
Kitchens: available equipment (microwaves, refrigerators, sinks, water fountain, ice machine, tables, chairs, etc.)
Water fountains
Fire extinguishers: the date of last inspection
Smoke alarms: the date of last inspection
Fire sprinklers or other fire suppression systems: the date of last inspection
Vents
Power outlets
TVs and monitors
Computers and computer equipment: printers, servers, keyboards, keypads, tablets
Network equipment: routers, switches, modems, networking cables, servers, network names, local area network equipment
High-value assets: artwork, safes, secure document repositories or cabinets, secure computer equipment, cash registers, ATMs, lab equipment, medical equipment
Security systems: guard stations, security cameras, access gates, audio detectors, motion detectors, aerial systems, security displays
Robot systems: robots, charge stations, robot docks, robot patrol routes
Infrastructure systems: temperature sensors, power systems, generators
Retail objects: racks, displays, shelves, drawers, inventory object types, kiosks, checkout desks
Decorative objects: paintings, sculptures, plants
First aid kits
Locations of frequent false positives (objects frequently identified as people, etc.)

In addition, a robot 100 can determine usage patterns of detected objects (such as any of the detected objects listed above), and information describing such usage patterns can be included within the semantic map. For instance, a robot can query a building system to determine the floors in a building most frequently visited by an elevator, can access a scheduling system of a building to determine historical usage patterns for conference rooms, or can monitor a kitchen area to determine the times of a day when the kitchen is the most crowded. Likewise, a robot can determine behavior or movement patterns of people within an area, and information describing such patterns can be included within the semantic map. For instance, a robot can query a security system to determine a list of people who frequently pass through an access gate, or can track individuals (for instance, by scanning the RFID badges of the individuals) to determine historical patterns of movement of the individuals.

In some embodiments, the robot 100 can determine a height of detected objects, and can generate a 3D semantic map based on the detected heights. For instance, the robot can, using rangefinders, cameras, or other sensors, determine the height of nearby walls, doors, windows, obstructions, and the like. Using these heights, the robot can generate a 3D model of a 2D semantic map, for instance by rendering a building's structure in 3D (e.g., walls, hallways, passage ways, and the like), and by projecting detected objects at a height relative to the rendered structure based on a detected height of the objects in the real world.

Figure 18:
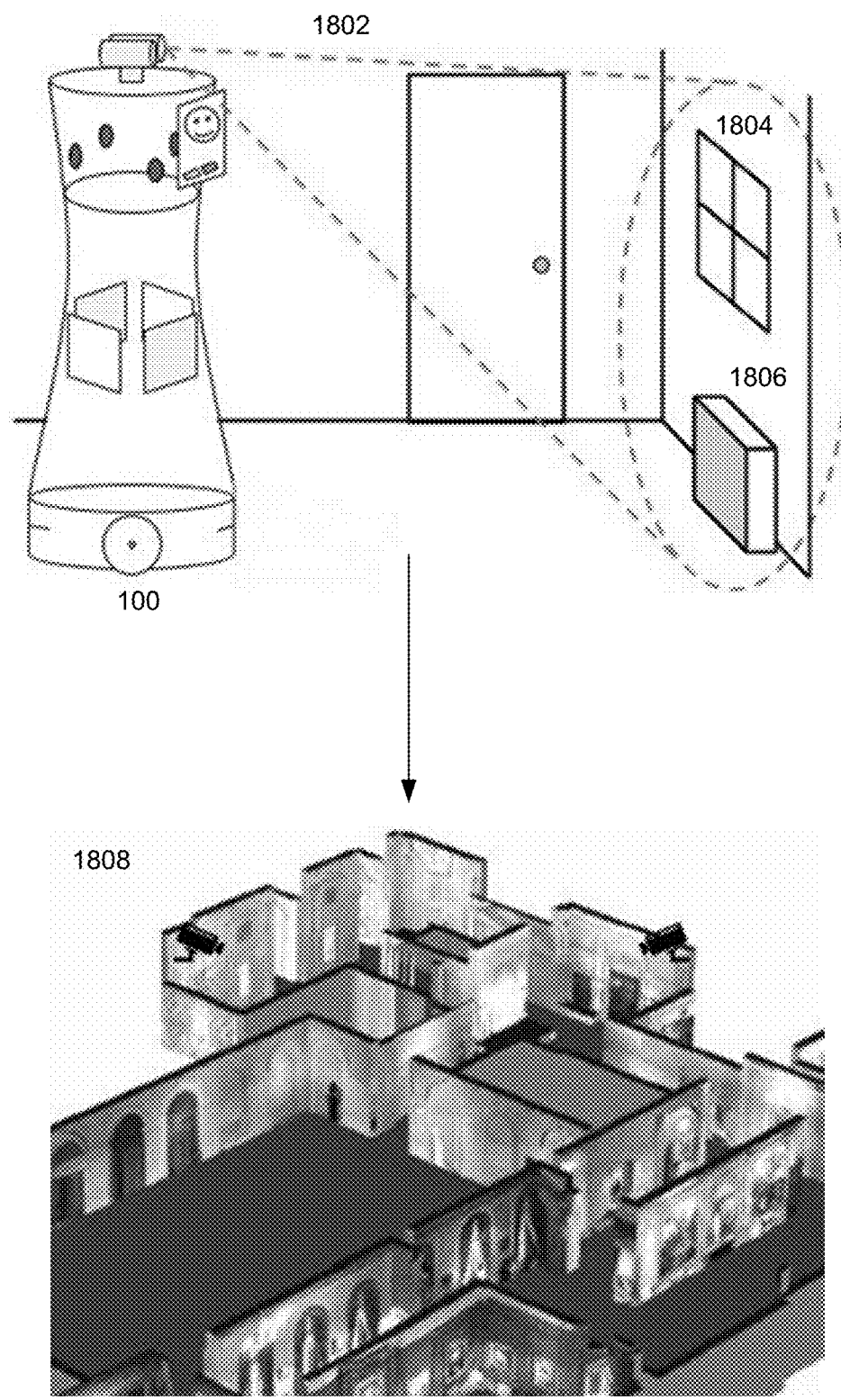
FIG. 18 illustrates the generation of a 3D semantic map by a robot, according to one embodiment.

FIG. 18 illustrates the generation of a 3D semantic map by a robot, according to one embodiment. In the embodiment of FIG. 18, the robot 100 uses a camera array to detect 1802 objects, such as the window 1804, and the heater vent 1806, within a proximity of the robot. The robot also determines of height of each of these detected objects. The robot proceeds with detecting a height of all detected objects within an area, such as a building floor. When the objects and the corresponding heights of the objects within the area are determined, the robot can generate a rendered 3D semantic map 1808 representative of the area. The 3D semantic map can include visual representations of the detected objects (either captured images of the objects or substitute representations of the objects based on the object type) at the detected height (within the 3D semantic map) of the objects. Although description of dimensions within a 3D semantic map herein is limited to object height, it should be noted that a robot can detect object width and depth as well as height, and can in some embodiments generate 3D semantic maps that represent detected objects at corresponding heights, widths, and/or depths.

Figure 19:
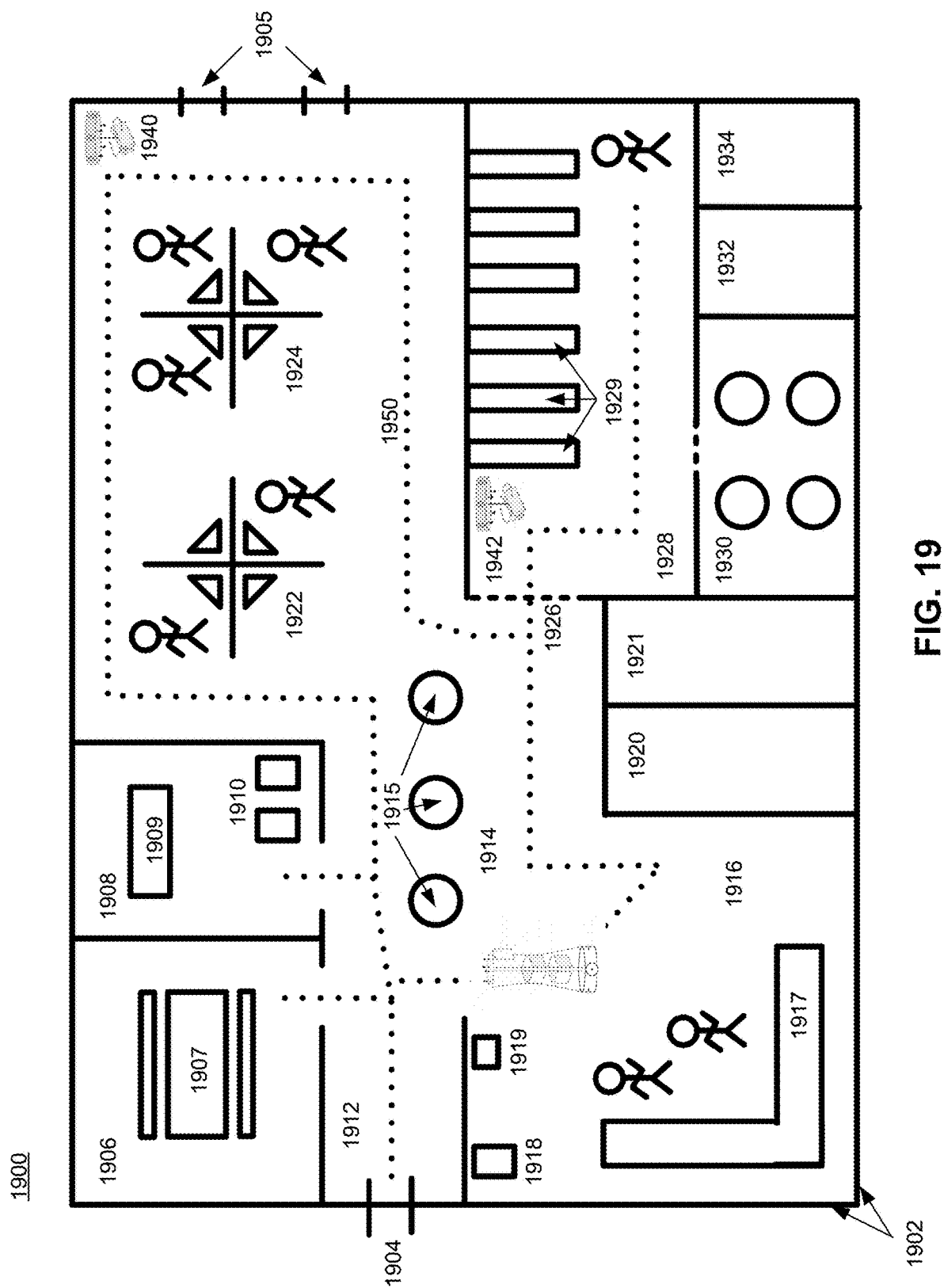
FIG. 19 illustrates an example semantic map of a building floor, according to one embodiment.

FIG. 19 illustrates an example semantic map of a building floor, according to one embodiment. In some embodiments, the semantic map 1900 of FIG. 19 is stored as a data construct accessible to and usable by a robot 100, an operator of the robot, the central system 210, security personnel 250, or any other suitable entity. In some embodiments, the semantic map is displayed within an interface, beneficially enabling a human observer to view and/or interact with the semantic map (for instance, by clicking on or selecting an object identified within the semantic map, and providing additional information about the object, such as a state of the object, in response). Information identifying an object, a state of the object, a location of the object, or other characteristics of the object is referred to herein as "identification information".

In the embodiment of FIG. 19, the semantic map 1900 includes walls 1902 associated with the building floor. The semantic map also includes a door 1904, and windows 1905. The semantic map 1900 further identifies various rooms, such as the conference room 1906, the office 1908, the entryway 1912, the sitting area 1914, the kitchen 1916, the restrooms 1920 and 1921, the secure area 1928, the lab 1930, and storage rooms 1932 and 1934. In addition, the semantic map identifies objects within these rooms, such as the conference table 1907, the desk 1909, the chairs 1910, the ottomans 1915, the couch 1917, the fridge 1918, the sink 1919, and the shelves 1929. The semantic map further identifies infrastructure, such as the cubicle arrays 1922 and 1924. Finally, the semantic map identifies security systems, such as the access gate 1926, security cameras 1940 and 1942, and the patrol route 1950.

In some embodiments, the semantic map 1900 can display identification information as text within the semantic map. For example, room names, room numbers, the names of office owners, and the like can be displayed within or overlaid upon the semantic map. In some embodiments, the semantic map can highlight portions of the semantic map corresponding to identification information. For example, the portion of the map corresponding to the conference room 1906 can be highlighted a particular color, for instance a color corresponding to conference rooms, and the portion of the map corresponding to the restrooms 1920 and 1921 can be highlighted a different color, for instance a color corresponding to restrooms. In some embodiments, the patrol route 1950 can be displayed as a line or dotted line, as a colored path (the boundaries or width of which corresponds to the most likely path of the robot 100 as the robot patrols the route), or using any other suitable identifier. Portions of the semantic map can also be color-coded based on access credentials required to access the portions, based on a type of room or map portion, based on a current occupancy of rooms or map portions, or based on any other suitable criteria. In addition to displaying text or color representative of the identification information, the semantic map can include icons or other visual indicators representative of the identification information or various types of identification information, and can further include a legend within the display of the semantic map identifying the meaning of each color, icon, and the like used to represent the identifying information.

Although reference is made herein to the display of identification information by the semantic map 1900, it should be noted that in some embodiments, such information is not immediately visible to a viewer of the map. For instance, the semantic map may be displayed without text or other identifiers, and may display text and other identifying information only upon a mouseover of an object, a selection of an objection, a configuration of the display of the semantic map into a particular mode that displays the identifying information, and the like. In embodiments where the semantic map is not displayed (for instance, embodiments in which the robot 100 uses the semantic map to perform a task or security operation), the information identifying objects (and object location, state, and characteristics information) can be stored within metadata of the map, stored in a separate data construct corresponding to the map, or stored in any other suitable way such that the information is accessible to an entity viewing or using the semantic map.

It should be noted that although state information or object characteristic information is not illustrated in conjunction with the objects in semantic map 1900 of the embodiment of FIG. 19, the semantic map can include such information. State information or object characteristics information can be presented to a user viewing the semantic map (for instance, in an overlay interface or an interface adjacent to the semantic map), and can be displayed any time the semantic map is displayed, or in response to a request for such information (for instance, in response to the selection of an object displayed within the semantic map). For example, the semantic map can include information identifying the door 1904 as currently closed and unlocked, and identifying the windows 1905 as open. Likewise, the semantic map can store a maximum occupancy of the conference room 1906, an owner of the office 1908, individuals assigned to desks within the cubicle arrays 1922 and 1924, requisite credentials required to access the security area 1928, and the like.

Figure 20:
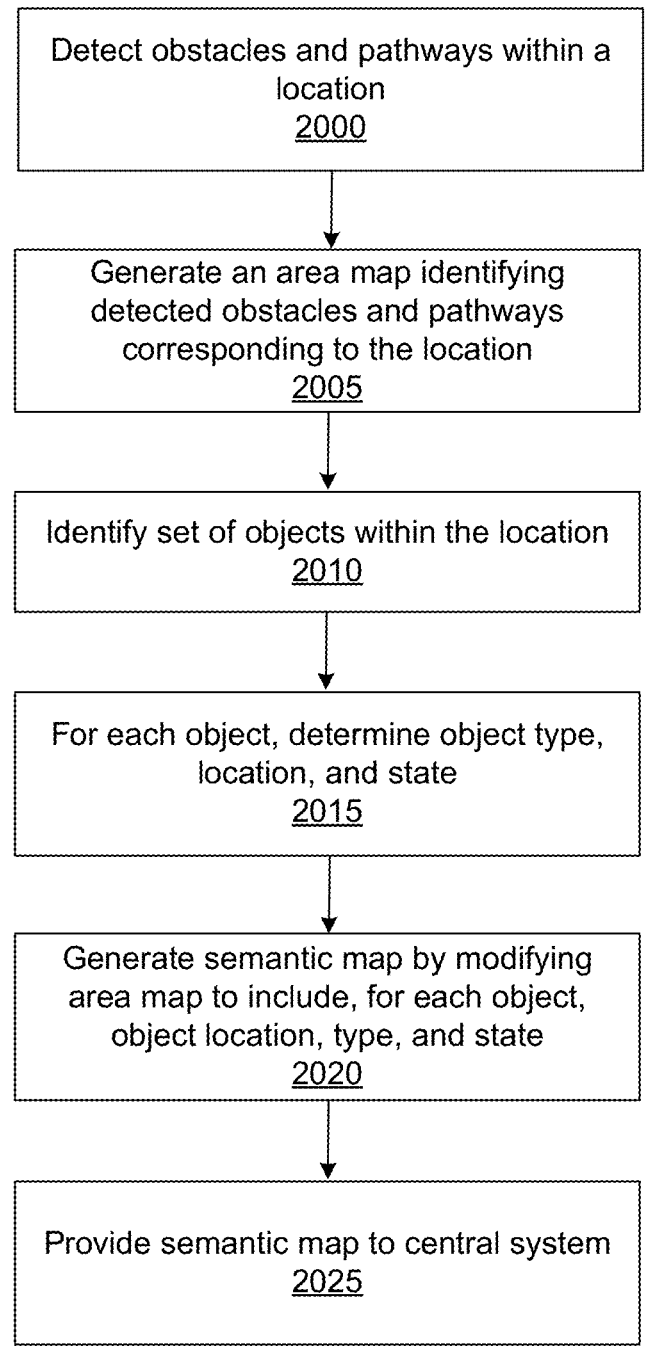
FIG. 20 is a flow chart illustrating a process for generating a semantic map, according to one embodiment.

FIG. 20 is a flow chart illustrating a process for generating a semantic map, according to one embodiment. A robot detects 2000 obstacles and pathways within a location (such as a building floor), for instance using laser rangefinders or other object, obstacle, or depth sensors. The robot generates 2005 an area map (or non-semantic map) identifying the location of the detected obstacles and pathways corresponding to the location. The robot identifies 2010 a set of objects within the location, for instance using a camera array or other sensors or image recognition components. The robot determines 2015, for each object, a type of the object, the location of the object, and a state of the object. The robot generates 2020 a semantic map by modifying the area map to include, for each object, the type and state of the object at the location within the area map corresponding to the location of the object. In some embodiments, the semantic map includes an identifier or other identifying information corresponding to the detected objects. The semantic map is then provided 2025 to a central system, for instance a system communicatively coupled to the robot.

B. Semantic Map Usage

In some embodiments, a floor plan for a building floor can be generated based on a semantic map generated by the robot 100. Likewise, a semantic map can be generated by the robot based on a building floor plan. As used herein, a floor plan can include a SLAM map. Locations of needed informational signage within the building floor can be identified using the semantic map, for instance wheel-chair ramp access signs, conference room names, restroom signs, and navigational signs (for example, indicating a direction to the kitchen). In some embodiments, a robot, security personnel 250, or any other individual can use a semantic map to identify any safety equipment (such as fire extinguishers) or building infrastructure (such as elevators) that require inspections soon, or whose inspections are past due.

A robot 100 can navigate within an area using a semantic map or a generated floor map, for instance by selecting a route that avoids obstacles (e.g., by a threshold distance), by selecting routes that avoid high-trafficked areas, by selecting routes that maximize the robot's exposure or proximity to high-value assets or other objects, and the like. In some embodiments, the robot can plan a route through an area (such as a building floor) in advance using the semantic map, or can dynamically adjust a route by querying the semantic map to identify an alternative route to a location (for instance, in the event that a route is blocked or in the event that suspicious activity or a security violation is detected).

Semantic maps can include permissible locations within map portions for detected objects. For instance, for high-value objects, such as computer equipment or sensitive documents, a semantic map can identify rooms in which the high-value objects are allowed to be taken. A robot 100 can detect an object within a building (for instance, while patrolling a route through the building), can query a semantic map of the building with an identifier identifying the detected object to determine portions of the building in which the detected object is permitted to be, and can determine whether the detected object is located in a location in which it is not permitted to be. In such instances, the robot can notify security personnel 250 to relocate the object to a permissible location and can monitor the object until the security personnel arrive. In some embodiments, the robot can physically relocate the object to a permissible location, for instance using one or more robotic arms 740. In some embodiments, the robot, while patrolling a route, can detect all objects within an area (for instance, by scanning RFID tags coupled to the objects), and can use the semantic map to identify any detected objects within the area that are not permitted to be within the area, to identify any detected objects that are misplaced (for instance, after an office move from a first location to a second location), or to identify any detected objects flagged as lost.

Semantic maps can be used by a robot 100 to determine if particular rooms are over capacity. For instance, if a semantic map indicates that a particular conference room as a maximum occupancy of 10 people, a robot can determine that the conference room is over-capacity in response to detecting more than 10 people within the room. In such instances, the robot can inform the occupants that the room is over-crowded, or can flag the room for manual inspection by security personnel 250. In some embodiments, the semantic map can be used to identify historically under-utilized rooms, for instance at particular times of the day. In such embodiments, the identified under-utilized rooms can be prioritized for future room reservations, for instance by suggesting such rooms to individuals attempting to schedule meetings.

Semantic maps can be used to identify objects or infrastructure in needed of maintenance or repair. For instance, a robot 100 can use a semantic map to identify light bulbs that need to be replaced, leaks that need to be fixed, cracks within walls that need to be fixed, trash cans that need to be emptied, and the like. In response to identifying the objects or infrastructure in need of maintenance or repair, the robot can request that maintenance or building personnel perform the maintenance or repair. It should be noted that in some embodiments, a robot can perform these tasks without the use of a semantic map (for instance, by detecting a burnt out light bulb or a full trash can while patrolling a route). Likewise, it should be noted that in some embodiments, the semantic map can identify a location of objects (such as light fixtures or trash cans) within an area, but not the current state of such objects, and the robot can patrol a route within a proximity of each of the locations of the objects to determine if the objects need maintenance or repair (for instance, by detecting whether a light bulb is burn out or a trash can is full). In some embodiments, robots can regularly, periodically, or in response to a manual request, patrol maintenance routes based on a location of maintenance-related objects identified by a semantic map. It should also be noted that as described herein, the robot can update a semantic map in response to detecting events or characteristics of a location associated with the semantic map (e.g., by indicating a location of a burnt out light bulb, a broken window, etc.)

The robot 100 can use locations of likely false positive detections identified by a semantic map to determine if a detected object or individual is the result of a false positive detection. For instance, if a robot scans a wall poster of a person and identifies the person within the poster as an individual, the robot can query a semantic map to see if the location of the poster is associated with frequent or possible false positive detections of individuals. In such embodiments, the robot can flag the potential false positive detection for manual classification by an operator of the robot, can dismiss the detected individual as a likely false positive, can perform additional scans (such as heat scanning, IR scanning, or depth detection) to aid in the classification, or can perform any other suitable action in response to the semantic map identifying the location as associated with false positive detections. In some embodiments, in response to one or more false positive detections within a particular location, the robot can institute a "time-out" period, where subsequent detections within the location are ignored or classified as also likely false positive detections.

The robot 100 can measure various signals within a location, for instance while moving through the location or patrolling a route, and can aggregate the measured signals over time to obtain average signal values for particular locations. For instance, the robot can measure temperature, WiFi signal strength, detected network activity, the location and strength of Bluetooth or RFID beacons and devices, carbon monoxide levels, and the like. The aggregated information can be included within a semantic map, for instance as a heat map, where color or shade is used to represent values of the aggregated information (e.g., the color red can be used to represent high levels of WiFi signal strength, the color blue can be used to represent low levels of WiFi signal strength, and colors in between can be used to represent middle levels of WiFi signal strength). The robot can use a semantic map that includes aggregated or historical signal information to perform one or more functions or security operations. For example, if the robot loses connectivity to the network 200, the robot can use the semantic map to identify a location within a floor that historically has strong WiFi signal strength, and can move to the identified location to reconnect with the network. The loss of connectivity implies a loss of the inability of a robot operator to control the robot; thus, the ability of the robot to autonomously relocate to reconnect to the network beneficially enables the robot to restore the ability of the operator to control the robot.

Continuing with the above example, the robot 100 can use a semantic map that includes aggregated or historical signal information to identify locations with abnormally high or low temperatures (which may indicate a security violation, a broken furnace or air conditioning unit, an open or broken window, or the like), to identify locations with dangerous levels of carbon monoxide, to identify areas with abnormally high levels of network activity (which may indicate a security violation), or to identify any other signals that vary from historical averages or ranges. In such embodiments, the robot can perform a security operation (for instance, investigating a cause of the abnormal signal values, requesting security personnel 250 to come investigate, or performing an action or security operation using an infrastructure system 220 or security system 230), can trigger a fire alarm or fire sprinklers (for instance, in the event that abnormal levels of smoke or carbon monoxide are detected, in order to evacuate the premises), can request maintenance personnel to investigate (for instance, in response to determining that a heating or cooling system is broken), or can update the semantic map to include the abnormal signal information.

In some embodiments, semantic maps can include information identifying an individual's historical movements or behaviors. In such embodiments, the robot 100 can identify an individual within a location and/or performing an activity, and can use a semantic map to determine if the user is in a location outside of the historical norms of the user's movements or if the user's activity is outside of the historical norms of the user's behavior. In both instances, the robot can determine that the user may be acting suspiciously, and may represent a security policy violation. In response, the robot can perform a security operation, such as following and monitoring the individual, requesting that a security system 230 record video of the individual, locking nearby doors, and the like.

The robot 100 can update a semantic map as the robot moves within an area, for instance as the robot patrols the area. For example, as the robot detects objects, object states, and object characteristics during a patrol route, the robot can update a semantic map with information representative of the detected objects, states, and characteristics. As the robot patrols a route, the robot can query such a semantic map to determine if a detected object is in a different location than indicated by the semantic map, to determine if the object is in a different state that indicated by the semantic map, or to determine if the characteristics of the object are different than indicated by the semantic map. For instance, if the robot detects a window and determines that the window is closed on a first patrol of a route, updates a semantic map to indicate that the window is closed, then subsequently determines that the window is open on a second patrol route, the robot can query the semantic map to determine that the state of the window has changed between patrol routes. In such instances, if robot uses a semantic map to determine if the location, state, or other characteristics of a detected object changes, the robot can identify the change as a potential security threat or policy violation, and can perform one or more security operations in response.

The robot 100 can use a semantic map to identify infrastructure systems 220 and security systems 230 closest to a particular location. For instance, if the robot detects a potential intruder within a building at a given location, the robot can query the semantic map to identify security cameras closest to the given location, and can instruct the security cameras to look for and record video of the potential intruder. Likewise, if the robot detects smoke or high levels of carbon monoxide, the robot can query the semantic map to identify the fire detectors closest to the robot, can request smoke detection information from the identified fire detectors, can query the semantic map to identify fire sprinklers closest to the robot in the event that the fire detectors also detect smoke, and can activate only the identified fire sprinklers (beneficially reducing the damage caused by more distance fire sprinklers while still targeting the locations in which the smoke originates). Accordingly, the robot can query a semantic map with a location to identify infrastructure or security systems closest to the location, and can perform an action (such as a security operation) using the identified infrastructure or security systems.

Figure 21:
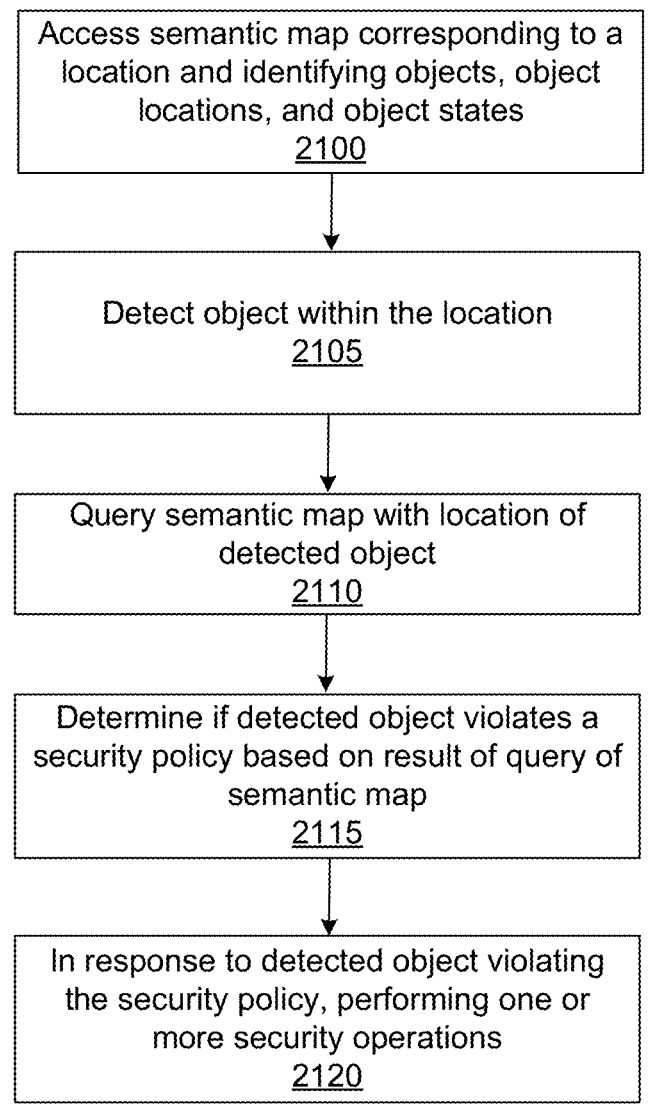
FIG. 21 is a flow chart illustrating a process for detecting security policy violations and performing security operations using a semantic map, according to one embodiment.

FIG. 21 is a flow chart illustrating a process for detecting security policy violations and performing security operations using a semantic map, according to one embodiment. A semantic map corresponding to a location is accessed 2100 by a robot (for instance, a robot patrolling a building floor). The robot detects 2105 an object with the location, and queries 2110 the accessed semantic map with the location of the detected object. In some embodiments, instead of querying the accessed semantic map with the location of the detect object, the robot queries the semantic map using an identifier or other property of the object (such as an RFID tag identifier). A result set of objects and corresponding information (such as object types, locations, and states) is accessed in response to the query. The robot determines 2115 if the detected object violates a security policy based on a result of the query of the semantic map. For instance, the robot can determine that a location or state of the detected object has changed in violation of a security policy governing the location or state of the detected object. In response to the detected security policy violation, the robot performs 2120 one or more security operations. For instance, the robot can monitor the detected object, can request security personnel investigate the detected object, or can instruct nearby security cameras to record video of the detected object.

RFID Management

As noted above, the RFID system 738 of the robot 100 can identify and determine the location of RFID tags within a proximity of the robot. In some embodiments, the robot can autonomously identify RFID tags within an area, beneficially enabling the robot to take inventory of objects coupled to the RFID tags, to identify missing RFID tags, to identify moved or misplaced RFID tags, and to update an inventory database based on the identified RFID tags. Although reference will be made herein to retail embodiments (with retail inventory coupled to RFID tags), it should be noted that the principles described herein apply equally to any embodiment in which the location and tracking of RFID tags is desirable, such as warehouse environments, office environments, laboratory environments, high security environments, and the like. It should also be noted that while reference is made to RFID readers and tags herein, the description herein applies equally to any type of signal emission and detection devices.

A. RFID Tag Detection

The robot 100 navigates within a location (such as a retail store or building floor) and identifies RFID tags within the location. In some embodiments, any number of robots can identify RFID tags within the location, for instance one or more ground-based robots and/or one or more aerial systems. Robots with RFID reading capabilities can beneficially detect RFID tags coupled to objects that tend to be relocated or moved, can beneficially increase an RFID detection area by virtue of the movement of the robot, and unlike stationary or wall/ceiling-mount readers, aren't limited in coverage scope.

As noted above, RFID tags can be coupled to retail inventory (for instance, clothing, electronics, books, and the like), warehouse inventory (such as boxes, crates, and the like), important assets (such as lab equipment, computer equipment, and the like), or to any suitable object. RFID tags can be passive (providing identification information at short distances in response to receiving a signal from a reader's interrogating radio waves) or active (with a local power source configured to provide identification information at much longer distances, and without requiring the receipt of a signal from a reader). In some embodiments, RFID tags can be stickers applied to a surface or object, while in other embodiments, RFID tags can include larger circuitry, a housing, a power source, and the like.

As noted above, the robot 100 can include reader antennas 730 to identify or detect RFID tags, and can include direction of arrival (or "DoA") antennas 732 to determine a location of the detected RFID tags. The RFID reader antennas of the robot can be distributed along a height of the robot, enabling the robot detect RFID tags at a plurality of heights. In some embodiments, the locations of the reader antennas are fixed, while in other embodiments, the reader antennas are configured move along a height of the robot, beneficially enabling the reader antennas to dynamically scan a plurality of heights for potential RFID tags. Likewise, the RFID DoA antennas can be fixed at various locations along a height of the robot, for instance at a top of the robot, on an exterior of the robot, or within the robot body. In other embodiments, the location of the DoA antennas can be changed dynamically. In embodiments where the robot can adjust a height of the reader antennas or DoA antennas, the reader or DoA antennas can be located on a moveable or extendible arm, or can be located on a moving surface within or on the outside of the robot.

FIGS. 22A and 22B illustrate example antenna distributions within a robot, according to one embodiment. In the embodiment of FIG. 22A, the robot 100 includes two sets of reader antennas 730 at two different heights within the robot, and includes a set of DoA antennas 732 on a top surface of the robot. In the embodiment of FIG. 22B, the robot 100 includes a similar distribution of reader antennas, but includes a set of DoA antennas within the robot body.

In some embodiments, the reader and DoA antennas can be distributed around a circumference or perimeter of the robot 100. For instance, in the embodiment of FIGS. 22A and 22B, the reader antennas 730 and the DoA antennas 732 each include a set of four antennas facing outward at distributed at 90 degree intervals around the circumference of the robot. In some embodiments, each antenna has a beamwidth of greater than 90 degrees such that a set of four antennas can form a collective beamwidth of 360 degrees around the robot. In some embodiments, each reader or DoA antenna is circularly polarized, while in other embodiments, pairs of antennas can be linearly polarized. In some embodiments, antenna arrays can be located on a rotating component within the robot (such as the robot head 602 or body 604), beneficially enabling the robot to rotate a portion of the robot to provide expanded and/or dynamically beamwidths without requiring the rotation of the entire robot.

Figure 23A:
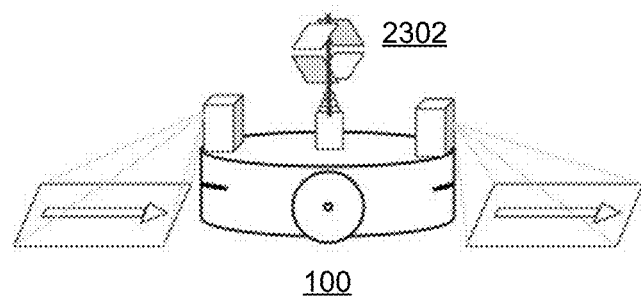
FIGS. 23A and 23B illustrate an example of an antenna array located on an extendible robot boom arm, according to one embodiment.
Figure 23B:
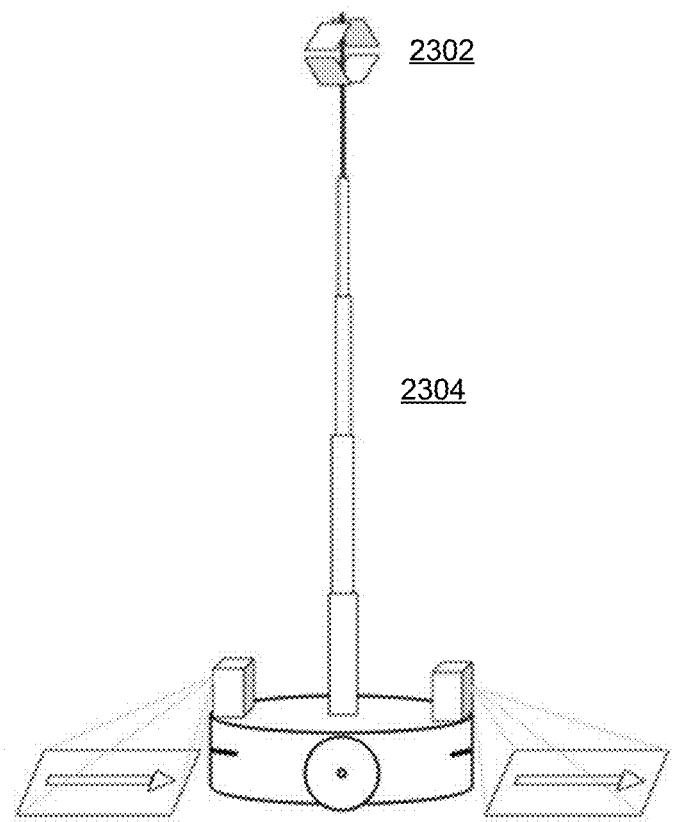

In some embodiments, the RFID antenna arrays can be located on a boom arm that can extend outward and away from the robot, beneficially providing coverage of locations outside the dimensions of a robot 100. FIGS. 23A and 23B illustrate an example of an antenna array located on an extendible robot boom arm, according to one embodiment. In the embodiment of FIG. 23A, the robot 100 includes an antenna array 2302 located on a collapsed boom arm. In the embodiment of FIG. 23B, the boom arm 2304 is extended upward and away from the robot body, beneficially enabling the robot to reader RFID signals at heights much greater than the height of the robot itself.

To locate items coupled to RFID tags, the robot 100 can scan areas in a direction and height corresponding to locations where items coupled to the RFID tags can be located. For example, for a circular rack within a store, the robot can circumnavigate around the rack, and can aim a reader antenna array at a height corresponding to the rack (or a threshold distance below the rack to compensate for the height of a hanger) to scan for RFID tags. Likewise, for a set of shelves, the robot can aim a reader antenna array at heights corresponding to each shelf, or can "sweep" the shelves by adjusting a height of the reader antenna array from a top of the shelves to the bottom (or vice versa). In some embodiments, the robot can perform a 3D scan of infrastructure within a store to identify potential locations for store inventory, and can aim reader antenna arrays based on the identified potential locations to scan for RFID tags. Likewise, the robot can access pre-existing 3D data for store infrastructure to identify the potential locations to scan for RFID tags. By identifying potential locations for RFID tags, the robot can also determine the location of items coupled to the RFID tags without the need for a DoA antenna array. For instance, if the robot identifies a set of cubby holes within a shelving structure, the robot can scan each cubby hole, and in response to scanning a cubby hole and identifying an RFID tag, the robot can determine that the location of the identified RFID tag is the scanned cubby hole.

B. RFID Tag Localization

The robot 100 can determine a location of a detected RFID tags in a number of ways. In some embodiments, the robot can determine a location of a detected tag by evaluating a proximity of the robot to potential tag locations. In such embodiments, if only one potential RFID tag location is within a threshold distance of the robot at the time the tag is detected, the robot can determine that the detected RFID tag is located at the potential RFID tag location. Likewise, if many potential RFID tag locations are within a threshold distance of the robot at the time the tag is detected, but only one of the potential RFID tag locations is historically associated with the detected RFID tag, the robot can determine that the detected RFID tag is located at the potential RFID tag location historically associated with the detected RFID tag.

The robot 100 can also determine a location of a detected RFID tag based on two instances of detecting the tag. For instance, the robot can detect the RFID tag a first time when navigating a first straight-line path within a proximity of the tag. The robot can determine a first location of the peak signal strength of the detected RFID tag, and can identify a first direction to the detected tag as the direction perpendicular to the navigation direction of the robot while navigating the first path. The robot can detect the RFID tag a second time when navigating a second straight-line path with a proximity of the tag, can determine a second location of the peak signal strength of the detected RFID tag while navigating the second path, and can identify a second direction to the detected tag as the direction perpendicular to the navigation direction of the robot while navigating the second path. The robot can determine that the location of the detected RFID tag is the location of the intersection of a first line defined by the first location (of the first peak signal strength) and the first direction and a second line defined by the second location (of the second peak signal strength) and the second direction. As used herein, "peak signal strength" can refer to peak received signal strength indicator or "RSSI", or can refer to any suitable measure of signal strength.

In some embodiments, the robot 100 can determine a location of a detected RFID tag by detecting a first peak signal strength of the RFID tag, by moving in a first direction perpendicular to the direction of movement of the robot at the location of the first peak signal strength, and by determining a second peak signal strength of the RFID tag. In the embodiment that the second peak signal strength of the RFID tag is less than the first peak signal strength, the robot can return the location of the first peak signal strength and move in a direction opposite the first direction. The process can be repeated, allowing the robot to iteratively move closer to the detected RFID tag until the robot is able to reduce the distance between the robot and the RFID tag to less than a threshold distance. The robot can then identify the location of the detected RFID tag, or can associate the location of the robot with the RFID tag (for instance, if the threshold distance is less than a meter, a foot, or any other suitable distance).

Alternatively, the robot 100 can include two directive patch antennas pointed in different directions such that the beamwidths of the antennas overlap at least somewhat. When an RFID tag is detected, the robot can measure a signal strength for each directive patch antenna, and can move in a direction of the antenna that measures a greater signal strength. This process can be repeated, allowing the robot to incrementally move closer to the detected RFID tag. The robot can then identify the location of the detected RFID tag, or can associate the location of the robot with the RFID as described above.

In some embodiments, the robot 100 can build a Bayesian sensor model for potential RFID tag locations (for instance, for a rack, shelf, changing room area, and the like) that predicts RFID tag signal measurements based on the expected distances and angles between the RFID reader antennas of the robot and the RFID tags at the potential RFID tag locations. The Bayesian sensor model for a potential RFID tag location can be built based on historical RFID tag signals detected by the robot as the robot moves in relation to the potential RFID tag location. The Bayesian sensor model can map one or more of detected RFID tags, RFID signal strengths, and robot locations to likelihoods that the RFID tag is located at one or more particular locations. Over time, the robot can generate a Bayesian sensor model for every potential RFID tag location within a store, and can select a Bayesian sensor model for use in locating an RFID tag based on a proximity to a potential RFID tag location at the time the robot detects the RFID tag being localized.

When the robot subsequently detects an RFID tag in proximity to the potential RFID tag location, the robot can select a Bayesian sensor model from a set of Bayesian sensor models based on a proximity to potential RFID tag locations, and can query the Bayesian sensor model with one or more of the detected RFID tag, the signal strength of the detected RFID tag, and the location of the robot at the time the RFID tag was detected. The Bayesian sensor model can return a set of potential RFID tag locations and corresponding likelihoods that the detected RFID tag is located at each location, and the robot can select among the potential RFID tag locations to locate the detected RFID tag. For instance, by selecting the most likely potential RFID tag location or by selecting a set of the most likely potential RFID tag locations. In some embodiments, the robot can move to another location and re-detect the RFID tag, and can re-query the Bayesian model using the re-detected RFID tag signal to obtain a second set of potential RFID tag locations and corresponding likelihoods, can combine the probabilities of the first set of potential RFID tag locations and the second set of RFID tag locations, and can select a potential RFID tag location based on the combined probabilities (for instance by selecting the most likely potential RFID tag location).

In some embodiments, stationary/permanent reference RFID tags within a store can be used to localize other RFID tags. For instance, a reference RFID tag can be placed on each end of a shelf. When the robot 100 detects an RFID tag, the robot can also detect one or both of the reference RFID tags. The robot can identify the location of the detected RFID tag as located on the shelf based on the detected reference RFID tags. In some embodiments, the robot can localize the detected RFID tag based on the strength of the detected referenced RFID tag signals. For instance, if the robot weakly detects one of the reference RFID tags and doesn't detect the other, and strongly detects the RFID tag being localized, the robot can determine that the RFID tag being localized is not located on the shelf (since otherwise the reference RFID tags would be detected more strongly). Likewise, if the robot detects a first reference RFID tag strongly, detects the second reference RFID tag weakly, and detects the RFID tag being localized strongly, the robot can determine that the detected RFID tag being localized is located on the side of the shelf closest to the first reference RFID tag.

As noted above, in some embodiments, the robot 100 can include a DoA antenna array to determine a location of a detected RFID tag. DoA antenna arrays can include a plurality of DoA antennas spaced a distance apart such that the antennas can detect a difference in phase of received RFID signal. In some embodiments, each DoA antenna pair is spaced a distance that is less than or equal to a quarter of the RFID signal wavelength. The robot can estimate a direction of arrival of the RFID signal based on the difference in signal phase detected by a DoA antenna pair.

However, the estimated direction of arrival of the RFID signal represents the actual direction of arrival for the RFID signal, or 180 degrees from/the opposite of the direction of arrival for the RFID signal. To unambiguously identify the direction of arrival, a third DoA antenna can be included within the DoA array. In such embodiments, the third DoA antenna can detect the RFID signal, and if the detected RFID signal by the third DoA antenna is stronger than the RFID signal detected by one or both of the DoA antenna pair, the estimated direction of arrival for the RFID signal can be determined to be the actual direction of arrival for the RFID signal. Alternatively, if the detected RFID signal by the third DoA antenna is weaker than the RFID signal detected by one or both of the DoA antenna pair, the actual direction of arrival for the RFID signal can be determined to be 180 degrees from (or the opposite of) the estimated direction of arrival.

A DoA antenna array can include any number of DoA antennas (for instance, three, four, six, eight, or more), and can be located within or external to the robot 100. For instance, the DoA antenna array of the robot 100 can include four DoA monopole antennas equally spaced around a top surface circumference of the robot. For example, in the embodiment of FIG. 22A, the robot includes four DoA antennas 732 each spaced at 90 degree intervals from adjacent antennas around a center of the top surface of the robot. Likewise, the DoA antenna array can include eight DoA monopole antennas equally spaced around an inside perimeter of the robot body. For example, in the embodiment of FIG. 22B, the robot includes eight DoA antennas each spaced at 45 degree intervals from adjacent antennas around a center of the robot body.

In some embodiments, the DoA antenna array can include a first set of antennas to determine an azimuth direction of arrival for RFID signals (e.g., a horizontal angle of arrival relative to the horizon), and can include a second set of antennas to determine an elevation direction of arrival for RFID signals (e.g., a vertical angle of arrival relative to the horizon, or "elevational direction of arrival"). In such embodiments, the first set of antennas can be oriented perpendicular to the second set of antennas. Using two sets of DoA antennas can enable the robot 100 to determine an exact direction of a detected RFID signal (e.g., not just a direction of arrival angle parallel to the floor, but also including an angular displacement upward or downward relative to the floor).

In addition to detecting a direction of arrival for detected RFID signals, the robot 100 can determine a distance between the robot and the corresponding RFID tag. In some embodiments, the robot can determine a signal strength of the detected RFID signal (e.g., the "RSSI" of the detected signal), and can determine a distance between the robot and the corresponding RFID tag based on the determined signal strength. In some embodiments, the robot can perform frequency modulation continuous wave ("FMCW") ranging on the detected RFID signal to determine a distance between the robot and the corresponding RFID tag.

In embodiments where the robot 100 can determine an azimuth direction of arrival for a detected RFID tag and a distance between the robot and the tag, the robot can identify a location of the RFID tag within a two-dimensional map (for instance, a floor plan of a retail store). Likewise, in embodiments where the robot can determine an azimuth direction of arrival, an elevational angle of arrival, and a distance to the RFID tag, the robot can identify a location of the RFID tag within a third-dimensional map (for instance, a three-dimensional rendering of a retail store).

C. Robot Behavior in RFID Environments

When scanning for RFID tags within a retail store, the robot 100 can plan a path through the store based on historical locations or RFID tags and/or based on known possible locations for RFID tags. For instance, if a store includes a set of infrastructure objects configured to hold store inventory, the robot can select a route through the store that comes within a threshold distance of each of the set of infrastructure objects. As used in this context, "threshold distance" refers to a distance within which the robot is likely to detect an RFID tag (for instance, at a 90% likelihood, a 95% likelihood, a 98% likelihood, or any other suitable likelihood). This threshold distance can also be based on the RFID reader antenna array strength, the transmission strength of each RFID tag, or any other suitable factor.

The robot 100 can also select a route through the store that comes within a threshold distance of each historical location of RFID tag within the store. The robot can also plan a path through a store based on sales data for the store. For example, if store sales registers indicate that a set of items has been sold, the robot can select a route through the store that comes within a threshold distance of the historical locations of each of the sold set of items. Likewise, the robot can select a path through a store that comes within a threshold distance of all items that sell above a threshold rate (for instance, a daily or hourly rate).

The robot 100 can additionally plan a path through a store to scan for RFID tags based on a goal of the scan. For instance, if the goal of the robot is to quickly scan for all possible RFID locations within the store or within a portion of the store, the robot can select a path through the store that maximizes the number of items the robot comes within a threshold distance of while ensuring that the robot can navigate the path in less than a threshold amount of time. Such a path can beneficially enable the robot to quickly identify RFID tags within the store or portion of the store, but at the cost of a potentially inaccurate or incomplete scan. Likewise, if the goal of the robot is to identify a maximum number of RFID tags within the store or store portion, the robot can select a path that minimizes the distance between the robot and historical locations of each RFID tag.

Figure 24:
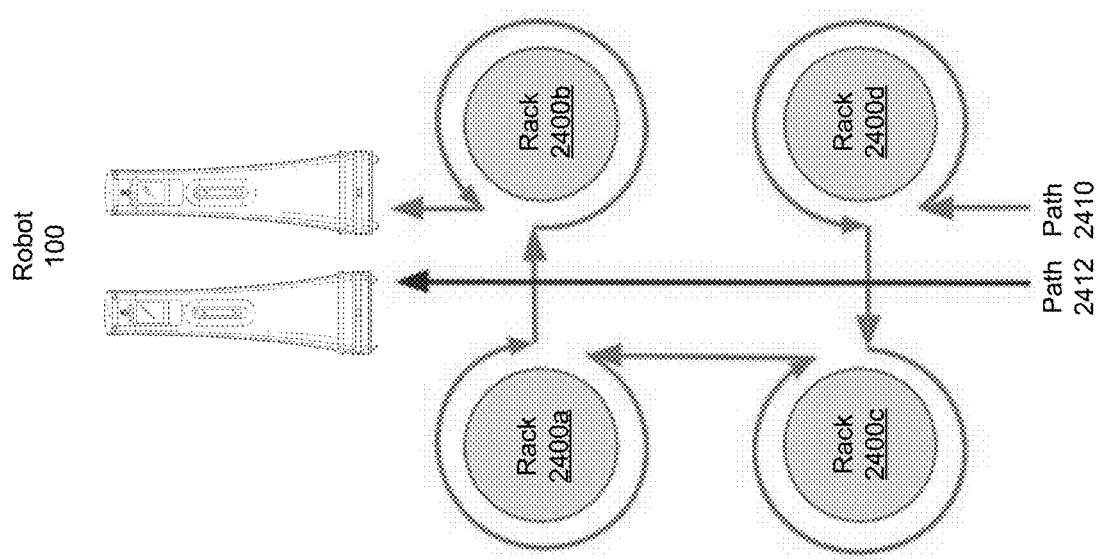
FIG. 24 illustrates example navigable paths through an environment to scan for RFID tags, according to one embodiment.

FIG. 24 illustrates example navigable paths through an environment to scan for RFID tags, according to one embodiment. In the embodiment of FIG. 24, the robot 100 can select path 2410, which circumnavigates 75%, 80%, 90%, or more of each of rack 2400a, 2400b, 2400c, and 2400d. While navigating this route, the robot can scan for RFID tags by aiming an antenna array at each rack as the robot circumnavigates the rack, beneficially allowing the robot to determine that the location of each detected RFID tag is on the rack that the robot is circumnavigating at the time the RFID tag is detected. Likewise, the robot can select path 2412, which takes less time to navigate than path 2410. However, while the robot passes with a threshold distance of each rack while navigating path 2412, the robot is unable to determine which rack a detected RFID is located on. Accordingly, the speed of navigating path 2412 comes at the cost of not being able to localize detected RFID tags.

In some embodiments, the robot 100 can navigate down every aisle in a store, or can navigate every second aisle if the reader antenna array of the robot is strong enough to detect RFID tags across aisles. In some embodiments, the robot can select a path through a store based on values of items coupled to RFID tags. For instance, the robot can select a path through the store that comes within a threshold distance of each item in a set of high-value items, beneficially increasing the likelihood that the robot will detect the RFID tags coupled to the set of high-value items when navigating the selected path. The robot can also select a path based on locations where items waiting to be returned to the sales floor may be located. For instance, the selected path may come within a threshold distance of each changing room within a store, each return rack with the store, and sales counters within the store.

The robot 100 can additionally select a path through a store to scan for RFID tags based on information describing historical foot traffic through the store. For instance, the robot can select a path that comes within a threshold distance of each historical RFID location while avoiding areas of above-threshold foot traffic. Likewise, if a particular passage within the store is less than a threshold distance wide, the robot can select a path through the store that avoids the particular passage. In addition, the robot, while navigating a path through the store to scan for RFID tags, can detect people within the store, and in response to detecting people blocking a particular passage of the path within the store, the robot can wait for the people to move before proceeding, can request that the people move, or can select an alternative route that comes within a threshold distance of historical RFID locations or determined potential RFID locations.

The robot 100 can scan for expected RFID tags coupled to retail inventory in a location within a retail store, and in response to scanning the location for the expected RFID tags and not finding the tags, can request that additional inventory be brought to the store floor to replace the missing inventory. For example, the robot can identify the missing inventory to the central system 210, which in turn can instruct store personnel to restock the missing inventory. Alternatively, the robot or the central system can instruct another robot to retrieve replacement inventory from storage, or the robot can itself retrieve the replacement inventory from storage and can restock the retrieved replacement inventory at the location with the retail store. In some embodiments, the robot can determine that replacement inventory is not locally available, or is in low supply, and can order additional replacement inventory from a warehouse, distribution facility, or other inventory source.

In some embodiments, the robot 100 can scan inventory storage to identify inventory in low supply, and can order replacement inventory as needed (for instance, if the quantity of replacement inventory falls below a threshold). Replacement inventory can also be ordered based on a rate of sales of the inventory. For instance, if the replacement inventory corresponds to an above-threshold rate of sales, the robot can order replacement inventory, while if the replacement inventory corresponds to a below-threshold rate of sales, the robot can order replacement inventory when the available replacement inventory falls below a threshold quantity. In some embodiments, the robot can order replacement inventory based on a combination of rate of sales of the inventory and the available quantity of replacement inventory.

The robot 100, in response to scanning for RFID tags while navigating a first path through a store and detecting a large discrepancy between expected RFID tags and detected RFID tags, can select a second, more comprehensive path through the store that maximizes the likelihood that RFID tags present within the store will be scanned. Such a configuration beneficially enables a robot to navigate shorter paths through a store most of the time, while still enabling the robot to navigate comprehensive paths through the store when needed. In response to a large discrepancy between RFID tags detected while navigating the second, more comprehensive path in a store and expected RFID tags in the store, the robot can flag the missing items coupled to the expected-but-not-scanned RFID tags as potentially stolen, and can notify store employees of the discrepancy.

Shoppers within a retail store can interact with the robot 100, for instance via the display 720 or by talking to the robot. For instance, if the display is a touch-screen display, the display can display the text "How can I help you?", along with selectable options including "help me find an item", "talk to the store manager", or "sale items". In response to the selection of an option by a shopper, the display can take one or more actions or access and display appropriate information. In some embodiments, the shoppers can speak directly with the robot, which can identify what the shoppers are saying and can take actions or provide information as needed. For example, if a user selects the "help me find an item" or asks the robot to show the location of an item, the robot can query the store's inventory database to determine if the item is still available for sale, can say "follow me", can navigate to the last known location of the item within the store, can scan nearby RFID tags to identify an exact location of the item, and can highlight the item for the shopper (for instance, using a laser pointer or projecting an arrow on the ground to indicate the location of the item). In some embodiments, the robot can access parse and process user requests autonomously, but in embodiments in which the robot is unable to parse and process a user request, the robot can provide the request to an operator of the robot, who can instruct the robot to perform an action or provide appropriate information in response.

In some embodiments, the robot 100 can scan for RFID tags within a store to identify locations of RFID tags within the store, and can compare the identified locations with a semantic map including information identifying last known locations of the RFID tags or historical locations of RFID tags. In embodiments where the identified locations of the RFID tags differ from the locations within the semantic map, the robot can move items coupled to the RFID tags within the store to the locations identified by the semantic map, can flag the items coupled to the RFID tags along with the identified locations of the RFID tags as misplaced or moved for a store employee to relocate the items coupled to the RFID tags, or can update the semantic map to reflect the identified locations of the RFID tags. In other words, during the course of moving through a store, the robot can identify items that have moved, and can update a semantic map to reflect the movement, beneficially producing a semantic map that includes up-to-date locations for store inventory.

In some embodiments, the robot 100 can scan for RFID tags within an area, for instance in order to determine if an item coupled to an RFID tag is located within a room from a doorway of the room. If the robot detects the RFID tag within the area, the robot does not need to enter the area, as the item coupled to the RFID tag has already been determined to be in the area. However, if the robot does not detect the RFID tag within the area, the robot can navigate farther into the area in order to more comprehensively scan for the item. For instance, if the room is a conference room with a large conference table, and the item coupled to the RFID tag is a projector, the robot can enter the conference room, can circumnavigate the conference table in order to determine if the projector is located on the table, and in response to detecting the RFID tag, the robot can update an inventory or semantic map to indicate the detected location of the project, can store the location of the projector in a database, or can notify an operator of the location of the projector. If, after entering the room and more comprehensively scanning for the projector, the robot is unable to detect the RFID tag coupled to the projector, the robot can flag the projector as potentially lost, can inform an operator or building personnel of the missing projector, or the like. In another instance, if the area is an aisle of a store, the robot may detect the RFID tag of a target item halfway down the aisle, even though the target item is located at the end of the aisle. Once the RFID tag is detected, the robot can update the inventory or semantic map to indicate that the RFID tag has been detected and avoid going to the end of the aisle to reduce patrol time. Accordingly, the movement/navigation of the robot can be adjusted based on the detection or absence of the detection of an RFID tag.

Figure 25:
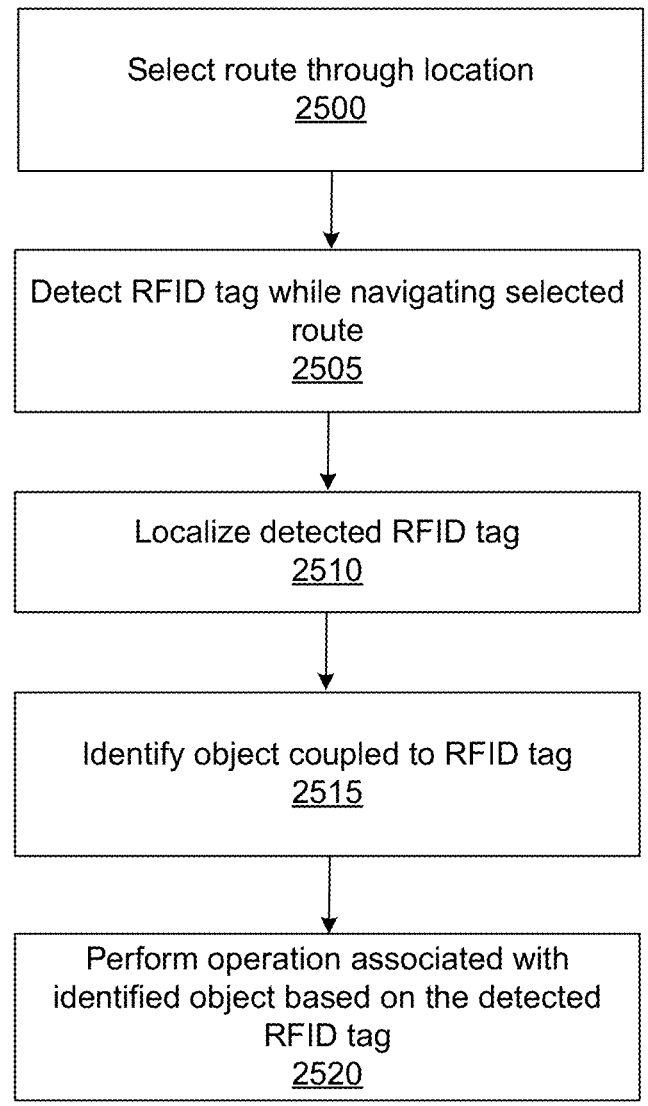
FIG. 25 is a flow chart illustrating a process for detecting and localizing RFID tags, according to one embodiment.

FIG. 25 is a flow chart illustrating a process for detecting and localizing RFID tags, according to one embodiment. A robot selects 2500 a route through a location, such as a retail store. As noted above, the route can be selected in order to minimize the amount of time it takes the robot to navigate the route, in order to maximize the number of RFID tags detected within the location, based on historical foot traffic within the location, based on historical RFID tag locations within the location, and the like. In some embodiments, the route is selected by the robot as part of a periodically-performed patrol operation, while in other embodiments, the robot selects the route in order to locate an item or perform an inventory-related operation. In some embodiments, the route is selected as part of an operation unrelated to scanning for RFID tags (for instance, in response to a customer query, in response to the performance of a security operation, and the like).

The robot detects 2505 an RFID tag while navigating the selected route. The RFID tag can be detected using, for instance, an array of RFID reader antennas. The robot can then localize 2510 the detected RFID tag. As noted above, the detected RFID tag can be localized by detecting the RFID tag from multiple locations and extrapolating the RFID tag location, by identifying a set of potential RFID tag locations and selecting among the potential RFID tag locations, or by correlating the detected RFID tag with corresponding historical RFID tag locations to identify the detected RFID tag location. In some embodiments, the robot can include a DoA antenna array, and can determine the location of the RFID tag using the DoA antenna array to determine an azimuth direction of arrival of a received RFID signal, and/or determining an elevational direction of arrival of the received RFID signal. The robot can further determine a distance between the robot and the detected RFID tag, for instance based on a signal strength of the detected RFID signal.

The robot identifies 2515 an object coupled to the RFID tag. For example, in retail environments, the object can be an object for sale within the retail store, while in warehouse environments, the object can be a box or crate of inventory. The robot performs 2520 an operation associated with the identified object based on the detected RFID tag. In some embodiments, the operation includes updating an inventory database to include the identified object coupled to the detected RFID tag. In other embodiments, the operation can include updating an inventory database with the determined location of the detected RFID tag, informing a customer of the location of the identified object coupled to the RFID tag (for instance, in response to a request from the customer for the location of the RFID tag), informing a store employee of the location of the identified object, flagging the identified object within an inventory database for relocation, moving the identified object to a location identified by an inventory database and corresponding to the identified object, adjusting the selected route of the robot based on the location of the detected RFID tag, or any other suitable operation based on one or more of the detected RFID tag, the identity of the object coupled to the RFID tag, and the determined location of the RFID tag.

Elevator Integration

Figure 26:
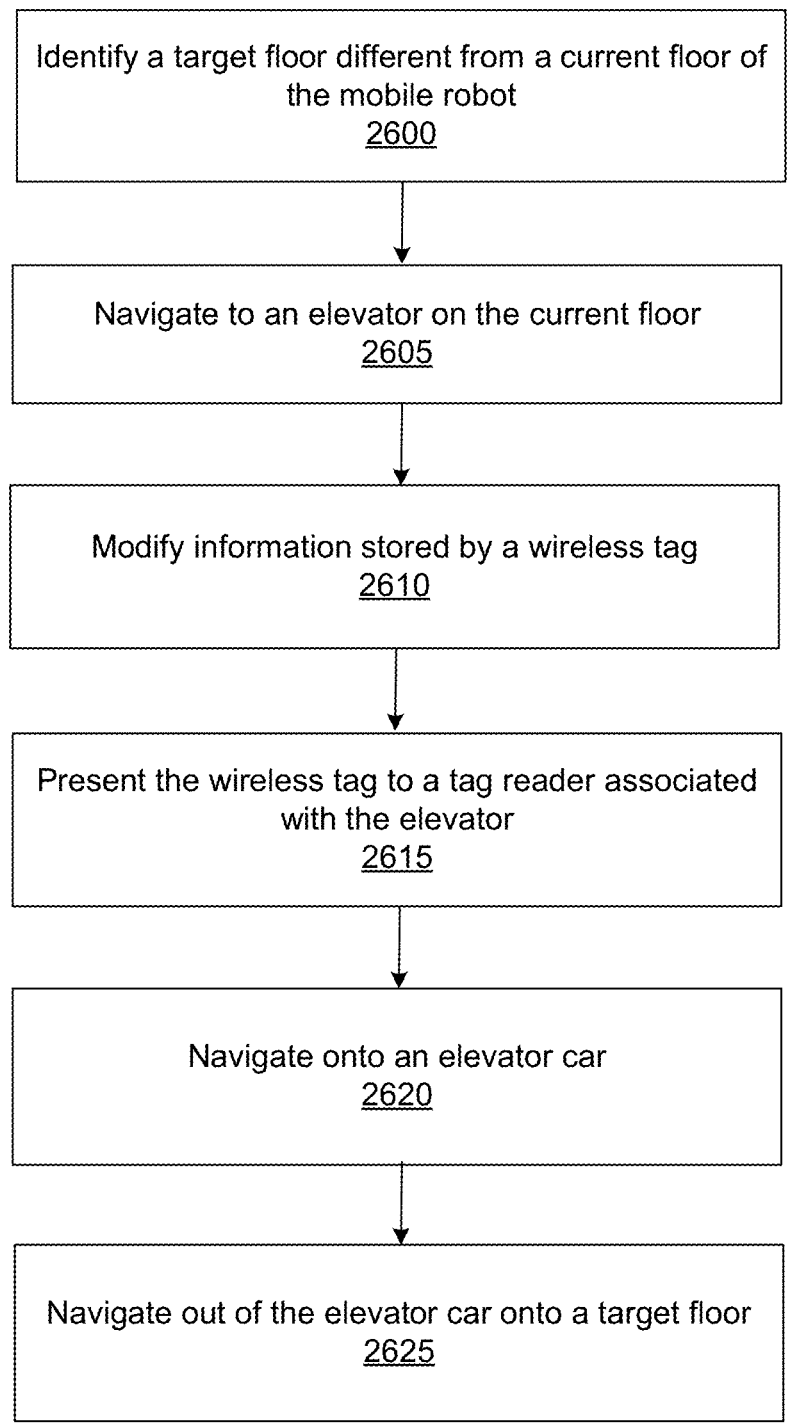
FIG. 26 is a flow chart illustrating a process for interacting with an elevator, according to one embodiment.

FIG. 26 is a flow chart illustrating a process for interacting with an elevator, according to one embodiment. Other methods of interacting with the elevator may include fewer, additional, or different motions and operations than those described herein.

A mobile robot identifies 2600 a target floor different from a current floor of the mobile robot to which the mobile robot is to move. The target floor can be identified based on instructions to perform a task from a human operator or another mobile robot, or can be a part of a pre-determined patrol route/schedule. The mobile robot may receive instructions to move to the target floor to respond to an emergency or security incident on the target floor, or may patrol each floor in the building as a part of security routine performed before closing the building.

The mobile robot navigates 2605 to an elevator on the current floor. In some embodiments, there are multiple elevator banks around the building, and the mobile robot determines which elevator to take to the target floor. The mobile robot can use a map describing a layout of the current floor to identify the elevator bank that is closest to a current location of the mobile robot or closest to a destination on the target floor. The mobile robot can also use semantic maps that include features of the elevators and statuses of the elevator to select an elevator. For example, the semantic maps can include information such as floors accessible by each of the elevators (e.g., elevator A can access floors 1-8 and elevator B can access floors 9-12), functions of the elevator (e.g., freight elevator vs. passenger elevator), maintenance schedules, operation hours, and whether the elevator is out of service. After selecting the elevator, the mobile robot identifies the location of the selected elevator bank within the current floor and generates a motion plan to move from the current location to the location of the selected elevator bank. The mobile robot can also receive motion instructions from a human operator that controls a path that the mobile robot takes to move to the location of the elevator.

After arriving at the location of the selected elevator, the mobile robot wirelessly communicates with the elevator system to request an elevator car. For instance, the mobile robot can communicate with the elevator system via WiFi, Bluetooth, near-field communication, 3G/4G, LTE, or any other suitable communication protocol. In some embodiments, the mobile robot modifies 2610 information stored by a wireless tag coupled to or embedded within the mobile robot to send to an elevator controller associated with the elevator system. The modified information can identify the current floor, can identify the target floor, can include security credentials of the mobile robot, and can identify needs of the mobile robot (e.g., space requirement, speed/timing requirement). The modified information can also include information associated with a surrounding environment of the mobile robot collected using sensors and cameras on the mobile robot, such as a number of people waiting for an elevator, that may be useful for the elevator system in selecting an elevator car. For instance, if a wireless tag held by the mobile robot indicates that the mobile robot is authorized to access floor 5, and the mobile robot identifies floor 7 as the target floor, the mobile robot can modify the wireless tag to indicate that the mobile robot is authorized to access floor 7.

The mobile robot presents 2615 the wireless tag to a tag reader associated with the elevator. The tag reader can be coupled to the elevator controller. The mobile robot can approach the tag reader such that the wireless tag is within an operable distance of the tag reader and able to receive the information stored on the wireless tag. The wireless tag may be a RFID tag or other communication devices that interacts with the tag reader without being in direct contact with the wireless tag. The mobile robot can also connect with the elevator controller via a wireless API to provide the information. In some embodiments, the mobile robot keeps multiple tags with different information on the tags, and selects one of the tags to present to the elevator system. In some embodiments, the mobile robot sends a radio frequency (RF) signal directly to the tag reader associated with the elevator.

The information provided to the elevator controller can include security credentials of the mobile robot. Prior to calling the elevator car to the current floor of the mobile robot, the elevator system verifies that the security credentials of the mobile robot comply with security policies of the elevator system, or satisfy security requirements associated with the target floor. For example, the security credentials may specify floors that the mobile robot is allowed to access, and if the mobile robot's credentials do not satisfy the security policies, the elevator system may notify the mobile robot of the failure to satisfy the security policies. Similarly, the mobile robot may not have the security credentials to access a restricted area, and if the mobile robot attempts to call an elevator to move to the restricted area, the elevator system may determine that the mobile robot does not meet the security policies. Responsive to receiving such a notification, the mobile robot can contact a human operator for assistance. The human operator may override the security policies and request that the elevator system send an elevator car to the current floor of the mobile robot, or alternatively can confirm that the mobile robot is not cleared to access the target floor.

Once the mobile robot presents the wireless tag to the elevator controller and the elevator system verifies that the mobile robot is allowed to access the target floor, the elevator system calls an elevator car to the current floor of the mobile robot. The elevator system manages information associated with each elevator in the building. The information can include accessible floors, maximum weight restriction, maximum occupancy restriction, and maintenance records. An elevator can be installed with sensors and cameras, and the elevator system receives data collected from the sensors and cameras. Using the sensors and cameras, the elevator system can update information such as number of passengers within the elevator, space available within the elevator, weight of the load in the elevator, a direction of movement of the elevator, a speed of the elevator, a position of the elevator, whether the elevator doors are open or closed, whether the elevator is out of order, a temperature within the elevator, and a status of the elevator (e.g., is the elevator in an emergency state).

In some embodiments, the elevator system determines which elevator car to send to the current floor of the mobile robot based on the information received from the wireless tag. Specifically, the elevator system may select the elevator car based on needs of the mobile robot. For example, the mobile robot may request a freight elevator for extra space, may request an empty elevator car, may request that an elevator car go directly to the target floor, and may request that the elevator car have enough space for the mobile robot and a passenger (e.g., a visitor being escorted to the target floor).

The wireless tag may include information describing space requirement of the robot. Based on the received space requirement, the elevator system can select an elevator car with a space availability that is equal to or greater than the space required by the robot. The wireless tag may store a default dimension of the robot that may be modified based on the robot's activity or state. For example, if the robot's task is to deliver a package from the current floor to the target floor, the robot may be holding the package with its arms extended, which means that it requires more space to account for the extended arm and the package. The robot may use its cameras to estimate the additional space required for the extended arms and package and may update the information in the wireless tag to reflect the additional required space.

The elevator system may determine a space availability of each of a plurality of elevator cars for the elevator and may select an elevator car based on the space availability. The space availability information may be stored in a semantic map. The elevator system selects an elevator car with a space availability that is greater or equal to the space requirement of the robot. If there are multiple elevator cars that meet the threshold space availability, the elevator system may select an elevator car with the most space availability. As described in further detail below, the elevator system may select an elevator car based on other criteria in addition to the space availability restriction.

The elevator system may determine a current weight of each of the plurality of elevator cars. The elevator system may be equipped with sensors to enforce a weight limit of the elevator system. The sensors may be installed at different locations of the elevator to measure the weight. For example, the sensors may be on the floors of the elevator car to measure the load inside the cabin. The sensors may be connected to cables attached to the elevator car to determine the changes in force applied to the cables to determine the weight inside of the elevator car. The elevator system may keep track of the changes in the weight of the elevator. When the mobile robot requests an elevator, the mobile robot may communicate a total weight of the mobile robot. If the mobile robot is not carrying any additional load, the mobile robot may send its default weight to the elevator system. If the mobile robot is carrying additional load, the mobile robot may measure the weight of the additional load using force sensors installed in the mobile robot, may use its cameras to read labels on the additional load for the weight, or may scan a tag coupled to the additional load to determine the weight, and may update weight requirement in the wireless tag.

As passengers enter and exit the elevator, the elevator system tracks the number of occupants in the elevator. Based on the size of the elevator car and elevator safety regulations, each elevator car is associated with a maximum occupancy. When the mobile robot requests an elevator, the elevator system determines which elevator cars have not met the maximum occupancy and sends an elevator car that has not met the maximum occupancy.

The elevator system may send an elevator car that is closest to the current floor of the mobile robot. The elevator system determines a number of floors between the current floor of the mobile robot and a current floor of each of the plurality of elevator cars. The elevator system selects an elevator car that is closest to the current floor and is moving in a same direction as the mobile robot. For example, the mobile robot is currently on the fifth floor and requests to go to the eighth floor. In this example, elevator car A is on the fourth floor, but it is moving down to the first floor, and elevator car B is on the second floor, but it is moving up to the seventh floor. Continuing with this example, even though elevator car A is closer to the mobile robot, the elevator system selects elevator car B because it is moving in the same direction as the mobile robot.

The mobile robot navigates 2620 onto an elevator car. Once the elevator car is selected, the elevator system may communicate with the mobile robot to indicate where the mobile robot should wait until the elevator car arrives. The mobile robot detects when the elevator doors are open. The mobile robot may use one or more sensors and/or cameras to detect that the elevator doors are moving. For example, the mobile robot may have a motion detection sensor that detects the movement of the elevator doors. The mobile robot may also receive image data of the surrounding environment and use image detection to determine that the elevator doors are open or that other people waiting for the elevator are moving. In one embodiment, the elevator system may alert the mobile robot that the elevator car has arrived and that the elevator doors are open.

Once the elevator doors are fully open, the mobile robot analyzes the inside of the elevator car to determine a target location within the elevator car to move to. The mobile robot may capture an image of the elevator car and determine the best location for the mobile robot. In some embodiments, there may be a plurality of open locations in the elevator car that the mobile robot can select as the target location. The mobile robot can select one of the plurality of open locations based on future movement requirements of the mobile robot. The mobile robot may determine a distance between each of the plurality of open locations to a reference location such as a panel of buttons in the elevator or the elevator doors. In one example, the mobile robot may select an open location that is closest to the elevator doors as the target location because it is easier for the robot to move to the target location and exit from the target location. Alternatively, the mobile robot may select an open location that is closest to the panel buttons so that the mobile robot can quickly select a floor button, and can subsequently move to a different open location within the elevator (for instance, to allow people within the elevator to have access to the panel buttons, or to position the mobile robot to easily exit the elevator when the elevator arrives at the target floor). In other embodiments, the mobile robot may select an open location further away from other elevator passengers or at the back of the elevator if the target floor is the last stop.

In some embodiments, the elevator system determines the target location for the mobile robot within the elevator based on cameras and sensors within the elevator car. Once the elevator system determines the target location, the elevator system sends location information associated with the target location to the mobile robot. Based on the received location information, the mobile robot generates a motion plan to move to the target location. As the mobile robot navigates to the target location, the elevator system may track movement of the mobile robot within the elevator and may determine when the mobile robot reaches the target location.

As the elevator car is moving, the mobile robot may determine a current floor of the elevator car based on data collected from cameras and sensors. The mobile robot may use movement information from inertial sensors such as gyroscopes, accelerometers, or magnetometers. The mobile robot may use information from barometers and altimeters. In some embodiments, the mobile robot, while riding in an elevator, can receive the current floor of the elevator from the elevator system, or can determine the current floor of the elevator by capturing images of a "current floor" displayed within the elevator.

The mobile robot determines when the elevator car is at the target floor. For instance, the mobile robot may receive a signal from the elevator system indicating that the elevator car has arrived and is stopped at the target floor. Alternatively, the mobile robot can determine (based on altitude information or images captured of a "current floor" display within the elevator) that the elevator has arrived and stopped at the target floor without receiving a signal from the elevator signal. In some embodiments, the mobile robot may receive a signal from the elevator system to prepare to navigate out of the elevator car prior to the elevator car stopping. For example, if the target floor is the sixth floor, the elevator car may send the signal to the mobile robot as the elevator is passing through the fifth floor to give the mobile robot additional time to position the mobile robot for exiting the elevator car.

The mobile robot determines when the elevator doors are open. The mobile robot may use images captured using a camera on the mobile robot or may use information collected using sensors such as a motion detector of the mobile robot to determine when the elevator doors are open. After the doors have opened, the mobile robot navigates 2625 out of the elevator car. In some embodiments, if the mobile robot is slow to exit the elevator car (e.g., because there are people in the way), the mobile robot can request that the elevator system hold the elevator doors open until the mobile robot has exited the elevator. The mobile robot may communicate to the elevator system when it has completely exited the elevator car to the elevator system.

Inventory Management

Figure 27A:
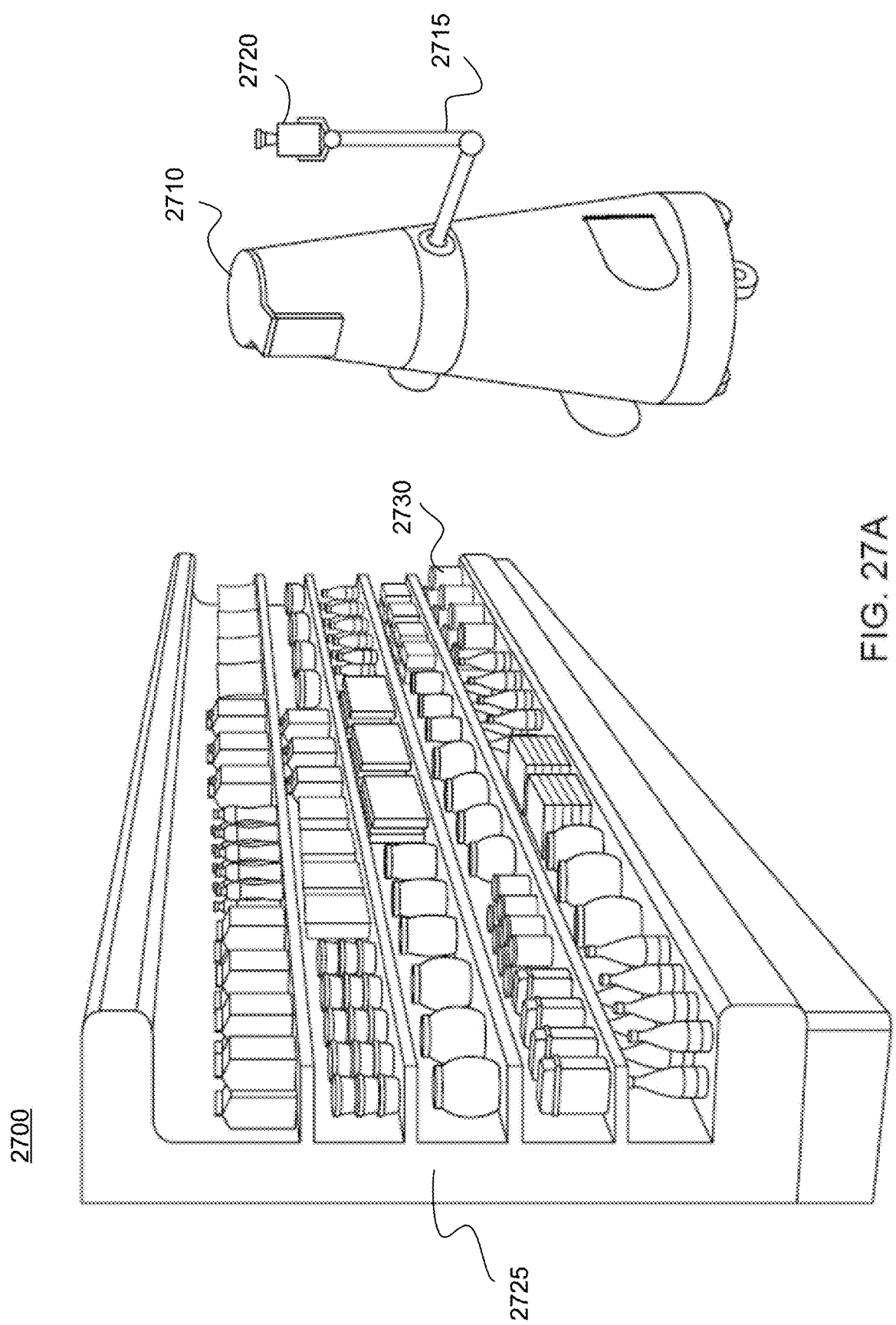
FIGS. 27A and 27B illustrate an example of a mobile robot operating in a retail environment, according to one embodiment.
Figure 27B:
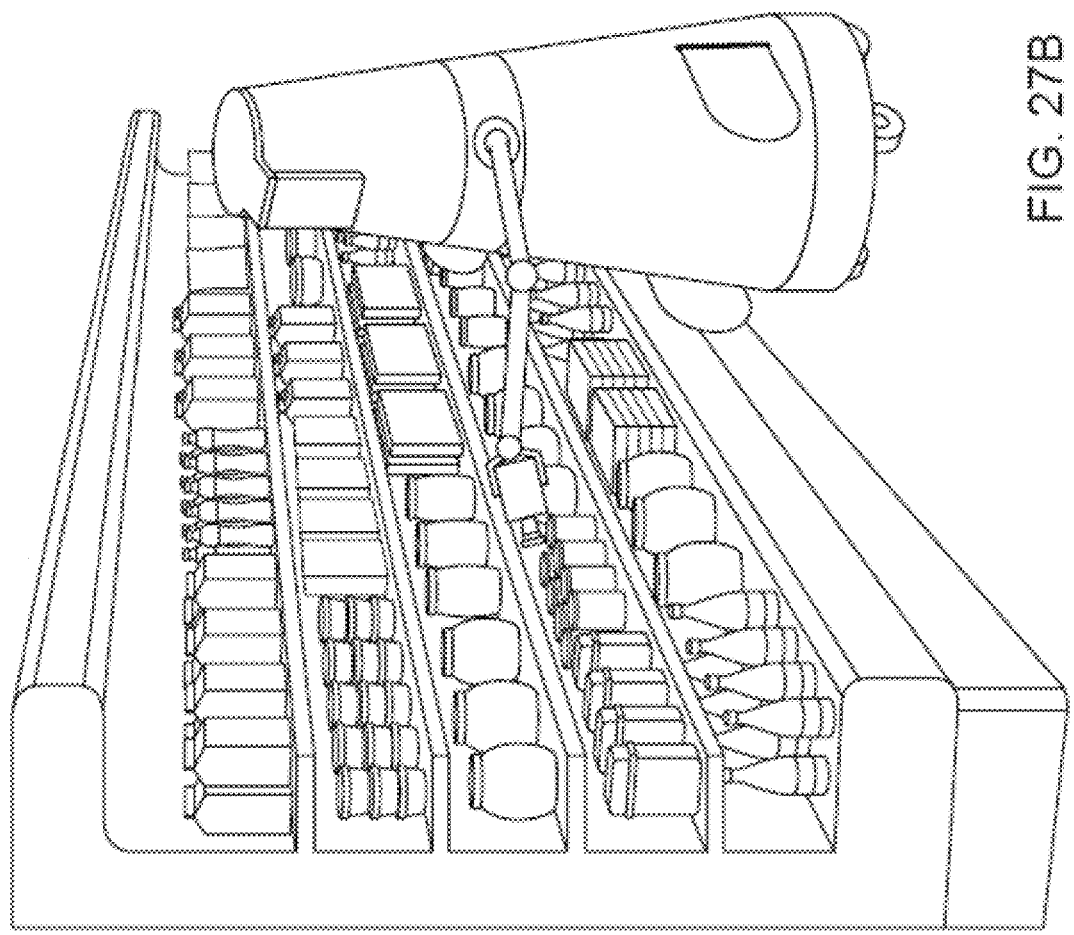

FIGS. 27A and 27B illustrate an example of a mobile robot 2710 operating in a retail environment 2700, according to one embodiment. The mobile robot 2710 navigates throughout the retail environment 2700 and performs tasks within the retail environment 2700. The tasks may be a part of a scheduled routine or may be based on requests received from customers, employees, and remote human operators of the retail environment 2700. The retail environment 2700 may have an inventory system that manages an inventory log with information associated with items in the retail environment 2700 that is accessible by the mobile robot 2710.

The mobile robot 2710 navigates within the retail environment 2700, for instance using a map of the retail environment 2700. The mobile robot 2710 determines a path for navigating within the retail environment 2700 from a current location of the mobile robot 2710 to a target location. As the mobile robot 2710 moves around the retail environment, the mobile robot 2710 can capture images of the retail environment 2700. In some embodiments, the mobile robot 2710 can have a camera 2720 mounted on, held by, coupled to, or embedded within a mechanical arm 2715 such that the mobile robot 2710 can capture images of locations that are difficult to access with a camera 2720 that is mounted on the body of the mobile robot 2710. In the embodiment shown in FIGS. 27A and 27B, the mobile robot 2710 is holding onto the camera 2720 using a mechanical hand. However, in other embodiments, camera 2720 can be embedded within the mechanical hand or elsewhere on the mechanical arm 2715 such that the mobile robot 2710 may use the mechanical hand for other functions. The camera 2720 can be used to capture images of products, product bar codes, product QR codes, and product identification numbers associated with items 2730 in the retail environment 2700. The mobile robot 2710 can also have a RFID tag detector within its mechanical arm. In some embodiments, the mobile robot 2710 has a mechanical hand coupled to the mechanical arm, and the mechanical hand is used to hold an external device such as a camera, a bar code scanner, and a RFID tag detector.

In some embodiments, the mobile robot 2710 can have a camera on the head or the body of the mobile robot 2710 in addition to the camera 2710 mounted to the mechanical arm 2715. The mobile robot 2710 can use the camera 2710 on the head or the body of the mobile robot 2710 to determine information about a surrounding environment of the mobile robot 2710. For example, the retail environment 2700 may be a grocery store, and the employees, customers, carts, and baskets within the grocery store prevent the mobile robot 2710 from relying solely on the map of the retail environment 2700 to move around. The mobile robot 2710 captures images or videos of the area around the mobile robot 2710 so that the mobile robot 2710 may avoid obstacles along its path. Responsive to identifying an obstacle along its path, the mobile robot 2710 determines whether there is sufficient space for the mobile robot 2710 to go around the obstacle and continue along its path. If the obstacle is too large to pass by, the mobile robot 2710 generates a new path from the current location of the mobile robot 2710 to the target location.

The mobile robot 2710 moves to the target location within the retail environment 2700 and captures images of the items 2730 in the area using the camera 2720. The mobile robot 2710 can use the captured images to determine an inventory operation to perform. If the inventory operation can be performed by the mobile robot 2710, the mobile robot 2710 generates a motion plan to execute the inventory operation. If the inventory operation cannot be performed by the mobile robot 2710, the mobile robot 2710 flags the inventory operation to be performed by a human operator or personnel. A human operator can be a store manager, retail personnel, security personnel, or any other human associated with the mobile robot. When flagging the inventory operation, the mobile robot 2710 can make an audio output such as "help needed in aisle 3," can update a list of inventory operations in the inventory system to be performed, can page or call an employee of the retail environment 2700, and can perform other methods of notifying a human operator or personnel.

In some embodiments, the mobile robot 2710 moves throughout the retail environment 2700 and performs an inventory check on inventory on display. The mobile robot 2710 can perform an inventory check on particular product types based on a request from a store manager, based on purchase activity (e.g., if a threshold amount of tangerine La Croix is sold, the mobile robot can be dispatched to determine an available amount of tangerine La Croix still on display), or as a part of a scheduled task in an area assigned to the mobile robot 2710 (e.g., aisles 1-3 of a grocery store, a children's clothing section of a department store). To perform the inventory check, the mobile robot 2710 moves to a designated location for a product type and scans the designated location to determine a number of items of a product type that are currently displayed at the designated location. The designated location for the product type may be stored in the inventory log. At the designated location, the mobile robot 2710 can capture an image of the designated location by scanning the camera 2720 on the mechanical arm 2715 over the items 2730 in the designated location to determine a count of the items 2730 of the product type. The mobile robot 2710 can use the mechanical arm 2715 and camera 2720 to capture images of items 2730 that are at the back of the shelf by extending the mechanical arm 2715 and scanning over the entire designated location. For instance, the mechanical arm 2715 can be extended into a space above the items 2730 but below the shelf immediately above the items 2730 to capture images of the items 2730 not otherwise visible from the designated location. The captured images can be processed by a controller in the mobile robot 2710 or sent to a robot server to determine the number of items for the product type that is on the shelf 2725. The number of items on display is compared to a threshold number for the product type specified by the retail environment, by the store, or by a store manager to be on display at a given time. If the determined number of items 2730 on display is lower than the threshold, the mobile robot 2710 selects a restocking operation as an inventory operation to perform.

In some embodiments, the mobile robot 2710 does not have a mechanical arm 2715 and uses other methods of conducting the inventory check. The mobile robot 2710 can use radar to determine a number of items on the shelf. In some embodiments, the mobile robot 2710 can instruct drones to move to the designated location and capture images of the inventory.

Based on information associated with the product type, the robot determines whether the inventory operation is performable by the mobile robot 2710. The mobile robot 2710 retrieves details on the product type such as size, weight, material, price, and display requirements, and can evaluate whether the mobile robot 2710 has the necessary range of motion and force, or the necessary functionality to perform the inventory operation. For instance, the mechanical arm 2715 can be associated with a maximum weight and height, and can include a mechanical hand that is used to pick up items. The mechanical hand may be able to grab items made of certain materials, such as plastic or items packaged in cardboard boxes that have sufficient friction against the mechanical hand. However, the mechanical hand may not be compatible with items made of materials such as glass or items that can easily be damaged such as vegetables. The robot may also be restricted in handling items that are out of a certain price range.

In some embodiments, the mobile robot 2710 may be capable of performing a part of the inventory operation but may require assistance from a human operator for another part of the inventory operation. For example, for a restocking operation, the mobile robot 2710 can search for information associated with a product type and can determine that the product type is in storage in boxes that each contain a plurality of items (e.g., 24 items per box). The information can include the weight of each box, and the mobile robot 2710 can determine that the box exceeds the maximum weight that the mobile robot 2710 can lift and move. The mobile robot 2710 can determine that moving the box from the storage to the designated location for the product type is not performable by the mobile robot 2710, and can determine that restocking individual items onto the shelf 2725 is performable by the mobile robot 2710. In such an example, the mobile robot 2710 makes a request to a human operator to deliver the box to the designated location in the retail environment 2700. Once the box is delivered to the mobile robot 2710, the mobile robot 2710 uses its mechanical arm 2715 to restock individual items on the shelf 2725. When the mobile robot 2710 restocks inventory, the mobile robot 2710 updates the inventory log to reflect the additional items that are added for display. For example, if the product type was previously out of stock, the mobile robot 2710 can update a status of the product type to "in stock." The mobile robot 2710 can also update the inventory log to reflect a number of items for the product type that are on the shelf 2725.

In some embodiments, the mobile robot 2710 uses the camera 2720 to capture images of the retail environment 2700 to keep displays organized in the retail environment 2700. As customers and employees interact with the items on display, the displays can become unorganized. Using the captured images, the mobile robot 2720 determines whether the displays require reorganization. Responsive to determining that the displays require reorganization, the mobile robot 2710 selects an inventory organization operation to perform. If the display is within reach of the mobile robot 2710, the mobile robot 2710 can determine that the inventory organization operation is performable by the mobile robot 2710, and if the display is out of reach of the mobile robot 2710, the mobile robot 2710 flags the inventory organization operation for performance by a human operator. To organize displays of inventory items, the mobile robot 2710 can access the inventory log to determine a target orientation of the items. The mobile robot 2710 identifies an item at an orientation that does not match the target orientation and generates a motion plan to move the item until the orientation of the item matches the target orientation. For example, a target orientation for an item is associated with a display of a logo on a label of the item outward toward a customer. The mobile robot 2710 uses its mechanical arm 2715 to move the item until the orientation matches or is substantially similar to the target orientation. Similarly, an item on display may be flipped upside down, and the mobile robot 2710 can flip the item to match the target orientation.

In some embodiments, the mobile robot 2710 uses the camera 2720 to perform quality control operations on items in the retail environment 2700. The mobile robot 2710 can identify damaged items that are on display. For example, the mobile robot 2710 detects defects such as opened packaging, crushed boxes, dirty items, missing parts, or other damage conditions. The mobile robot 2710 captures an image of items 2730 on display on the shelf 2725 and uses image processing to identify the damaged items. The mobile robot 2710 may compare the captured image of items 2730 of a product type to an image of an undamaged item of the product type in the inventory log. Likewise, the mobile robot 2710 may compare images of adjacent items of a same product type to determine that a condition of an item differs from the other items. When the mobile robot 2710 identifies a damaged item, the mobile robot 2710 can select an item removal operation to perform. The mobile robot 2710 determines whether the mobile robot 2710 can remove the damaged item or requires assistance from a human operator or personnel. The mobile robot 2710 can subsequently select a restocking operation to perform to replace the removed damaged item.

In some embodiments, the mobile robot 2710 identifies misplaced items using the camera 2720. The mobile robot 2710 captures an image of the items 2730, and determines when an item of a product type is at a location different from a designated location for the product type. The mobile robot 2710 can select a relocation operation to perform, and can either return the items to the correct location, to a drop off location (such as a restocking bin), or can flag the item for relocation by a human operation or personnel.

The mobile robot 2710 can update a presentation of a product type within the retail environment 2700 to indicate a sale associated with the product type. Prior to the sale, the mobile robot 2710 can access the inventory log to determine product types on sale. The mobile robot 2710 navigates to a designated location for a product type going on sale and adds a visual indicator to highlight that the product type is on sale. The visual indicator can be a sticker of a discounted price, a tag on the shelf 2725, and the like. The mobile robot 2710 can capture an image of the designated location and can determine whether the mobile robot 2710 can access a position within the designated location where the product type is displayed. The mobile robot 2710 can also use a semantic map that describes the retail environment 2700 to determine whether the mobile robot can add the visual indicator. For example, if the semantic map indicates that the product type is displayed on a top shelf that is out of reach when the mechanical arm 2715 is fully extended, the mobile robot 2710 can flag the inventory operation to be performed by a human operator.

The mobile robot 2710 can verify compliance for a sponsored display. The retail environment 2700 may receive a request to display a product type from a third party system such as an advertiser, manufacturer, or seller of the product type. The request can include instructions to display the product type in a particular configuration or in a prominent location (e.g., within 10 feet of doors) within the retail environment 2700, to keep a specified number of products on display, to display the product near a related product type, to display at a minimum height on the shelves, and the like. The request can also include information specifying a location, a configuration, a sample image of the sponsored display, a price, and a duration (e.g., from ten days before a holiday to one day after the holiday). To verify that the retail environment 2700 is satisfying terms of agreements with the advertiser, the mobile robot 2710 can navigate to the requested location associated with the sponsored display and can verify that the sponsored location is at the requested location. The mobile robot 2710 can capture an image of the sponsored display and can send the captured image to the third party system. The mobile robot 2710 can compare the sponsored display to the sample image and can determine if the sponsored display matches the sample image. For example, an advertiser can request a sponsored display of chocolates arranged in a heart shape for Valentine's Day, and the mobile robot 2710 can capture an image of the sponsored display to determine if the chocolates are arranged in the heart shape as specified by the advertiser.

The mobile robot 2710 can inspect customers when an alarm associated with an anti-theft detector is activated. The mobile robot 2710 may use audio sensors to detect when the alarm associated with anti-theft detectors goes off. The mobile robot 2710 may receive a signal from the anti-theft detector indicating that assistance is required at the anti-theft detector. The mobile robot 2710 can navigate to the anti-theft detectors and can ask a customer that triggered the alarm for permission to search the customer's bags. Responsive to the customer granting permission, the mobile robot 2710 uses the mechanical arm 2715 and the camera 2720 to determine which item in the customer's bags activated the anti-theft detector. The mobile robot 2710 can determine if a security tag is not removed, if an item was not checked out, or if there was a false alarm. Responsive to the customer not granting permission, the mobile robot 2710 determines that the inspection of the customer's bags is not performable by the mobile robot and contacts a human operator for further assistance.

The mobile robot 2710 can be stationed by an exit of a retail environment 2700 to compare customer receipts to items in customer bags and carts. The mobile robot 2710 can use its mechanical arm 2715 and camera 2720 as well as RFID tag reader to identify items that are in customer bags and carts. The mobile robot 2710 can capture an image of the customer receipts to identify items that were checked out or purchased and then can scan the mechanical arm 2715 over customer bags and carts for comparison. The mobile robot 2710 determines if the receipt and the items in the customer bags and carts match. Responsive to the receipt and the items matching, the mobile robot 2710 allows the customer to pass through, and responsive to the receipt and the items not matching, the mobile robot 2710 contacts a human operator for further assistance.

The mobile robot 2710 can assist customers while the customers are shopping in the retail environment 2700. A customer may not be capable of holding a basket or pushing a cart. The mobile robot 2710 can follow a customer around the retail environment 2710 and help the customer access items. For example, the customer may browse around the retail environment 2700 and when there is an item that the customer would like to purchase, the customer can make a request to the mobile robot 2710 to retrieve the item. The mobile robot 2710 selects an inventory retrieving operation and determines whether it can retrieve the item. If determined that the mobile robot 2710 is incapable of retrieving the item, the mobile robot 2710 contacts a human operator.

The mobile robot 2710 can assist a customer by carrying out purchased items from the retail environment 2700 to the customer's vehicle. The mobile robot 2710 can receive a request from a cashier or can respond to a "help" button when the customer interacts with the button. The mobile robot 2710 can initially approach the customer looking for assistance and can determine whether the mobile robot 2710 is capable of carrying the customer's purchases. The mobile robot 2710 can have force sensors to detect a weight of the customer's cart or bags and determine whether the mobile robot 2710 can move the cart or the bags. The mobile robot 2710 can apply an initial force and increase the amount of force until the cart or the bags move or a maximum force capacity of the mechanical arm 2715 is met. Responsive to the maximum force capacity being met, the mobile robot 2710 contacts a human operator for assistance.

The mobile robot 2710 can observe customer behavior. The mobile robot 2710 can track customer movements throughout the retail environment 2700. The mobile robot 2710 can identify customer movements such as paths that customers take while shopping, facial expressions, time spent in front of product types, a number of customers visiting the retail environment 2700 at a given time, and products returned after being added to a basket or cart. Based on the customer movements, the mobile robot 2710 can modify retail environment 2700 layout, modify price of items 2730 within the retail environment 2730, modify staff schedules, ask for customer feedback, offer assistance to customers, and perform other inventory operations.

Figure 28:
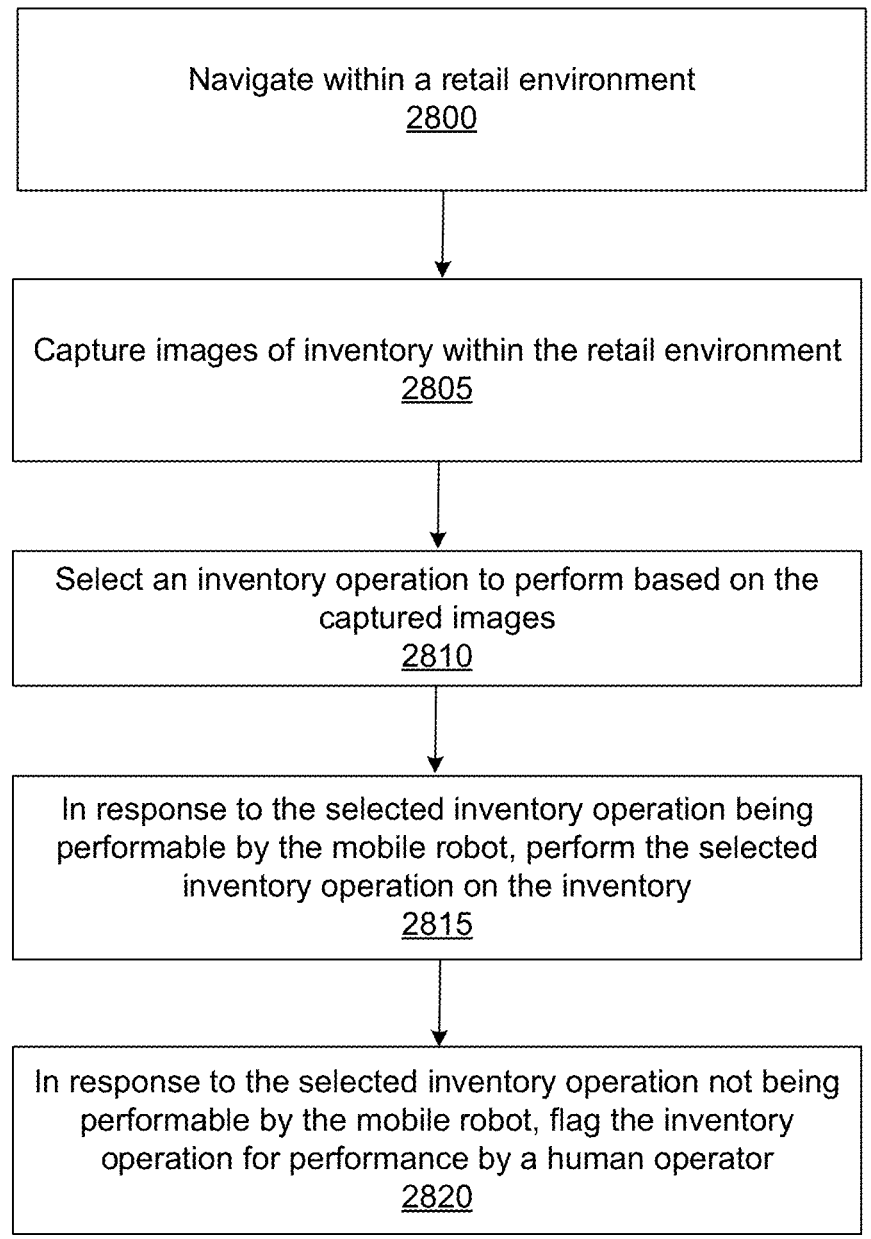
FIG. 28 is a flow chart illustrating a process for performing an inventory operation in a retail environment, according to one embodiment.

FIG. 28 is a flow chart illustrating a process for performing an inventory operation in a retail environment, according to one embodiment. The mobile robot navigates 2800 within the retail environment. The mobile robot can collect information about inventory on display in the retail environment and can determine that an inventory operation needs to be performed. Inventory operations can include a restocking operation for a particular product type, a rearranging operation to rearrange items on display, a relocation operation to move items to different locations in the retail environment, a removal operation to remove items from display, a quality control operation to check for product defects, a product location operation for locating items for customers, a product retrieval operation for retrieving items, a compliance operation for checking compliance of agreements with advertisers, a pricing operation for updating product prices, and the like.

The mobile robot captures 2805 images of inventory within the retail environment. The mobile robot can capture the images using a camera mounted on a mechanical arm of the mobile robot. In some embodiments, the mobile robot does not have a mechanical arm and captures images using a camera within a body of the robot, an RFID sensor, and the like.

The mobile robot selects 2810 an inventory operation to perform based on the captured images. Based on the captured image, the mobile robot can determine a number of items of a product type on display, an orientation of the items on display, conditions of the items on display (e.g., whether there are defects or damages), and locations of items on display. The mobile robot selects the inventory operation based on, for instance, a condition or state of inventory represented within the captured images.

The mobile robot determines whether the mobile robot is capable of performing the selected inventory operation. In response to the selected inventory operation being performable by the mobile robot, the mobile robot performs 2815 the selected inventory operation on the inventory. In response to the selected inventory operation not being performable by the mobile robot, the mobile robot flags 2820 the inventory operation for performance by a human operator.

Latency Management

Figure 29:
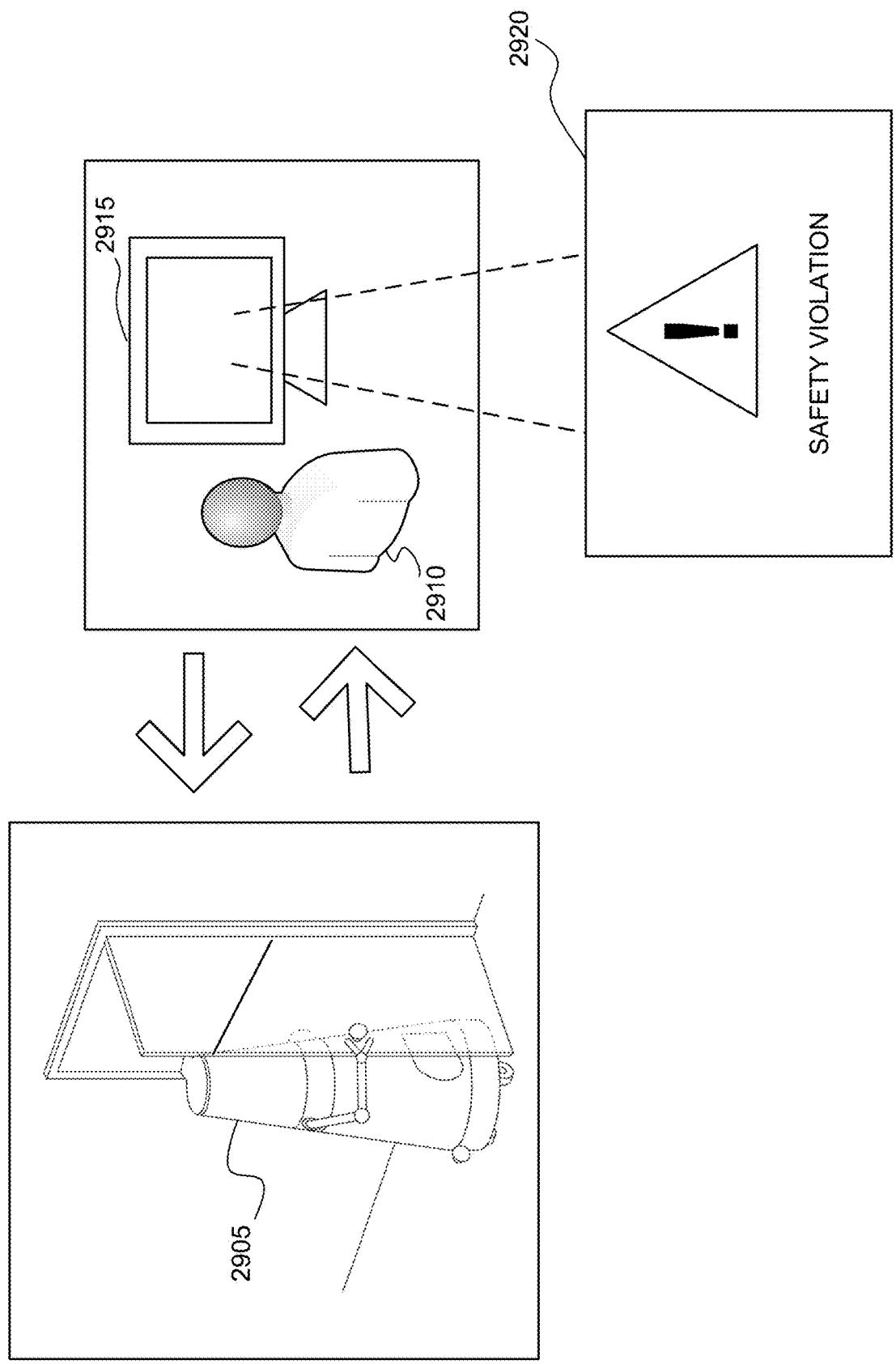
FIG. 29 illustrates an interaction between a mobile robot and a human operator, according to one embodiment.

FIG. 29 illustrates an interaction between a mobile robot and a human operator, according to one embodiment. The mobile robot 2905 and the human operator 2910 are connected via a network (e.g., network 200), and the human operator 2910 can monitor and control actions performed by the mobile robot 2905 in an environment. The human operator 2910 can access information collected from cameras and sensors of the mobile robot 2905 as well as information from security cameras, sensors, and semantic maps of the environment. Based on the information, the human operator 2910 provides instructions to the mobile robot 2905 to perform tasks within the environment. The human operator 2910 can receive information from the mobile robot 2905 and provide instructions to the mobile robot 2905 using a computer 2915. The mobile robot 2905 can operate autonomously, be controlled by the human operator 2910 using teleoperation, or operate in a combination of the two modes.

Although not illustrated in FIG. 29, the mobile robot 2905 and the human operator 2910 can also be connected to a robot server that manages activities of one or more mobile robots 2905 in the network. In some embodiments, the robot server receives the information collected by the mobile robot 2905 and generates a virtual model to describe conditions of the environment in which the mobile robot operates to be presented to the human operator 2910. In some embodiments, the virtual model is a 3D model of the environment. The robot server can generate the 3D model as the mobile robot 2905 navigates around the environment and collects information about a current state of the environment. The 3D model is a scaled representation of the environment such that the human operator 2910 may provide accurate instructions to the mobile robot 2905 despite being stationed remotely. For example, the mobile robot 2905 can capture an image of a door that is open at an angle, and based on the image, the robot server renders a 3D representation of the door that is open at the same angle for accurate representation in the 3D model. In some embodiments, one or more functions performed by the robot server may be performed instead by the mobile robot. For example, the 3D model can be generated by a controller built-in to the mobile robot 2905 and sent directly to the human operator 2910.

The generated virtual model is presented to the human operator 2910 in a graphical user interface. Based on the virtual model, the human operator 2910 can provide movement instructions to be performed by the mobile robot 2905. The virtual model can be presented to the human operator 2910 using augmented reality (AR) and virtual reality (VR). In some embodiments, the movement instructions are determined based on interactions made by the human operator 2910 to the virtual model. For example, the human operator 2910 can click on portions of the virtual model to provide instructions to the mobile robot 2905. If the virtual model shows that a door that should be kept shut is open, the human operator can use a mouse to click on the door in the virtual model or provide touch input using a stylus or a finger to close the door. The human operator 2910 may provide a variety of instructions depending on the type of interactions made with a component of the virtual model. Continuing with the door example, one click on the door in the virtual model can represent instructions to close the door while two clicks on the door represents instructions to lock the door. The human operator 2910 can use a variety of input methods to interact with the virtual model, including voice commands, buttons, joysticks, and the like.

In some embodiments, each component (e.g., a door, a window, a package, an individual) in the virtual model is associated with common tasks that the mobile robot 2905 can perform. For example, for a window, common tasks can include opening/closing the window, locking/unlocking the window, opening/closing the blinds, and cleaning the window. The common tasks can be displayed to the human operator 2910 in the graphical interface such that the human operator 2910 may select from a drop-down menu that lists the common tasks that the mobile robot 2905 can perform.

As discussed above, the human operator 2910 may communicate with the mobile robot 2905 via the robot server. The human operator 2910 sends the movement instructions to the robot server, and the robot server generates a motion plan to be performed by the mobile robot 2905. The human operator may provide high-level movement instructions to the robot server, and the robot server can calculate motion plans to be performed by different parts of the mobile robot 2905 to perform the corresponding task. The robot server can use the virtual model, semantic maps, sensors and cameras in the environment and the mobile robot 2905 to generate the step-by-step motion plan for the mobile robot 2905. For example, the human operator sends movement instructions for the mobile robot 2905 to close a door that is currently open. The robot server receives the movement instructions and generates the motion plan that identifies a position of the mobile robot 2905 relative to the door, an angle of the mobile robot 2905 arm when grabbing the door handle, an amount and direction of force to apply to the door handle, and other specific instructions for the mobile robot. In some embodiments, the human operator communicates directly with the mobile robot 2905, and a controller of the mobile robot 2905 processes the movement instructions to generate the motion plan.

The mobile robot 2905 receives the motion plan and is configured to perform movement based on the motion plan. As the mobile robot 2905 performs the movement or prepares to perform the movement, the mobile robot 2905 continues to collect information about the environment using cameras and sensors. The mobile robot 2905 may detect a change in the environment that is not represented in the virtual model presented to the human operator 2910 based on the information. The mobile robot 2905 determines whether the change in the environment causes a safety violation when the movement is performed. The safety violation may be associated with security of the building, harm to individuals in the building, damage to the mobile robot 2905, and damage to objects in the building.

In the communication between the mobile robot 2905 and the human operator 2910, there is a latency in the detection of the change in the environment by the mobile robot 2905 and a representation of the change in the environment within the virtual model. The latency can be due to technological limits such as time delay in sending and receiving information between the different systems, in updating the virtual model to account for the change in environment, due to network failure or communication latency, and the like. The latency can also be due to response time of the human operator 2910 to evaluate the change in the environment and to decide how to respond to the change. The human operator 2910 may also step away from the computer and thus may not receive information about the change in the environment until a later time, which prevents the mobile robot 2905 from receiving updated movement instructions in time to avoid the safety violation.

When the mobile robot 2905 determines that a safety violation may occur because of the change in the environment, the mobile robot 2905 autonomously modifies a movement or action taken by the mobile robot 2905. When operating autonomously, the mobile robot 2905 modifies the motion plan provided by the robot server to mitigate the safety violations without requiring input from the human operator 2910. The modification can include reducing speed of the movement, delaying the movement, completely stopping the movement, generating a warning signal (e.g., to a human within a vicinity of the mobile robot 2905), changing a direction of the movement, and any other suitable methods to mitigate the safety violation. The modification can be selected based on the type of safety violation, based on a predicted time until safety violation occurs, and based on a current motion plan. The mobile robot 2905 may use its cameras to record its environment while performing the modified motion plan for review by the human operator 2910.

In one example, the mobile robot 2905 receives a motion plan to open a door. As the mobile robot approaches the door, the mobile robot captures an image of a person on the other side of the door through a window in the door or receives video data from a camera that is on the other side of the door from a security system of the building indicating the presence of the person. The mobile robot 2905 determines that pushing the door may cause harm to the person on the other side of the door. Instead of pushing the door according to the motion plan, the mobile robot 2905 autonomously modifies the motion plan to mitigate the safety violation. The mobile robot 2905 can take actions not included in the motion plan such as generating an audio message for the person on the other side of the door (such as "please step away from the door"), or changing the motion plan to move away from the doorway to allow the person on the other side go through the door first.

The mobile robot 2905 can modify the motion plan depending on a time at which the safety violation is predicted to occur. For example, if the person on the other side is two feet away from the door and ready to open the door, the mobile robot 2905 may not have sufficient time to generate a new motion plan to move out of the doorway. The mobile robot 2905 can pause movement and sound an alarm so that the person opening the door knows that the mobile robot 2905 is on the other side of the door. However, if the person on the other side is more than 10 feet away from the door, the mobile robot 2905 can generate the new motion plan to move out of the doorway or to determine that the person on the other side will not cause a safety violation and proceed according to the original motion plan. Similarly, the mobile robot 2905 can modify the motion plan based on a distance between the mobile robot 2905 and a person or object associated with the safety violation.

When the mobile robot 2905 autonomously modifies a motion plan, the mobile robot 2905 indicates that the mobile robot 2905 is modifying the motion plan to the human operator 2910. The human operator 2910 can receive a message 2920 describing the modified motion plan (e.g., "avoiding person behind door," "pausing movement"), the type of safety violation averted, the time at which the modified motion plan was executed, the location of the safety violation, and a request for further instructions. The message 2920 can be overlaid on the virtual model presented to the human operator 2910. In some embodiments, the message 2920 is an icon such as a warning sign.

Once the security violation is mitigated, the mobile robot 2905 sends information about the change in the environment that caused the safety violation to the robot server. The robot server generates an updated virtual model based on the change in the environment for display to the human operator 2910. The change in the environment in the updated virtual model can be highlighted to the human operator 2910 so that the human operator can easily spot the change (e.g., an arrow pointed towards the change).

The updated virtual model can include information describing steps taken by the mobile robot 2905 to avoid the safety violation. The information can be a visual representation of the modified motion plan. For example, if the mobile robot 2905 receives movement instructions (defining a target path) from the human operator 2910 but takes a new path to avoid a safety violation, the new path can be displayed in a different color, thickness, pattern, and different other visual features to distinguish from the target path. The updated virtual model can be displayed along with a video that allows the human operator 2910 to playback a recording of actions taken by the mobile robot 2905 while performing the modified motion plan such that the human operator 2910 may review the modified movements.

Figure 30A:
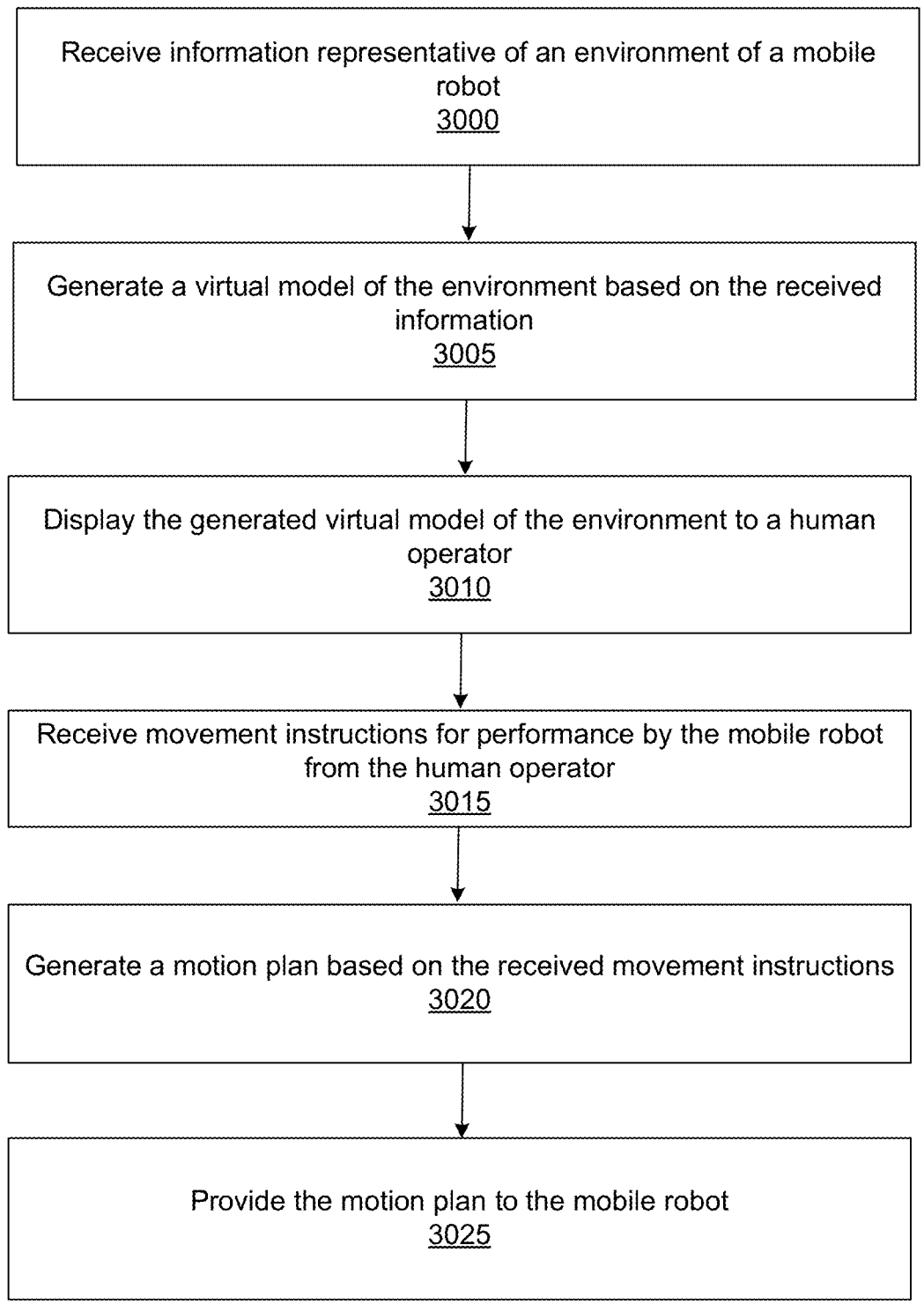
FIGS. 30A and 30B are flow charts illustrating a process for generating a virtual model of an environment for use in navigating a mobile robot, according to one embodiment.
Figure 30B:
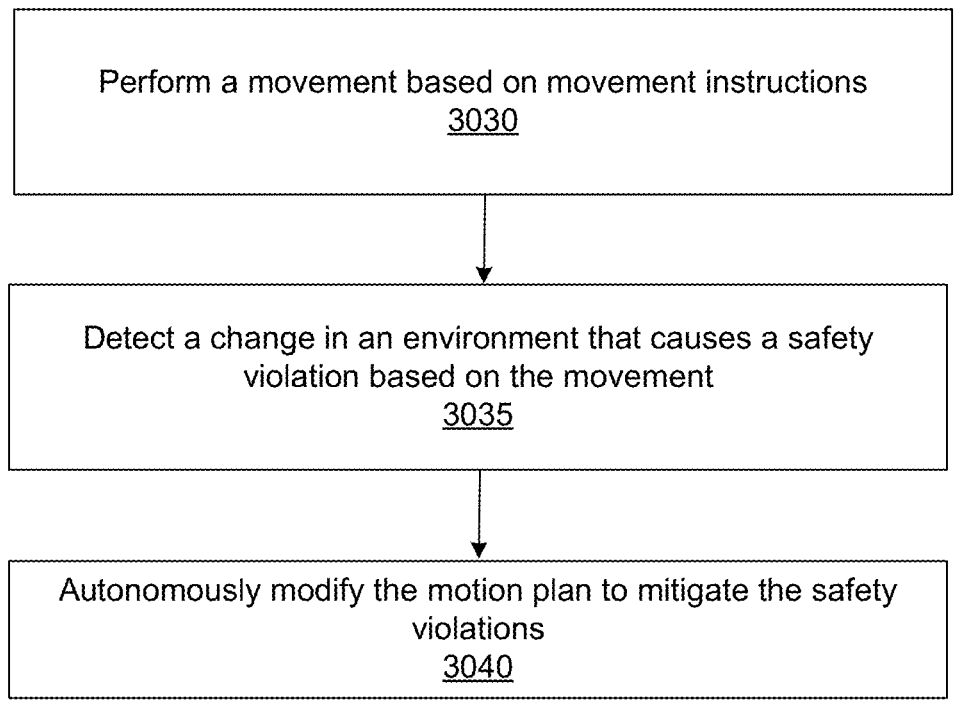

FIGS. 30A and 30B are flow charts illustrating a process for generating a virtual model of an environment for use in navigating a mobile robot, according to one embodiment. FIG. 30A describes steps performed by a robot server, and FIG. 30B describes steps performed by the mobile robot. In some embodiments, steps in FIG. 30A are performed by a mobile robot instead of a robot server.

A robot server receives 3000 information representative of an environment of a mobile robot. The information representative of the environment can be images of the environment captured by the mobile robot and data collected using sensors on the mobile robot. The information can also include information from sensors and cameras in a building that the mobile robot is in, from additional mobile robots near the mobile robot, and from individuals in the building. The robot server generates 3005 a virtual model of the environment of the mobile robot based on the received information. The virtual model can be a 3D model of the environment that represents the layout of the environment and the state of the environment (e.g., open/closed doors, a location of objects and individuals within the environment, and the like). The robot server displays 3010 the generated virtual model of the environment to a human operator. The human operator can be stationed remotely and can use the virtual model to determine movement instructions to provide to the mobile robot.

The robot server receives 3015 movement instructions for performance by the mobile robot from the human operator. In some embodiments, the movement instructions correspond to an interaction that the human operator makes with the virtual model. Based on the received movement instructions, the robot server generates 3020 a motion plan. The movement instructions from the human operator can be high-level instructions that are translated to the motion plan to be performed by the mobile robot. The motion plan can specify how to move different components of the mobile robot. The robot server provides 3025 the motion plan to the mobile robot.

After receiving the motion plan from the robot server, the mobile robot performs 3030 a movement based on movement instructions. As the mobile robot prepares to or as the mobile robot performs the movement, the mobile robot detects 3035 a change in the environment of the mobile robot such that the movement causes a safety violation based on the change in environment. The mobile robot may not have sufficient time to update or inform the human operator of the change in the environment. Accordingly, the mobile robot autonomously modifies 3040 the motion plan to mitigate the safety violation.

Electronic Surveillance Prevention

Figure 31:
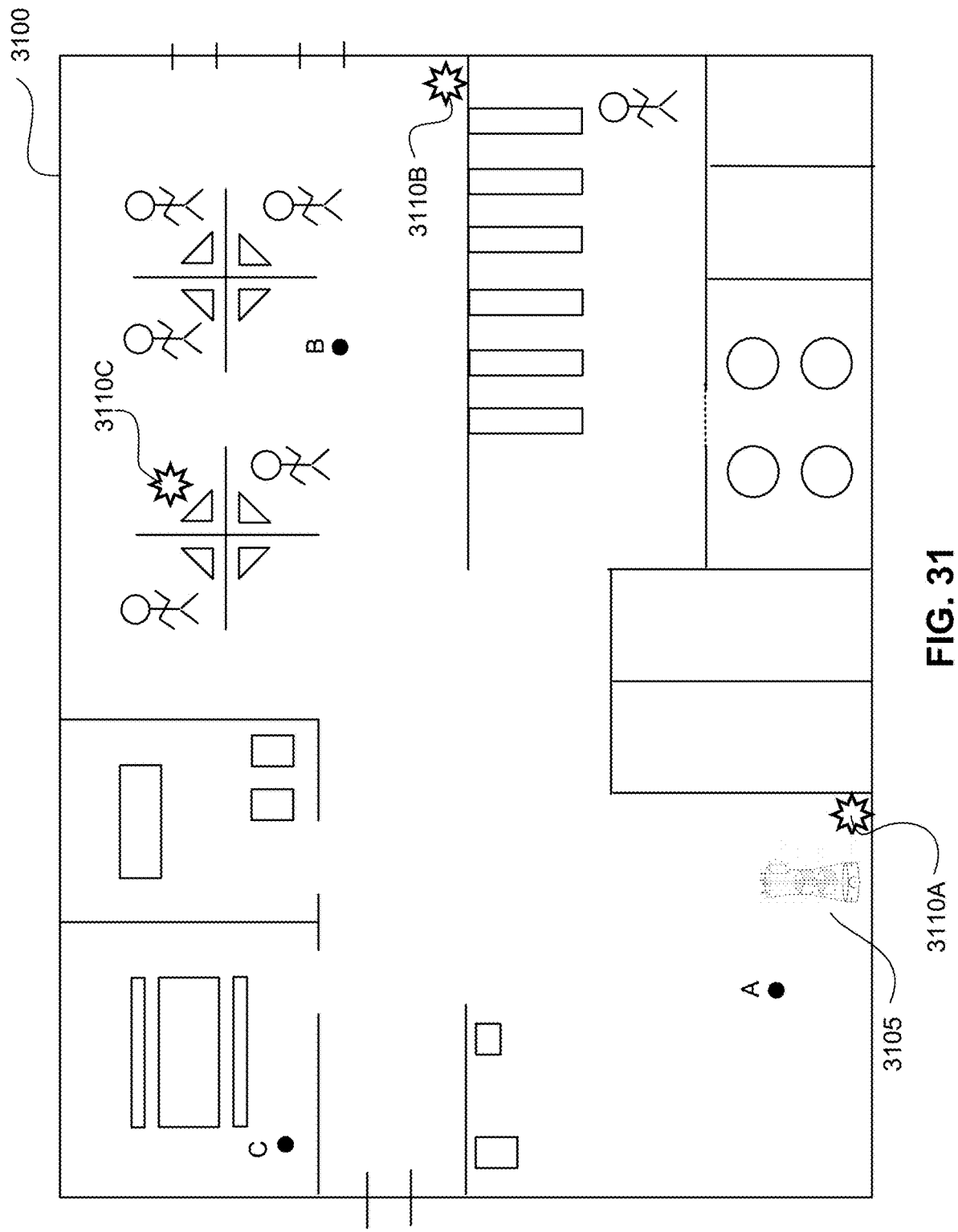
FIG. 31 is a map with locations of surveillance devices identified by a mobile robot performing a security sweep, according to one embodiment.

FIG. 31 is a map with locations of surveillance devices identified by a mobile robot performing a security sweep, according to one embodiment. The mobile robot 3105 navigates throughout an environment 3100 and scans the environment for surveillance devices that may be hidden in the environment 3100. The mobile robot 3105 can perform the scan in response to a request from a human that suspects presence of surveillance devices (e.g., after a break-in) or as part of routine security measures (e.g., weekly, before an event). In some embodiments, the mobile robot 3105 can have a built-in spectrum analyzer or can hold a spectrum analyzer using a mechanical hand for detecting an unauthorized surveillance device such as a microphone and/or a camera.

The mobile robot 3105 can enter the environment 3100 and can access a map of the environment 3100. The map of the environment 3100 may be accessed through a security system of the environment, or may be generated by the mobile robot 3105 using images or information gathered from cameras and/or sensors within or on the mobile robot 3105. Using the map, the mobile robot 3105 generates a motion plan to access and scan different parts of the environment 3100. For instance, the mobile robot 3105 identifies a pathway through the environment 3100 for scanning the environment 3100 without running into people, furniture, equipment, and other obstacles in the environment.

When the mobile robot 3105 generates the motion plan, the mobile robot 3105 can allocate different amounts of time for different parts of the environment 3100. Based on the map, the mobile robot 3105 can predict an area that is likely to take more time for scanning. For example, if one portion of the environment 3100 has an empty wall without furniture, people, doorways, and paintings, the empty wall is likely to take less time to scan compared to another portion of the environment 3100 with more objects that will require a more thorough examination.

In some embodiments, the mobile robot 3105 performs a security sweep in multiple phases. For instance, the mobile robot 3105 conducts an initial sweep in which the mobile robot 3105 quickly navigates around the entire environment 3100 to perform a preliminary scan for signals from surveillance devices and to determine if there are areas within the environment 3100 in which strong signals are detected. For example, the mobile robot 3105 can divide the environment 3100 into multiple zones and can determine a likelihood for each of the zones that one or more surveillance devices are located in the zone. The mobile robot 3105 prioritizes the different zones for scanning based on the likelihood values and based on a proximity of the mobile robot 3105 to the zones. For example, as shown in FIG. 31, the mobile robot 3105 determines that the likelihoods of a surveillance device being within a 10 feet radius of locations A, B, and C are 60%, 85%, and 5%, respectively. In the example shown in FIG. 31, location A is near a first surveillance device 3110A, location B is near a second surveillance device 3110B and a third surveillance device 3110C, and location C is not near any surveillance devices. Since location B is near two surveillance devices, the likelihood is higher compared to locations A and C. The mobile robot 3105 prioritizes location A over location B (based on the proximity of the mobile robot 3105 to location A) and prioritizes location B over location C (based on the greater likelihood that a surveillance device is within a threshold distance of location B relative to location C). Thus, the mobile robot 3105 can scan a proximity around location A first, can move to location B for scanning, and then can move to location C.

The mobile robot 3105 can scan for surveillance devices in multiple ways. In one embodiment, the mobile robot 3105 moves to a location and scans vertically using the spectrum analyzer mounted to an arm of the mobile robot. The mobile robot first lowers the spectrum analyzer to the floor and raises the arm towards the ceiling in order to scan for surveillance devices between the floor and the ceiling at the location. If no surveillance device is detected, the mobile robot 3105 can move to another location that is a predetermined distance away from the location and repeats scanning vertically. In another embodiment, the mobile robot 3105 only scans floors and/or walls. In other embodiments, the mobile robot 3105 scans all objects within a room (such as furniture, appliances, counters, lights, and the like). The mobile robot 3105 can scan at a location within the environment, can update a map of the environment with information representative of the scan at the location, and can move to a different location that has not been scanned yet within the environment for scanning.

The mobile robot 3105 can compare the likelihoods of a presence of a surveillance device to a threshold value to determine which zones to scan during a scanning phase following the initial scan. If a likelihood of a surveillance device being in a zone is less than the threshold, the mobile robot 3105 can skip the zone to improve efficiency and save resources. For example, the mobile robot 3105 may skip scanning within a 10 feet radius of location C since there is only a 5% chance of a surveillance device being in that area and the threshold for scanning is at least 60%. The likelihood threshold value may be set to different values based on a context of the scan. For example, the threshold value can be lowered when there is a high security activity scheduled in the environment 3100 or after a break-in and increased during a weekend where there is less activity in the environment 3100.

In some embodiments, the mobile robot 3105 navigates around the environment 3100 and records locations where strong signals are detected such that the mobile robot 3105 or a human operator can return to the locations for a more detailed examination. The mobile robot 3105 can update the map to include information associated with the strength of the signals. The mobile robot 3105 can generate a heat map on the environment 3100 to represent a strength of signals from potential surveillance devices at different locations within the environment 3100. Likewise, the mobile robot 3105 can generate a heat map of the environment 3100 indicating areas cleared by the mobile robot 3105 as not including a surveillance device. Such a heat map can be used by the mobile robot 3105 to identify a next area within the environment 3100 to scan, or to indicate to a human operator areas that aren't likely to have a surveillance device.

The mobile robot 3105 can also generate the motion plan based on historical data. The security system of the environment 3100 can include a database that stores historical locations in the environment 3100 associated with unauthorized surveillance devices. For example, the security system can include a list of locations that are known to be ideal locations for placing unauthorized surveillance devices such as vents, light fixtures, under tables, and the like. The mobile robot 3105 can use cameras and semantic maps of the environment 3100 to identify locations ideal for placing surveillance devices and can prioritize scanning these locations for surveillance devices.

The mobile robot 3105 can be instructed by a human operator that is monitoring the mobile robot 3105 to scan specific areas in the environment 3100. The human operator can request that the mobile robot 3105 go straight to a location and scan at that location. In some embodiments, the mobile robot 3105 can scan an environment while otherwise operating within the environment, and can flag areas that are more than a threshold likely to include a surveillance device to a human operator.

As the mobile robot 3105 scans the environment 3100, the mobile robot 3105 can disable or reduce power to portions of electronics in the mobile robot 3105 to reduce potential interference with the spectrum analyzer. For example, if the transceiver for communicating with a human operator emits signals that affect the spectrum analyzer, the mobile robot 3105 can temporarily disable the transceiver until after the scanning is complete.

After scanning the environment 3100, the mobile robot 3105 may generate a report to present to a human operator. The report can include a modified map of the environment 3100 that indicates locations that are likely to have a surveillance device. The map may be overlaid with visual indicators such as markers, percentages, colors, and other indicators representative of a likelihood that a surveillance device is located in a particular portion of the map. The map can indicate "safe" areas that have low probability of a surveillance device. When the mobile robot 3105 determines that a likelihood of a surveillance device being at a location in the environment 3100 is above a threshold, the mobile robot 3105 can alert a security personnel such as a security guard and the police.

In the environment 3100, electronic devices with communication capabilities that aren't surveillance devices may be present that can cause the spectrum analyzer to pick up signals similar to surveillance device signals. The mobile robot 3105 can perform noise compensation operations to filter out such signals in order to isolate signals from surveillance devices. The mobile robot 3105 can compare detected signals to a list of known devices in the environment 3100 stored in a semantic map of the environment and can determine a likelihood of a received signal coming from a non-surveillance electronic device. If the likelihood that a detected signal originates from a non-surveillance electronic device is above a threshold, the mobile robot 3105 disregards the signal and continues to other locations to search for unauthorized surveillance devices.

If a mobile robot 3105 discovers a surveillance device, the mobile robot 3105 can generate interference signals (e.g., loud or hypersonic noises) so that the surveillance device cannot collect audio data from the environment 3100. Similarly, if the surveillance device is a camera, the mobile robot 3105 can cover the lens to prevent unauthorized recording or can emit a bright light to prevent the camera from continuing to collect unauthorized video data.

After discovering a surveillance device, the mobile robot 3105 can investigate how the surveillance device was placed in the environment 3100. The mobile robot 3105 can access a semantic map of the environment 3100 to identify a security camera with a field of view that includes the location at which the surveillance device was discovered. The mobile robot 3105 can access videos recorded by the security camera to identify a person who placed the surveillance device and a time at which the surveillance device was accessed. The mobile robot 3105 may also remove the surveillance device using its mechanical arms or contact a security personnel to remove the surveillance device.

The mobile robot 3105 can scan people and other mobile robots for surveillance devices. The mobile robot 3105 can stand by a door way and scan people and robots before allowing them to enter the environment 3100. The mobile robot 3105 can also perform identity recognition functions to identify suspicious individuals, and can navigate to the suspicious individuals for scanning. Similarly, the mobile robot 3105 can scan other mobile robots encountered while scanning the environment 3100, and can request that other mobile robots approach the mobile robot 3105 for scanning, or can request that other mobile robots stop performing other activities until they are scanned by the mobile robot 3105.

Figure 32:
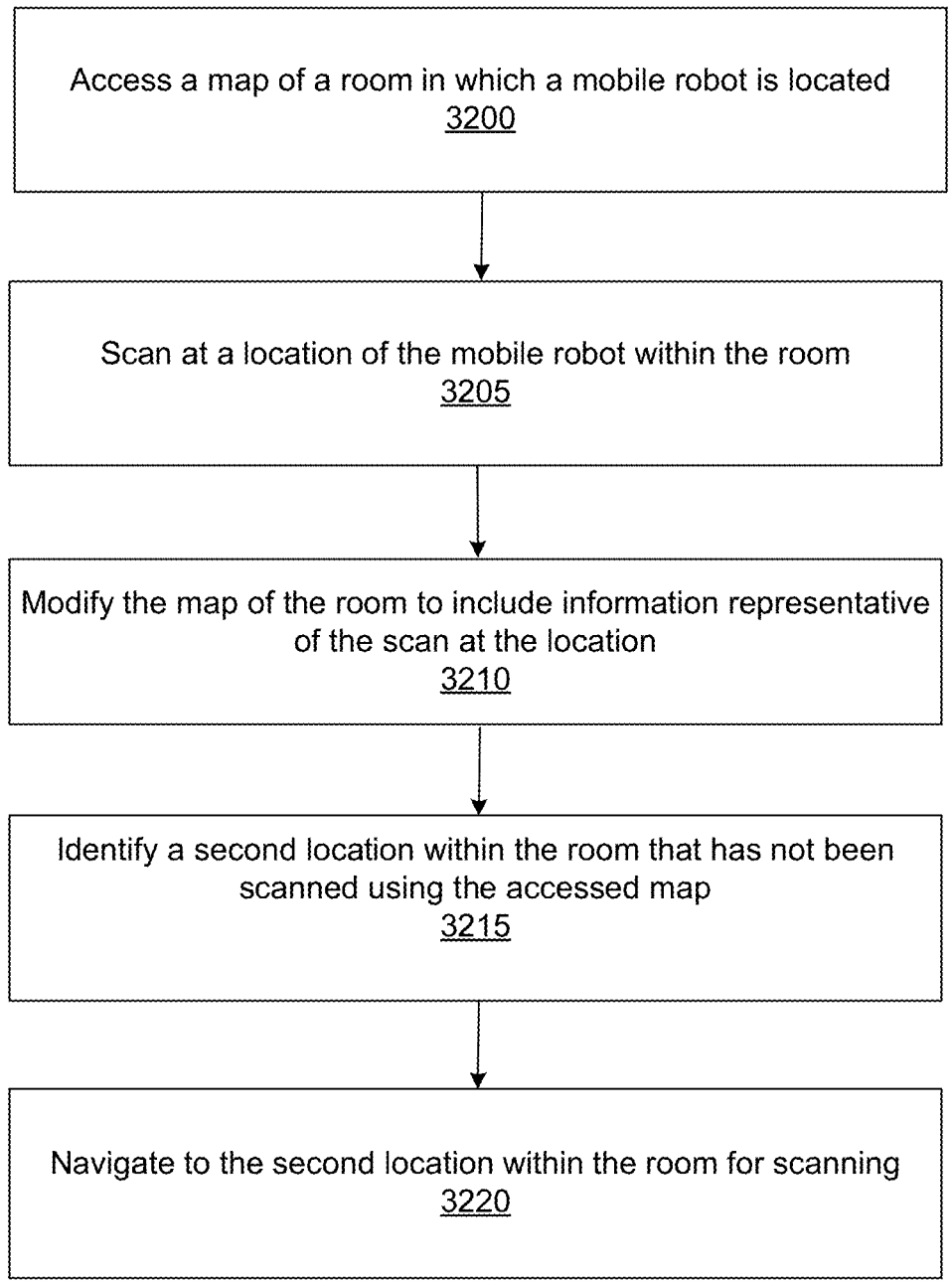
FIG. 32 is a flow chart illustrating a process for searching for electronic surveillance devices, according to one embodiment.

FIG. 32 is a flow chart illustrating a process for searching for electronic surveillance devices, according to one embodiment. As the mobile robot navigates within a location, the mobile robot accesses 3200 a map of a room in which the mobile robot is located. The map can be retrieved from a system associated with a building in which the room is located, or can be generated using images and other data captured by the mobile robot. The mobile robot scans 3205 at a location of the mobile robot within the room. The mobile robot modifies 3210 the map of the room to include information representative of the scan at the location. The information represents a likelihood of a surveillance device being at the location. The mobile robot identifies 3215 a second location within the room that has not been scanned using the accessed map. The mobile robot navigates 3220 to the second location within the room for scanning.

Environmental Sensor

The mobile robot can be equipped with environmental sensors to collect ambient condition information inside or outside of a building. The mobile robot can use sensors to detect dangerous conditions by detecting chemical presence, $CO_2$, CO, allergens, smoke, and radiation. The mobile robot can perform safety actions based on information collected from the environmental sensors. The mobile robot determines when dangerous conditions exist within or outside of a building based on the information. For example, when detected levels for CO exceeds a threshold, the mobile robot identifies a danger. The mobile robot can notify security personnel of the building, trigger alarms in the building by connecting to the building's safety system, or use an alarm on the mobile robot to warn people in the building. The mobile robot can navigate around the building to warn people and provide evacuation instructions.

The mobile robot can also use sensors to detect temperature and humidity to maintain a comfortable environment for people in the building. The mobile robot can access semantic maps to determine a target temperature of the building. The mobile robot can monitor temperatures at different areas of the building to evaluate whether there are abnormalities in certain areas. For example, the mobile robot can determine that the temperature in a room in the building varies more than a threshold amount from the target temperature. The mobile robot can flag the room for a human operator to check for broken heating or cooling equipment. Likewise, if a particular room is sensitive to humidity (such as a room storing books), the mobile robot can query a semantic map to determine a humidity limit for the room, and can flag the room for a human operator to investigate if the detected humidity within the room exceeds the limit.

Cleaning Applications

The mobile robot can be configured to perform cleaning functions within a building. The mobile robot can detect when cleaning is required using cameras and sensors on the mobile to identify when a state of the building is different from an expected state. For example, there may be a spill on the floor, and the mobile robot may detect a difference in color where the spill is and determine that cleaning is required. If the mobile robot is capable of performing a required cleaning function, the mobile robot performs the cleaning function. If the mobile robot is incapable of performing the required cleaning function, the mobile robot flags the cleaning function to the central system or another mobile robot that is capable of performing the cleaning function.

The mobile robot can also receive instructions from the central system to go to a location within a building that requires cleaning. The central system can detect a need for cleaning based on information received from other mobile robots connected in the network or can receive a cleaning request from a human. The building may be associated with a routine cleaning schedule, and the central system may instruct the mobile robot based on the schedule. After receiving the instructions to go to the location, the mobile robot may generate a motion plan using maps of the building to generate a path from a current location of the mobile robot to the location. In some embodiments, the mobile robot may use semantic maps of the building to identify a supply closet closest to the current location that has cleaning supplies required to perform the cleaning functions. The mobile robot may modify the motion plan to include a stop at the identified supply closet. In some embodiments, the mobile robot may be equipped with the cleaning supplies and move to the location directly from the current location.

The mobile robot can have one or more arms on the robot body perform a variety of functions such as sweeping, dusting, mopping, washing surfaces, loading/unloading a dishwasher, wiping windows and mirrors, vacuuming, tidying misplaced objects, disinfecting, emptying trash, and the like. The mobile robot may be a part of a cleaning crew with a plurality of mobile robots that each performs a different cleaning function. The mobile robots in the cleaning crew may communicate with each other to coordinate the cleaning. For example, a first mobile robot may sweep the floors of an office and communicate with a second mobile robot once the sweeping is complete. The second mobile robot then navigates to the office to mop the floors.

Concierge Applications

The mobile robot can perform concierge tasks in a building such as a hotel, retail store, a hospital, an office, a restaurant, and a school. The mobile robot can assist visitors by helping visitors open doors, greeting the visitors and asking if the visitors need help, directing the visitors to locations within the building, retrieving locations of products in a store, contacting appropriate personnel in response to a user request, retrieving a product for a visitor, checking in visitors to an appointment or a reservation, making recommendations to visitors, signing for mail and packages, enforcing visitor access control, and the like. The mobile robot can be located in a fixed location within the building (e.g., behind a help desk) or can be configured to perform concierge tasks while moving within an area (for instance, while performing other functions). For example, the mobile robot can be located in a retail store, restocking inventory, when approached by a customer or an employee for assistance, the mobile robot pauses restocking inventory and performs concierge tasks. After the concierge tasks are complete, the mobile robot returns to complete restocking inventory.

Maintenance Applications

The mobile robot can perform indoor maintenance tasks as well as outdoor maintenance tasks for upkeeping a building and its surrounding areas. The mobile robot can perform tasks such as repairing broken equipment, performing safety inspections (e.g., checking a smoke detector or a carbon monoxide detector), performing pest inspections, and the like. In some embodiments, the mobile robot assists human maintenance workers by holding doors open while they are working, handing tools to the human workers, putting warning signs up around the worksite, directing traffic, and the like. The mobile robot can also perform gardening tasks such as watering plants, pulling weeds, spraying pesticides, blowing leaves, and the like.

Delivery Management

The mobile robot can manage packages delivered to a building. The building can have a mail room that receives packages for different offices, apartments, businesses, and individuals in the building. The mobile robot can sort delivered packages into appropriate mail boxes, contact recipients of packages for pick up, process package pick up (e.g., update mail system to indicate that the package was picked up), and organize a mail cart. In some embodiments, the mobile robot delivers the packages within the building. The mobile robot can scan the packages for identifying information such as name of recipient, office number, apartment number, and name of business. Using the identifying information, the mobile robot determines a target location for each of the packages, and navigates to the target location for each of the packages. Once arriving at the target location, depending on instructions associated with the packages, the mobile robot can leave packages at the door, knock on the door and receive a signature, and verify an identity of a recipient using a RFID badge, facial recognition, and/or voice recognition.

Identity Management

The mobile robot can verify an identity of individuals in a building using a combination of one or more of the following: facial recognition, a phone's MAC address, an RFID badge, voice recognition, and/or an individual's height, gait, and attire. If the mobile robot detects an identity mismatch, the mobile robot can use a secondary verification method such as sending a verification code to a registered personal device (e.g., a cellphone), using biometric verification methods such as a fingerprint or iris scan, contacting a trusted individual (e.g., a manager), and asking security questions. If the mobile robot cannot verify the identity of the individual using the secondary verification methods, the mobile robot can contact security personnel for further assistance, and can lead the individual to a waiting area until the security personnel arrives.

Gun Detection Applications

The mobile robot can detect guns on a person or hidden in a building. The mobile robot can use metal detection methods (such as a heat scan, a metal detector, and the like) to identify a gun, can look for a gun shape in a person's pocket, can perform a physical search on a person, can detect suspicious movements such as a person reaching for a gun, can ask a person to show their hands if suspicious movements are detected.

Inter-Robot and Self Inspection

The mobile robot can perform inspections on itself or on other mobile robots. The mobile robot can check for cosmetic damages such as scratches, chipped paint, ripped fabric panels, dents, broken pieces, and discoloration. The mobile robot can determine if cleaning is required by identifying spills or stains on the fabric panel, dirty camera lenses, and dirty touch screens. The mobile robot can test communication systems of the mobile robot or another mobile robot by sending a test signal to another mobile robot and detecting if the other mobile robot responds. The mobile robot can check if another robot's mechanical arm is properly mounted to the body by applying a force to the mechanical arm and determining if the mechanical arm is secured. The mobile robot can check another mobile robot for surveillance devices, for instance by scanning the other mobile robot with a spectrum analyzer.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like, for instance, within a robot or robot system. Furthermore, it has also proven convenient at times, to refer to these arrangements of operations as modules or engines, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Further, the functionalities described herein can be performed by a hardware processor or controller located within the robot.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A mobile robot, comprising:
   a motorized base configured to move the mobile robot throughout a room;
   a wireless transceiver configured to communicatively couple to a security system;
   a robot body on the motorized base comprising a spectrum analyzer configured to measure signals from electronic devices, wherein one or more electronic components of the mobile robot are disabled during scanning to avoid interference with the spectrum analyzer; and
   a controller configured to:
     access a map of the room in which the mobile robot is located;
     using the accessed map, identify a location within the room that has not been scanned within a previous threshold amount of time;
     cause the motorized base to navigate to the identified location;
     cause the spectrum analyzer to scan for unauthorized electronic devices at the identified location; and
     modify the map of the room to include information indicating a presence or absence of unauthorized electronic devices based on the scan at the identified location.

2. The mobile robot of claim 1, wherein accessing the map of the room further comprises:
   capturing images of the room using a camera mounted to the mobile robot while navigating within the room; and
   generating a map of the room based on the captured images.

3. The mobile robot of claim 1, wherein the spectrum analyzer is mounted on an arm of the mobile robot coupled to the robot body.

4. The mobile robot of claim 1, wherein the scan can detect signals that may originate from a detected unauthorized electronic device.

5. The mobile robot of claim 1, wherein the controller is further configured to:
   generate a heat map indicating locations within the room that the mobile robot has scanned for unauthorized electronic devices.

6. The mobile robot of claim 1, wherein the map is modified to include a probability that unauthorized electronic devices are located at the first location.

7. The mobile robot of claim 6, wherein responsive to the probability that the presence of unauthorized electronic devices are located at the first location exceeding a threshold, notifying a security personnel.

8. The mobile robot of claim 1, wherein the controller is further configured to:
   identify an unauthorized electronic device at the first location or the second location; and
   responsive to identifying the unauthorized electronic device at the first location or the second location, remove, by the mobile robot, the unauthorized electronic device.

9. The mobile robot of claim 1, wherein the identified location within the room comprises a least-recently scanned location within the room.

10. The mobile robot of claim 1, wherein the controller is further configured to:
    identify a person in the room; and
    scan the person in the room for unauthorized electronic devices.

11. A method comprising:
    accessing, by a mobile robot, a map of a room in which the mobile robot is located;
    identifying, by the mobile robot, a location within the room that has not been scanned within a previous threshold amount of time using the accessed map;
    navigating, by the mobile robot, to the identified location;
    scanning, by a spectrum analyzer of the mobile robot, for unauthorized electronic devices at the identified location, wherein one or more electronic components of the mobile robot are disabled during scanning to avoid interference with the spectrum analyzer; and
    modifying, by the mobile robot, the map of the room to include information indicating a presence or absence of unauthorized electronic devices based on the scan at the identified location.

12. The method of claim 11, wherein accessing the map of the room further comprises:
    capturing images of the room using a camera mounted to the mobile robot while the mobile robot navigates within the room; and
    generating a map of the room based on the captured images.

13. The method of claim 11, wherein the spectrum analyzer is mounted on an arm of the mobile robot.

14. The method of claim 11, wherein the scan can detect signals that may originate from a detected unauthorized electronic device.

15. The method of claim 14, further comprising:
    generating a heat map indicating locations within the room that the mobile robot has scanned for unauthorized electronic devices.

16. The method of claim 11, wherein the map is modified to include a probability that unauthorized electronic devices are located at the location.

17. The method of claim 16, wherein responsive to the probability that the presence of unauthorized electronic devices are located at the location exceeding a threshold, notifying a security personnel.

18. The method of claim 11, further comprising:
identifying an unauthorized electronic device at the first location or the second location; and
responsive to identifying the unauthorized electronic device at the first location or the second location, removing, by the mobile robot, the unauthorized electronic device.

19. The method of claim 11, wherein the identified location within the room comprises a least-recently scanned location within the room.

20. The method of claim 11, further comprising:
identifying a person in the room; and
scanning the person in the room for unauthorized electronic devices.

* * * * *